United States Patent
Kinugasa et al.

(10) Patent No.: US 7,280,220 B2
(45) Date of Patent: Oct. 9, 2007

(54) PHYSICAL QUANTITY MEASURING METHOD AND DEVICE THEREFOR

(75) Inventors: Seiichiro Kinugasa, Tokyo (JP); Keiji Miyazawa, Tokyo (JP); Takaaki Kuroiwa, Tokyo (JP)

(73) Assignee: Yamatake Corporation, Tokyo (JP)

( * ) Notice: Subject to any disclaimer, the term of this patent is extended or adjusted under 35 U.S.C. 154(b) by 289 days.

(21) Appl. No.: 10/489,782

(22) PCT Filed: Sep. 18, 2002

(86) PCT No.: PCT/JP02/09550

§ 371 (c)(1),
(2), (4) Date: Mar. 17, 2004

(87) PCT Pub. No.: WO03/027625

PCT Pub. Date: Mar. 4, 2003

(65) Prior Publication Data

US 2004/0246489 A1 Dec. 9, 2004

(30) Foreign Application Priority Data

Sep. 21, 2001 (JP) .............................. 2001-287958

(51) Int. Cl.
*G01B 9/02* (2006.01)

(52) U.S. Cl. .................................................... 356/479

(58) Field of Classification Search ................ 356/477, 356/478, 479, 480, 482; 250/227.19, 227.27; 385/12
See application file for complete search history.

(56) References Cited

U.S. PATENT DOCUMENTS 4,699,513 A 10/1987 Brooks et al. .............. 356/478

(Continued)

FOREIGN PATENT DOCUMENTS

JP 60-135737 7/1985

(Continued)

OTHER PUBLICATIONS

Japanese Patent Office Action (First Rejection), mailed May 8, 2007 and issued in corresponding Japanese Patent Application.

*Primary Examiner*—Tarifur Chowdhury
*Assistant Examiner*—Jonathon D Cook

(57) ABSTRACT

Light emitted by a light source is inputted to a sensor to generate an optical path difference on input light according to a physical parameter to be measured, light outputted with an optical path difference generated in response to the input is inputted to another sensor to generate an optical path difference on input light according to a physical parameter to be measured, and light outputted with an optical path difference generated in response to the input is split into two to generate an interference fringe. Due to the presence of light which is changed in optical path length in the first sensor, is inputted to the sensor of the subsequent stage, and is transmitted without being changed in optical path length, and light which is not changed in optical path length in the first sensor, is inputted to the sensor of the subsequent stage, and is transmitted after being changed in optical path length, an interference fringe is generated with an fringe located on a position corresponding to a difference value between physical parameters to be measured. Thus, a difference value between physical parameters is measured by detecting the position.

51 Claims, 57 Drawing Sheets

U.S. PATENT DOCUMENTS 5,646,401 A * 7/1997 Udd ..................... 250/227.18
2002/0085208 A1 * 7/2002 Hauger et al. .............. 356/479

FOREIGN PATENT DOCUMENTS

| JP | 61-210910 | 9/1986 |
| JP | 4-151527 | 5/1992 |
| JP | 6-241929 | 9/1994 |
| JP | 8-086745 | 4/1996 |
| JP | 9-318329 | 12/1997 |
| JP | 9-318462 | 12/1997 |
| JP | 2002-156206 | 5/2002 |
| WO | WO99/60341 | 11/1999 |

* cited by examiner

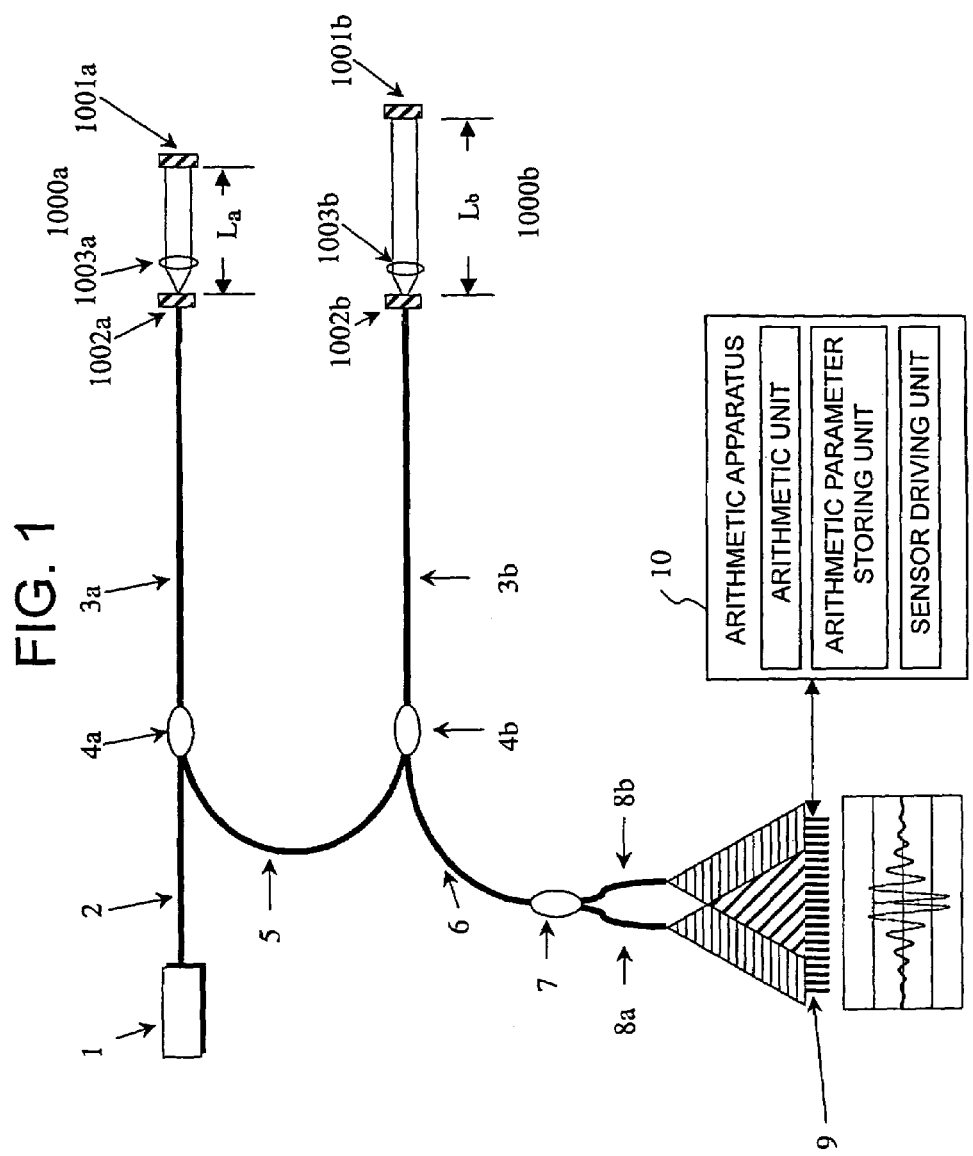

FIG. 8

$$I = \frac{1}{32}\sqrt{\frac{2}{\pi}}\frac{1}{R(h)}\exp\left[-\frac{2(z^2)}{w^2(h)}\right]\left[(4 + 4\gamma(2n_a L_a)\cos(2n_a k L_a) + 4\gamma(2n_b L_b)\cos(2kn_b L_b) + 4\gamma(\Delta)\cos(k\Delta)\right.$$

$$+ 2[\gamma(2n_a L_a + 2n_b L_b)\cos(k(2n_a L_a + 2n_b L_b)) + \gamma(\Delta + 2n_a L_a)\cos(k(\Delta + 2n_a L_a))$$

$$+ \gamma(\Delta + 2n_b L_b)\cos(k(\Delta + 2n_b L_b)) + \gamma(2n_a L_a - 2n_b L_b)\cos(k(2n_a L_a - 2n_b L_b))$$

$$+ \gamma(\Delta - 2n_a L_a)\cos(k(\Delta - 2n_a L_a)) + \gamma(\Delta - 2n_b L_b)\cos(k(\Delta - 2n_b L_b))]$$

$$+ \gamma(\Delta + (2n_a L_a + 2n_b L_b))\cos\{k(\Delta + (2n_a L_a + 2n_b L_b))\}$$

$$+ \gamma(\Delta - (2n_a L_a + 2n_b L_b))\cos\{k(\Delta - (2n_a L_a + 2n_b L_b))\}$$

$$+ \gamma(\Delta + (2n_a L_a - 2n_b L_b))\cos\{k(\Delta + (2n_a L_a - 2n_b L_b))\}$$

$$\left.+ \gamma(\Delta - (2n_a L_a - 2n_b L_b))\cos\{k(\Delta - (2n_a L_a - 2n_b L_b))\}\right]$$

$$k = \frac{2\pi}{\lambda}$$

$$\gamma(A) = \exp\left[-\left(\frac{A}{l_c}\right)^2\right] \quad l_c : \text{COHERENCE LENGTH}$$

$w(h)$: BEAM DIAMETER
$R(h)$: BEAM SHAPE
$z$: PIXEL POSITION ON LINE IMAGE SENSOR

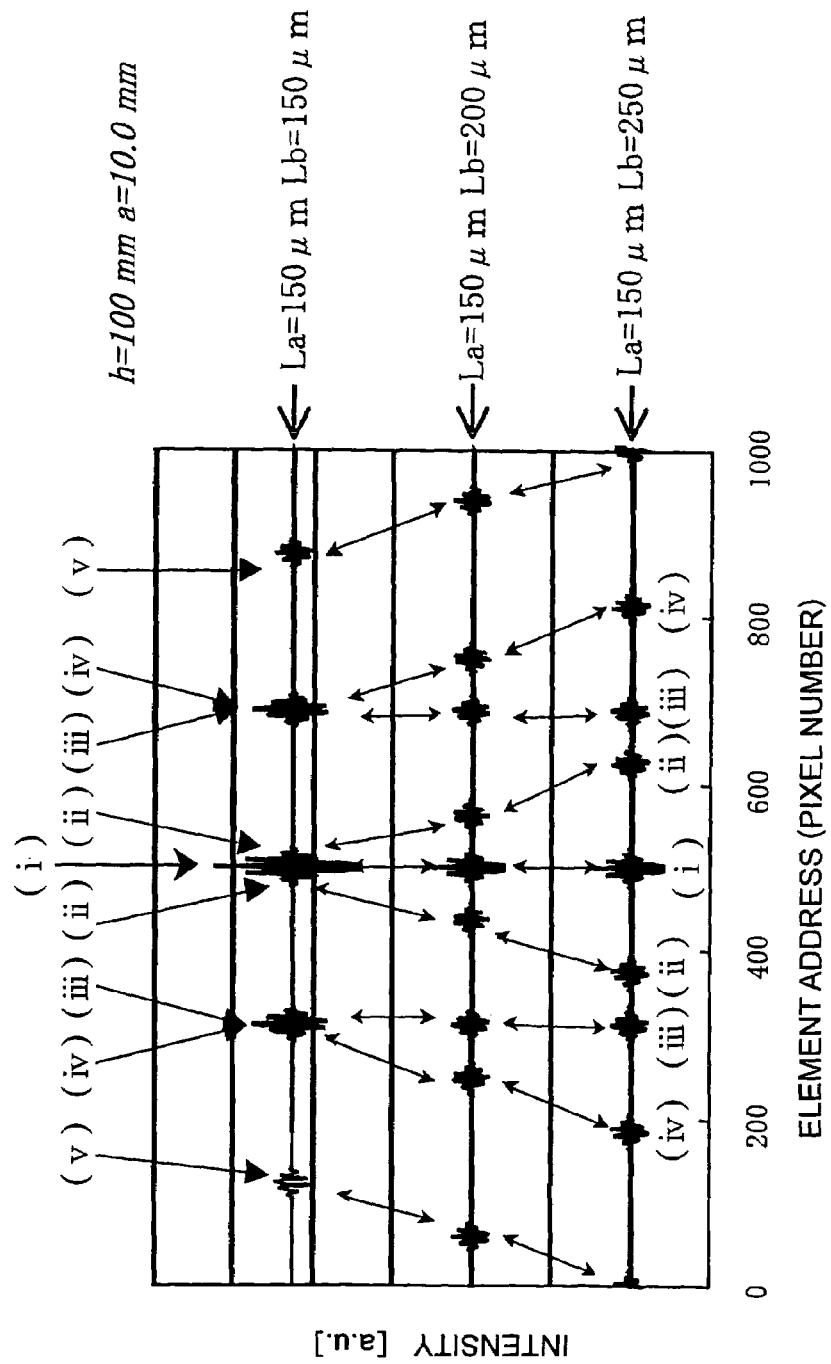

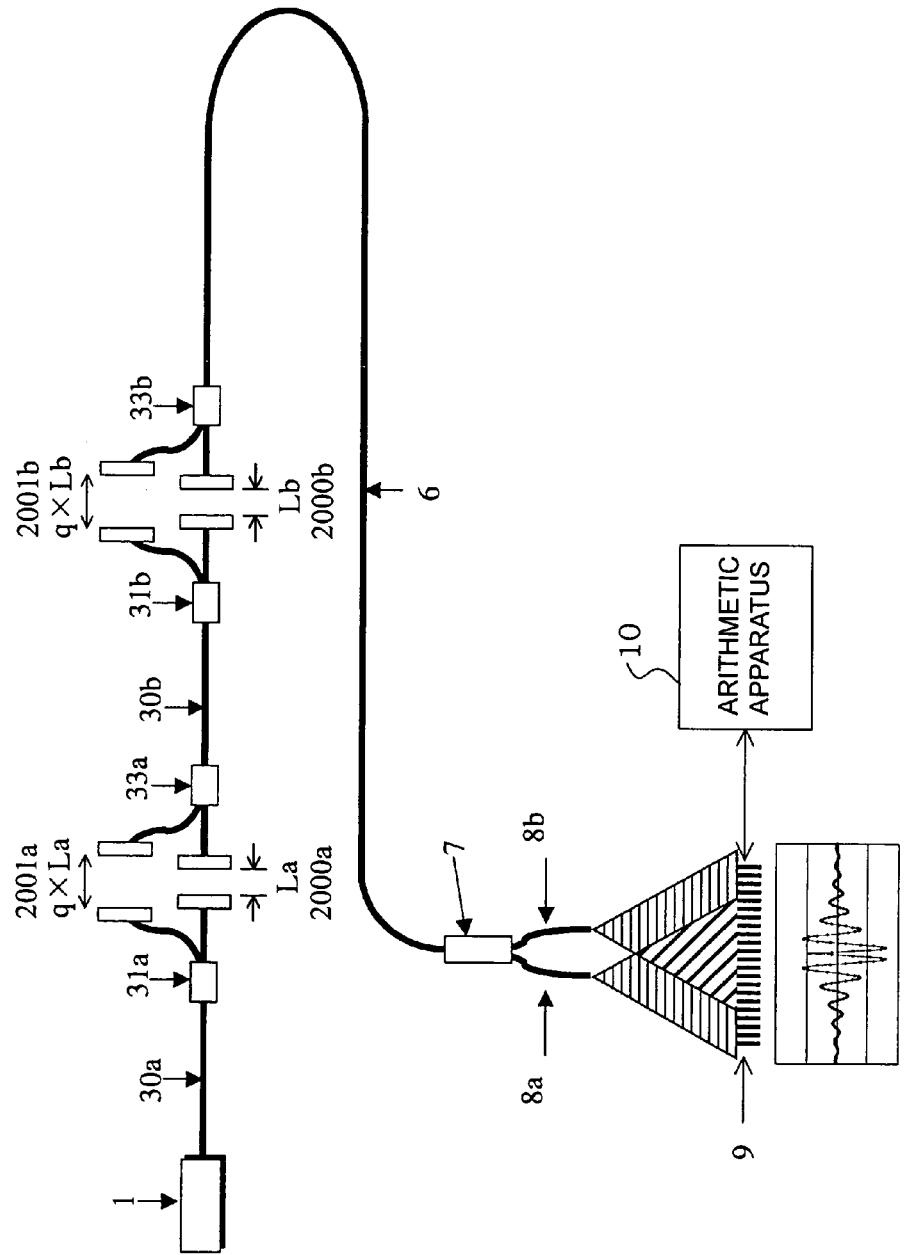

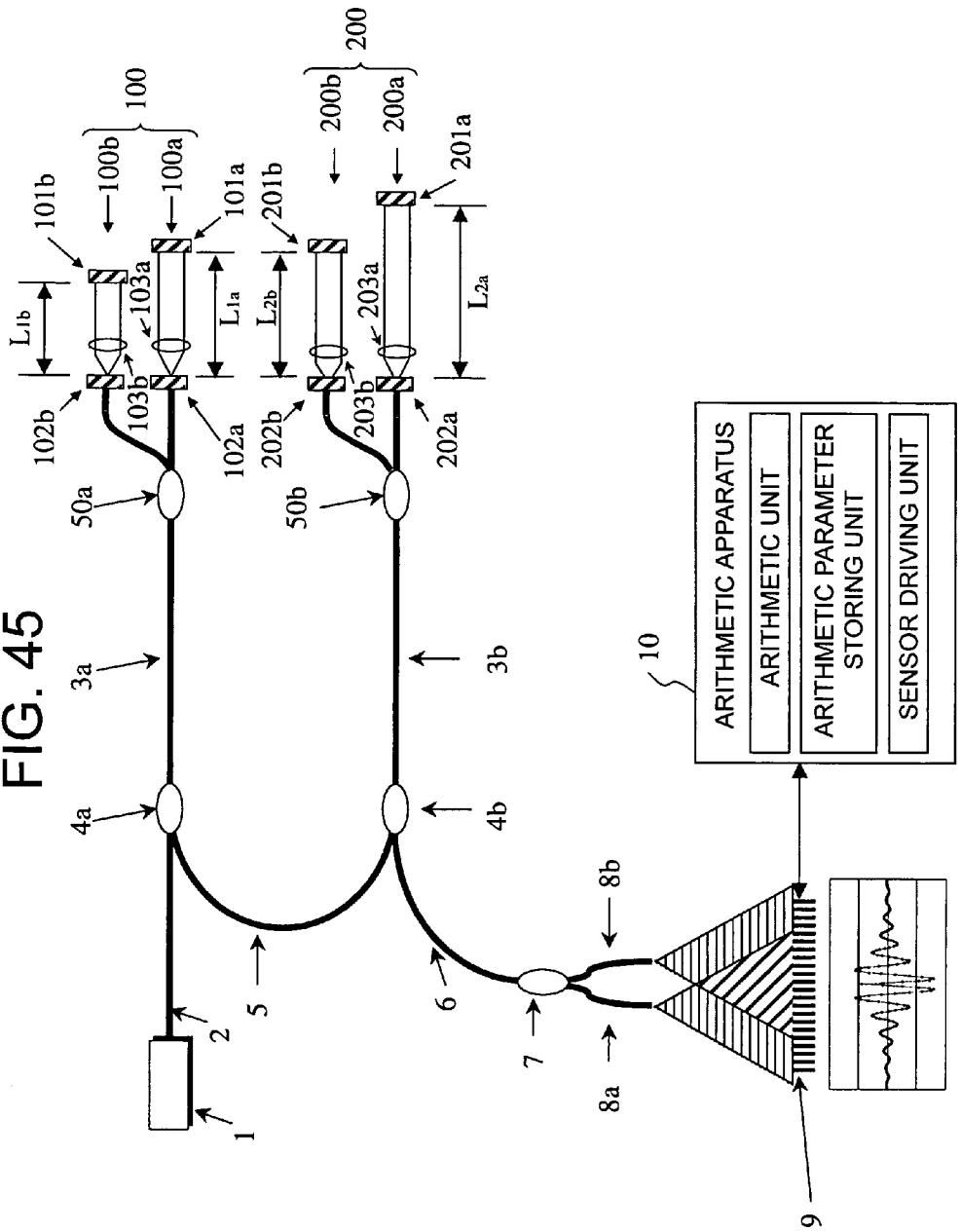

FIG. 51

$$I = \frac{1}{32}\sqrt{\frac{2}{\pi}} \frac{1}{R(h)} \exp\left[-\frac{2(z^2)}{w^2(h)}\right] \left[4 + 4\gamma(2n_{1a}L_{1a})\cos(2n_{1a}kL_{1a}) + 4\gamma(2n_{2a}L_{2a})\cos(2kn_{2a}L_{2a}) + 4\gamma(\Delta)\cos(k\Delta)\right.$$

$$+ 2[\gamma(2n_{1a}L_{1a} + 2n_{2a}L_{2a})\cos(k(2n_{1a}L_{1a} + 2n_{2a}L_{2a})) + \gamma(\Delta + 2n_{1a}L_{1a})\cos(k(\Delta + 2n_{1a}L_{1a}))$$

$$+ \gamma(\Delta + 2n_{1a}L_{1a} + 2n_{2a}L_{2a})\cos(k(\Delta + 2n_{1a}L_{1a} - 2n_{2a}L_{2a})) + \gamma(\Delta - 2n_{2a}L_{2a})\cos(k(2n_{1a}L_{1a} - 2n_{2a}L_{2a}))$$

$$+ \gamma(\Delta + (2n_{1a}L_{1a} + 2n_{2a}L_{2a}))\cos\{k(\Delta + (2n_{1a}L_{1a} + 2n_{2a}L_{2a}))\}$$

$$+ \gamma(\Delta - (2n_{1a}L_{1a} + 2n_{2a}L_{2a}))\cos\{k(\Delta - (2n_{1a}L_{1a} + 2n_{2a}L_{2a}))\}$$

$$+ \gamma(\Delta + (2n_{1a}L_{1a} - 2n_{2a}L_{2a}))\cos\{k(\Delta + (2n_{1a}L_{1a} - 2n_{2a}L_{2a}))\}$$

$$\left. + \gamma(\Delta - (2n_{1a}L_{1a} - 2n_{2a}L_{2a}))\cos\{k(\Delta - (2n_{1a}L_{1a} - 2n_{2a}L_{2a}))\}\right]$$

$$k = \frac{2\pi}{\lambda}$$

$$\gamma(A) = \exp\left[-\left(\frac{A}{l_c}\right)^2\right] \quad l_c : \text{COHERENCE LENGTH}$$

$w(h)$: BEAM DIAMETER
$R(h)$: BEAM SHAPE
$z$: PIXEL POSITION ON LINE IMAGE SENSOR

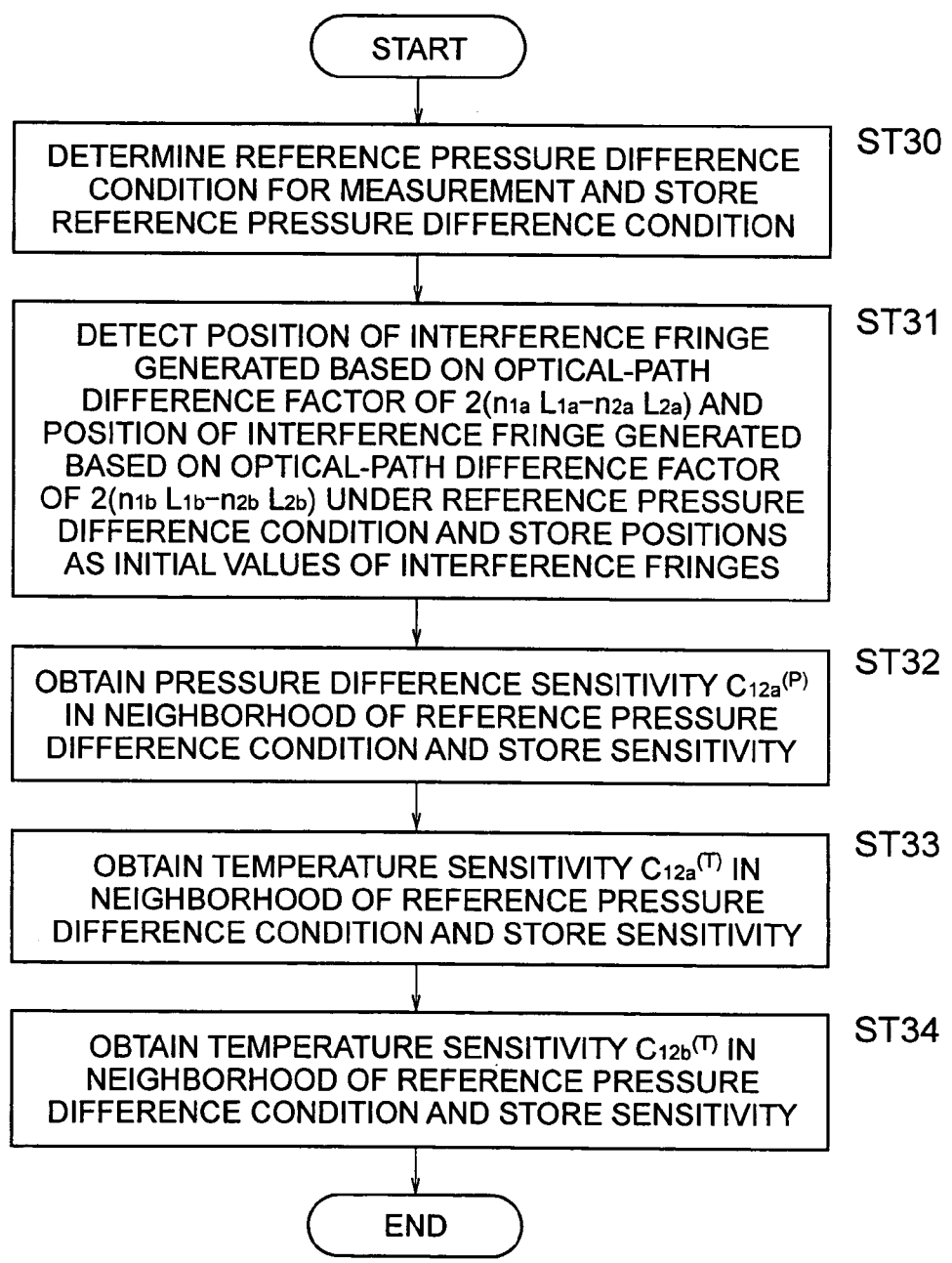

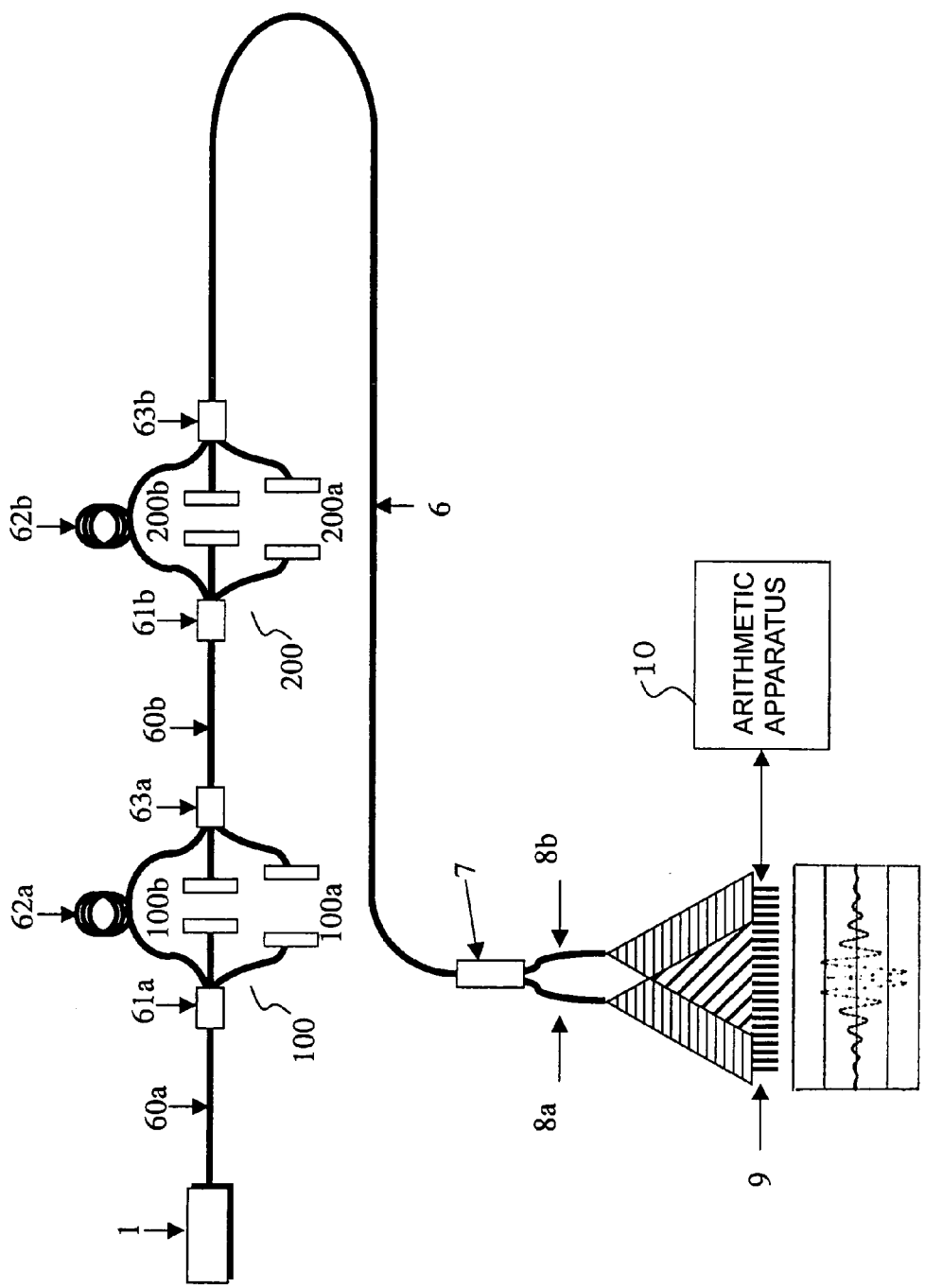

PHYSICAL QUANTITY MEASURING METHOD AND DEVICE THEREFOR

TECHNICAL FIELD

The present invention relates to a method and an apparatus for measuring a physical quantity (or parameter) in which a difference value between physical parameters such as pressures generated on positions away from each other can be correctly measured without being affected by the ambient environment.

BACKGROUND ART

In the case where control is performed in a plant such as an oil plant, it is sometimes necessary to measure a difference value between pressures of a process fluid located on positions away from each other.

In this case, conventionally pressure gauges are provided on two measurement positions, measurement values (electric signals) of the two pressure gauges are transmitted to an arithmetic circuit, and a difference is calculated therein, so that a difference value is measured between pressures on the two measurement points.

In addition, a differential pressure gauge is provided to measure a difference value of pressures and a process fluid is guided into the differential pressure gauge from two measurement positions by using a pressure transmitting pipe (or connecting pipe) for guiding a process fluid, so that a difference value is measured between pressures on the two measurement points.

In such a method using a pressure transmitting pipe, measurement may be hampered by clogging in the pressure transmitting pipe and a process fluid may flow to the outside when the pressure transmitting pipe is broken.

For this reason, in some cases remote seals for filling an enclosed liquid such as silicone oil are used instead of a pressure transmitting pipe and pressures of a process fluid are transmitted from two measurement positions to a differential pressure gauge, so that a difference value is measured between pressures on the two measurement points.

However, in the case of the method where pressure gauges are provided on two measurement positions and a difference is calculated between the measurement values of the two pressure gauges by using an arithmetic circuit, it is necessary to provide two expensive pressure gauges, increasing the cost.

Meanwhile in the case of the method where a pressure transmitting pipe is used to guide a process fluid from two measurement positions to a differential pressure gauge, measurement may be hampered by clogging in the pressure transmitting pipe and a process fluid may flow to the outside when the pressure transmitting pipe is broken.

Meanwhile in the case where remote seals are used to transmit pressures of a process fluid from two measurement positions to a differential pressure gauge, there is no probability that clogging may occur in a pressure transmitting pipe and the process fluid may flow to the outside. However, since the two remote seals are disposed in different environments, the influence of temperatures and so on may reduce measurement accuracy. Besides, this method may cause leakage of an enclosed liquid to the outside when the remote seals are broken.

An object of the present invention is to establish, in such a background art, another technique for measuring a physical parameter whereby a difference value between physical parameters on positions away from each other can be correctly measured without being affected by the ambient environment.

Another object of the present invention is to establish, for the above measurement, another technique for measuring a physical parameter whereby a difference value between physical parameters on positions away from each other can be correctly measured without being affected by a physical parameter not to be measured.

DISCLOSURE OF THE INVENTION

A physical parameter measuring apparatus of the present invention includes (a) a plurality of sensor units to generate, in compliance with a reflection structure, an optical path difference on input light according to a physical parameter to be measured, (b) optical fiber which is provided so as to correspond to the sensor unit of the front stage of said plurality of sensor units and transmits light emitted by a light source to the sensor unit, (c) a plurality of optical fibers which are provided so as to correspond to a sensor unit other than the sensor unit of the front stage of said plurality of sensor units, that receive, as input, light reversely transmitted with an optical path difference through the optical fibers provided so as to correspond to the sensor unit of the front stage of said plurality of sensor units, and transmit the light to the paired sensor units, (d) an optical unit which receives, as input, light reversely transmitted with an optical path difference through the optical fibers provided so as to correspond to the sensor unit of the final stage of said plurality of sensor units and which splits the light into two, (e) a detecting unit to detect interference fringes generated by light split into two and emitted from the optical unit, and (f) a calculating unit to calculate a difference value between physical values to be measured, based on the fringe position of an interference fringe detected by the detecting unit.

Further, a physical parameter measuring apparatus of the present invention includes (a) a plurality of sensor units to generate, in compliance with a transmission structure, an optical path difference on input light according to a physical parameter to be measured, (b) optical fiber which is provided so as to correspond to the sensor unit of the front stage of said plurality of sensor units and transmits light emitted by a light source to the sensor unit, (c) a plurality of optical fibers which are provided so as to correspond to a sensor unit other than the sensor unit of the front stage of said plurality of sensor units, are connected in series with the sensor unit of the front stage of said plurality of sensor units, that receive, as input, light having an optical path difference generated by the sensor unit, and transmit the light to the paired sensor unit, (d) an optical unit which receives, as input, light having an optical path difference generated by the sensor unit of the final stage and splits the light into two, (e) a detecting unit to detect interference fringes generated by the light split into two and emitted from the optical unit, and (f) a calculating unit to calculate a difference value between physical values to be measured, based on the fringe position of an interference fringe detected by the detecting unit.

According to the above structure, when a difference value is measured between physical parameters measured on positions away from each other, an optical fiber is used instead of a pressure transmitting pipe and a remote seal and light interference is used to measure a difference value. Thus, the present invention makes it possible to correctly measure a difference value between physical parameters on positions away from each other without being affected by the ambient environment.

Meanwhile, in the measurement of a difference value between physical parameters according to this structure, when it is necessary to perform a measurement without being affected by a physical parameter not to be measured, a physical parameter measuring apparatus of the present invention includes (a) a plurality of sensor pairs, each being constituted of a combination of a sensor unit to generate an optical path difference on input light in compliance with a reflection structure according to a physical parameter to be measured and a physical parameter not to be measured and a sensor unit to generate an optical path difference on input light in compliance with the reflection structure according to a physical parameter not to be measured, (b) optical fiber which is provided so as to correspond to the sensor pair of the front stage of said plurality of sensor pairs and transmits light emitted by a light source to the sensor pair, (c) a plurality of optical fibers which are provided so as to correspond to sensor pairs other than the sensor pair of the front stage, that receive, as input, light reversely transmitted with an optical path difference through the optical fibers provided so as to correspond to the sensor pair of the previous stage, and transmit the light to the paired sensor pair, (d) an optical unit which receives, as input, light reversely transmitted with an optical path difference through the optical fibers provided so as to correspond to the sensor pair of the final stage and splits the light into two, (e) a detecting unit to detect interference fringes generated by light split into two and emitted from the optical unit, and (f) a calculating unit to calculate a difference value between physical values to be measured, based on the fringe position of an interference fringe detected by the detecting unit, without being affected by a physical parameter not to be measured.

Additionally, when it is necessary to measure a difference value between physical parameters without being affected by a physical parameter not to be measured, a physical parameter measuring apparatus of the present invention includes (a) a plurality of sensor pairs, each being constituted of a combination of a sensor unit to generate an optical path difference on input light in compliance with a transparent structure according to a physical parameter to be measured and a physical parameter not to be measured and an other sensor unit to generate an optical path difference on input light in compliance with the transparent structure according to a physical parameter not to be measured, (b) optical fiber which is provided so as to correspond to the sensor pair of the front stage and transmits light emitted by a light source to the sensor pair, (c) a plurality of optical fibers which are provided so as to correspond to sensor pairs other than the sensor pair of the front stage, are connected in series with the sensor pair of the previous stage, that receive, as input, light having an optical path difference generated by the sensor pair, and transmit the light to the paired sensor pair, (d) an optical unit which receives, as input, light having an optical path difference generated by the sensor pair of the final stage and splits the light into two, (e) a detecting unit to detect interference fringes generated by light split into two and emitted from the optical unit, and (f) a calculating unit to calculate a difference value between physical values to be measured, based on the fringe position of an interference fringe detected by the detecting unit, without being affected by a physical parameter not to be measured.

According to the above structure, in the measurement of a difference value between physical parameters measured on positions away from each other, an optical fiber is used instead of a pressure transmitting pipe and a remote seal, light interference is used to measure a difference value, and the difference value between the physical parameters is measured at this point by canceling the influence of a physical parameter not to be measured. Thus, the present invention makes it possible to correctly measure a difference value between physical parameters on positions away from each other without being affected by the ambient environment and correctly measure a difference value without being affected by a physical parameter not to be measured.

BRIEF DESCRIPTION OF THE DRAWINGS

FIG. 1 is a structural example of the present invention according to Embodiment 1.

FIG. 8 shows a model equation for the intensity of interference fringes.

FIG. 9 is an explanatory drawing showing simulation results on the generation of interference fringes.

FIGS. 42, 43, and 44 show structural examples using the transmission sensor.

FIG. 45 shows a structural example of the present invention according to Embodiment 2.

FIG. 51 shows a model equation showing the intensity of interference fringes.

FIGS. 52 and 53 are explanatory drawings showing the execution processing of an arithmetic unit.

FIG. 60 shows a structural example using a transmission sensor.

BEST MODE FOR CARRYING OUT THE INVENTION

Figure 2A:
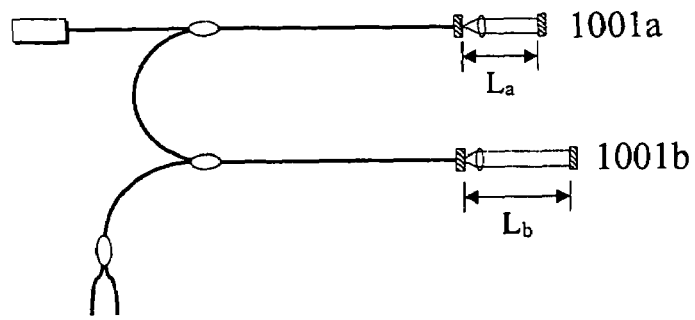
FIGS. 2A, 2B, 2C, 2D, 3, 4A, 4B, 5A, 5B, and 6 are explanatory drawings, each showing a light transmission pattern or patterns.

The outlines of Embodiments 1 and 2 will be firstly discussed and the detail thereof will be discussed later.

[1] Outline of Embodiment 1

[1-A] Structure Using Sensors of Reflection Structures

According to Embodiment 1, when sensors of reflection structures are used, a physical parameter measuring apparatus of the present invention includes (a) a plurality of sensors to generate, in compliance with the reflection structure, an optical path difference on input light according to a physical parameter to be measured, (b) an optical fiber which is provided so as to correspond to the sensor of the previous stage and transmits light emitted by a light source to the sensor, (c) optical fibers which are provided so as to correspond to sensors other than the sensor of the previous stage, receive, as input, light reversely transmitted with an optical path difference through the optical fibers provided so as to correspond to the sensor in the front stage, and transmit the light to the paired sensor, (d) an optical unit which receives, as input, light reversely transmitted with an optical path difference through the optical fibers provided so as to correspond to a sensor in the final stage and which splits the light into two, (e) a detecting unit to detect interference fringes generated by light split into two and emitted from the optical unit, and (f) a calculating unit to calculate a difference value between physical values to be measured, based on the fringe position of an interference fringe detected by the detecting unit.

[1-B] Structure Using Sensors of Transmission Structures

According to Embodiment 1, when sensors of transmission structures are used, a physical parameter measuring apparatus of the present invention includes (a) a plurality of sensors to generate, in compliance with the transmission structure, an optical path difference on input light according to a physical parameter to be measured, (b) an optical fiber which is provided so as to correspond to the sensor of the previous stage and transmits light emitted by a light source to the sensor, (c) optical fibers which are provided so as to correspond to sensors other than the sensor of the previous stage, are connected in series with the sensor of the front stage, receive, as input, light having an optical path difference generated by the sensor, and transmit the light to the paired sensor, (d) an optical unit which receives, as input, light having an optical path difference generated by the sensor of the final stage and splits the light into two, (e) a detecting unit to detect interference fringes generated by the light split into two and emitted from the optical unit, and (f) a calculating unit to calculate a difference value between physical values to be measured, based on the fringe position of an interference fringe detected by the detecting unit.

[1-C] Principle to Measure a Physical Parameter Difference Value According to Embodiment 1

Regarding Embodiment 1 structured thus, at least two sensors are provided to generate an optical path difference of n×L (n represents a refractive index, L represents a length) or the like on input light according to a physical parameter to be measured.

Further, in an example where the sensor of the front stage has a function of generating an optical path difference of $n_a \times L_a$ and the sensor of the subsequent stage has a function of generating an optical path difference of $n_b \times L_b$, when light emitted from a light source is inputted to the sensor of the front stage via an optical fiber provided so as to correspond to the sensor of the front stage, the function of generating an optical path difference of $n_a \times L_a$ in the sensor of the front stage generates, in the sensor of the reflection structure, light having an unchanging optical path length and light having an optical path length changed by $n_a \times L_a$.

These two light beams are inputted to the sensor of the subsequent stage via an optical fiber provided so as to correspond to the sensor of the subsequent stage, and the function of generating an optical path difference of $n_b \times L_b$ in the sensor of the subsequent stage generates, in the sensor of the reflection structure, light having an unchanging optical path length and light having an optical path length changed by $n_b \times L_b$, starting from the input light beams.

Because of the presence of light which is changed in optical path length by $n_a \times L_a$ in the sensor of the front stage, is inputted to the sensor of the subsequent stage, and is transmitted without being changed in optical path length by $n_b \times L_b$ and the presence of light which is not changed in optical path length by $n_a \times L_a$ in the sensor of the front stage, is inputted to the sensor of the subsequent stage, and is transmitted after being changed in optical path length by $n_b \times L_b$, a phase difference having a factor of $(n_a \times L_a - n_b \times L_b)$ appears and thus an interference fringe corresponding to the optical path difference of $(n_a \times L_a - n_b \times L_b)$ is generated on the sensors.

The fringe position of the interference fringe according to the optical path difference of $(n_a \times L_a - n_b \times L_b)$ corresponds to a difference value between physical parameters to be measured. Thus, for example, a movement is detected from the position of an interference fringe having no difference value, and a difference value between the physical parameters to be measured is calculated according to the detected movement.

As described above, according to the present invention, when a difference value is measured between physical parameters measured on positions away from each other, an optical fiber is used instead of a pressure transmitting pipe and a remote seal and light interference is used to measure a difference value. Thus, it is possible to correctly measure a difference value between physical parameters on positions away from each other without being affected by the ambient environment.

Namely, light waves passing through an optical fiber are all subjected to same phase swinging, so that interferences caused by disturbance cancel each other out. Thus, it is possible to correctly measure a difference value between physical parameters on positions away from each other without being affected by the ambient environment.

[2] Outline of Embodiment 2

[2-A] Structure Using Sensor of Reflection Structures

According to Embodiment 2, when sensors of reflection structures are used, a physical parameter measuring apparatus of the present invention includes (a) a plurality of sensor pairs, each being constituted of a combination of a sensor to generate an optical path difference on input light in compliance with the reflection structure according to a physical parameter to be measured and a physical parameter not to be measured and a sensor to generate an optical path difference on input light in compliance with the reflection structure according to a physical parameter not to be measured, (b) an optical fiber which is provided so as to correspond to a sensor pair of the front stage and transmits light emitted by a light source to the sensor pair, (c) optical fibers which are provided so as to correspond to sensor pairs other than the sensor pair of the front stage, that receive, as input, light reversely transmitted with an optical path difference through the optical fibers provided so as to correspond to the sensor pair of the front stage, and transmit the light to the paired sensor pair, (d) an optical unit which receives, as input, light reversely transmitted with an optical path difference through the optical fibers provided so as to correspond to the sensor pair of the final stage and splits the light into two, (e) a detecting unit to detect interference fringes generated by light split into two and emitted from the optical unit, and (f) a calculating unit to calculate a difference value between physical values to be measured, based on the fringe position of an interference fringe detected by the detecting unit, without being affected by a physical parameter not to be measured.

[2-B] Structure Using Sensors of Transparent Structures

According to Embodiment 2, when sensors of transparent structures are used, a physical parameter measuring apparatus of the present invention includes (a) a plurality of sensor pairs, each being constituted of a combination of a sensor to generate an optical path difference on input light in compliance with the transparent structure according to a physical parameter to be measured and a physical parameter not to be measured and a sensor to generate an optical path difference on input light in compliance with the transparent structure according to a physical parameter not to be measured, (b) an optical fiber which is provided so as to correspond to a sensor pair of the front stage and transmit light emitted by a light source to the sensor pair, (c) optical fibers which are provided so as to correspond to sensor pairs other than the sensor pair of the front stage, are connected in series with a sensor pair of a previous stage, receive, as input, light having an optical path difference generated by the sensor pair, and transmit the light to the paired sensor pair, (d) an optical unit which receives, as input, light having an optical path difference generated by a sensor pair of a final stage and splits the light into two, (e) a detecting unit to detect interference fringes generated by light split into two and emitted from the optical unit, and (f) a calculating unit to calculate a difference value between physical parameters to be measured, based on the fringe position of an interference fringe detected by the detecting unit, without being affected by a physical parameter not to be measured.

[2-C] Principle to Measure a Physical Parameter Difference Value According to Embodiment 2

Regarding Embodiment 2 structured thus, at least two sensor pairs are provided each of which has a combination of a sensor to generate an optical path difference on input light according to a physical parameter to be measured and a physical parameter not to be measured and a sensor to generate an optical path difference on input light according to a physical parameter not to be measured.

Further, in an example where one sensor of the sensor pair of the front stage has a function of generating an optical path difference of $n_1 \times L_1$ ($n_1$ represents a refractive index, $L_1$ represents a length) and the corresponding sensor of the sensor pair of the subsequent stage has a function of generating an optical path difference of $n_2 \times L_2$ ($n_2$ represents a refractive index, $L_2$ represents a length), when light emitted by a light source is inputted to the sensor of the front stage via an optical fiber provided so as to correspond to the sensor pair of the front stage, the function of generating an optical path difference of $n_1 \times L_1$ in the sensor of the front stage generates, in the sensor of the reflection structure, light having an unchanging optical path length and light having an optical path length changed by $n_1 \times L_1$.

These two light beams are inputted to the sensor of the subsequent stage via an optical fiber provided so as to correspond to the sensor pair of the subsequent stage, and the function of generating an optical path difference of $n_2 \times L_2$ in the sensor of the subsequent stage generates, in the sensor of the reflection structure, light having an unchanging optical path length and light having an optical path length changed by $n_2 \times L_2$, starting from the input light beams.

Because of the presence of light which is changed in optical path length by $n_1 \times L_1$ in the sensor of the front stage, is inputted to the sensor of the subsequent stage, and is transmitted without being changed in optical path length by $n_2 \times L_2$ and the presence of light which is inputted to the sensor of the subsequent stage without being changed in optical path length by $n_1 \times L_1$ in the sensor of the front stage and is transmitted after being changed in optical path length by $n_2 \times L_2$, a phase difference having a factor of $(n_1 \times L_1 - n_2 \times L_2)$ appears and thus an interference fringe corresponding to the optical path difference of $(n_1 \times L_1 - n_2 \times L_2)$ is generated on the sensors.

In the case of the sensor to generate an optical path difference on input light according to a physical parameter to be measured and a physical parameter not to be measured, the fringe position of the interference fringe according to the optical path difference of $(n_1 \times L_1 - n_2 \times L_2)$ corresponds to a difference value between physical parameters to be measured and a difference value between physical parameters not to be measured. Meanwhile, in the case of the sensor to generate an optical path difference on input light according to a physical parameter not to be measured, the fringe position corresponds to a difference value between physical parameters not to be measured.

Further, in the case where a physical parameter to be measured is a pressure and a physical parameter not to be measured is a temperature, the former interference fringe position $D_{12a}$ and the latter interference fringe position $D_{12b}$ are expressed as below.

$$D_{12a}=D_{12a}(P,T)$$

$$D_{12b}=D_{12b}(T)$$

$$P=P_1-P_2$$

$P_1$: pressure generated on the sensor position of the front stage $P_2$: pressure generated on the sensor position of the subsequent stage $T=T_1-T_2$ $T_1$: temperature on the sensor position of the front stage $T_2$ temperature on the sensor position of the subsequent stage Therefore, when a pressure difference and a temperature difference are changed, the interference fringe position $D_{12a}$ generated by one sensor of the sensor pair is changed as below.

$$\Delta D_{12a} = D_{12a}^{(P)} \times \Delta P + C_{12a}^{(T)} \times \Delta T$$

$D_{12a}^{(P)}$ indicates a sensitivity of a pressure difference that can be determined in advance by experiments as a movement of an interference fringe per unit pressure difference, which is determined with a constant temperature difference. Moreover, $C_{12a}^{(T)}$ indicates a sensitivity of a temperature difference that can be determined in advance by experiments as a movement of an interference fringe per unit temperature difference, which is determined with a constant pressure difference.

On the other hand, the interference fringe position $D_{12b}$ generated by the other sensor of the sensor pair is changed as below when a temperature difference is changed.

$$\Delta D_{12b} = C_{12b}^{(T)} \times \Delta T$$

$C_{12b}^{(T)}$ represents a sensitivity of a temperature difference that can be determined in advance by experiments as a movement of an interference fringe per unit temperature difference, which is determined with a constant pressure difference.

Further, according to the present invention, a movement is firstly determined regarding the position $D_{12b}$ of an interference fringe generated by a sensor reacting only to a temperature in a sensor pair and the movement is divided by the previously determined sensitivity $C_{12b}^{(T)}$, so that the temperature difference $\Delta T$ is determined.

Subsequently, a movement is determined regarding the position $D_{12a}$ of an interference fringe generated by a sensor reacting to both of a pressure and a temperature in a sensor pair. A pressure difference $\Delta P$ is measured by substituting the determined movement $\Delta D_{12a}$, the previously determined temperature difference $\Delta T$, and the previously determined sensitivities $C_{12a}^{(P)}$ and $C_{12a}^{(T)}$ into the equation below.

$$\Delta P = (\Delta D_{12a} - C_{12a}^{(T)} \times \Delta T) / C_{12a}^{(P)}$$

The above equation is derived from the equation below.

$$\Delta D_{12a} = C_{12a}^{(P)} \times \Delta P + C_{12a}^{(T)} \times \Delta T$$

As described above, according to the present invention, when a difference value is measured between physical parameters measured on positions away from each other, an optical fiber is used instead of a pressure transmitting pipe, a remote seal, and so on and light interference is used to measure a difference value. A difference value between physical parameters is measured at this point by canceling the influence of a physical parameter not to be measured. Thus, it is possible to correctly measure a difference value between physical parameters on positions away from each other without being affected by the ambient environment and correctly perform measurements without being affected by a physical parameter not to be measured.

Namely, light waves passing through the optical fibers are all subjected to same phase swinging, so that interferences caused by disturbance cancel each other out. Hence, it is possible to correctly measure a difference value between physical parameters on positions away from each other without being affected by the ambient environment. Further, a difference value between physical parameters is measured by canceling the influence of a physical parameter not to be measured, so that measurements can be correctly performed without being affected by a physical parameter not to be measured.

[3] Detail of Embodiment 1

The following will describe the detail of the present invention according to Embodiment 1. The measurement of a difference value between pressures generated on measurement points away from each other will be discussed as a concrete example.

FIG. 1 shows a structural example of the present invention according to Embodiment 1.

In the structural example of FIG. 1 according to the present invention, a first sensor 1000a and a second sensor 1000b are used to measure a difference value between a pressure generated on a first measurement point and a pressure generated on a second measurement point. The first sensor 1000a is mounted on the first measurement point and generates an optical path difference on input light according to the pressure generated on the first measurement point, and the second sensor 1000b is mounted on the second measurement point and generates an optical path difference on input light according to the pressure generated on the second measurement point.

The first sensor 1000a is constituted of a total reflection mirror 1001a which is set on a pressure receiving member such as a diaphragm, a translucent mirror 1002a which is opposed to the total reflection mirror 1001a, reflects a part of input light, and transmits the other part of the light, and a lens 1003a which makes parallel light passing through the translucent mirror 1002a and emits the parallel light to the total reflection mirror 1001a.

When a distance between the translucent mirror 1002a and the total reflection mirror 1001a is indicated by $L_a$ and a refractive index of a material (or medium) provided between the translucent mirror 1002a and the total reflection mirror 1001a is indicated by $n_a$, the first sensor 1000a generates an optical path difference of $2n_a L_a$ on input light, for reflection on the translucent mirror 1002a and reflection on the total reflection mirror 1001a.

On the other hand, the second sensor 1000b has a same structure as the first sensor 1000a and is constituted of a total reflection mirror 1001b which is set on a pressure receiving member such as a diaphragm, a translucent mirror 1002b which is opposed to the total reflection mirror 1001b, reflects a part of input light, and transmits the other part of the light, and a lens 1003b which makes parallel light passing through the translucent mirror 1002b and emits the parallel light to the total reflection mirror 1001b.

When a distance between the translucent mirror 1002b and the total reflection mirror 1001b is indicated by $L_b$ and a refractive index of a material provided between the translucent mirror 1002b and the total reflection mirror 1001b is indicated by $n_b$, the second sensor 1000b generates an optical path difference of $2n_b L_b$ on input light, for reflection on the translucent mirror 1002b and reflection on the total reflection mirror 1001b.

For convenience of explanation, it is assumed that "$n_a = n_b$" is obtained and the first sensor 1000a and the second sensor 1000b have "$L_a = L_b$" when a pressure difference is absent between the first measurement point and the second measurement point.

In such a structure, when a pressure difference is absent between a pressure generated on the first measurement point and a pressure generated on the second measurement point, "$L_a = L_b$" is obtained. The material provided between the translucent mirror 1002a and the total reflection mirror 1001a is the same as that between the translucent mirror 1002b and the total reflection mirror 1000b, so that "$n_a=n_b$" is obtained. Thus, an optical path difference $2n_aL_a$ generated by the first sensor 1000a and an optical path difference $2n_bL_b$ generated by the second sensor 1000b are equal to each other.

In contrast, when a pressure difference is present between a pressure generated on the first measurement point and a pressure generated on the second measurement point, the two optical path differences are varied from each other.

The structural example of FIG. 1 according to the present invention makes it possible to measure a difference value between a pressure generated on the first measurement point and a pressure on the second measurement point by detecting a difference between the two optical path differences. In addition to the first sensor 1000a and the second sensor 1000b, the structural example includes a light source 1, an optical fiber 2, an optical fiber 3a, an optical branching coupler 4a, an optical fiber 5, an optical fiber 3b, an optical branching coupler 4b, an optical fiber 6, an optical branching coupler 7, an optical fiber 8a, an optical fiber 8b, a line image sensor 9, and an arithmetic apparatus 10.

The light source 1 is constituted of a so-called white light source such as an LED for emitting low-coherent light. The optical fiber 2 is an optical fiber of a single mode that extracts light emitted from the light source 1. The optical fiber 3a is an optical fiber of a single mode that is provided so as to correspond to the first sensor 1000a and transmits light extracted by the optical fiber 2 to the first sensor 1000a.

The optical branching coupler 4a couples the optical fiber 2 and the optical fiber 3a and splits light reversely transmitted through the optical fiber 3a. The optical fiber 5 is an optical fiber of a single mode that extracts light split by the optical branching coupler 4a. The optical fiber 3b is an optical fiber of a single mode that is provided so as to correspond to the second sensor 1000b and transmits light extracted by the optical fiber 5 to the second sensor 1000b.

The optical branching coupler 4b couples the optical fiber 5 and the optical fiber 3b and splits light reversely transmitted through the optical fiber 3b. The optical fiber 6 is an optical fiber of a single mode that extracts light split by the optical branching coupler 4b. The optical branching coupler 7 splits light extracted by the optical fiber 6 into two.

The optical fiber 8a is an optical fiber of a single mode that extracts one of light beams split by the optical branching coupler 7. The optical fiber 8b is an optical fiber of a single mode that extracts the other light beam split by the optical branching coupler 7. The line image sensor 9 detects interference fringes generated by light emitted from the optical fiber 8a and the optical fiber 8b. The arithmetic apparatus 10 calculates a pressure difference between a pressure generated on the first measurement point and a pressure on the second measurement point based on the positions of interference fringes detected by the line image sensor 9.

Additionally, as will be discussed later, the optical fibers 3a and 3b are not limited to single mode optical fibers and thus multimode optical fibers are also applicable. Accordingly, the optical fibers 2, 5, 6, 8a, and 8b are not limited to single mode optical fibers and thus multimode optical fibers are also applicable.

Figure 2B:
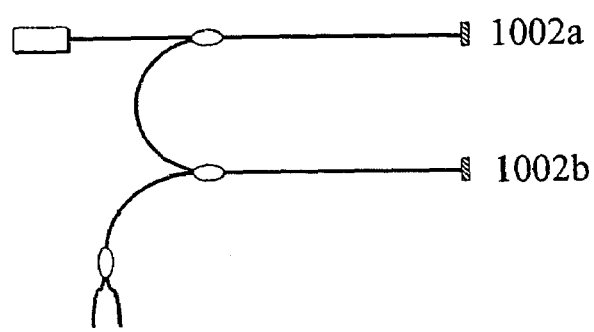
Figure 2C:
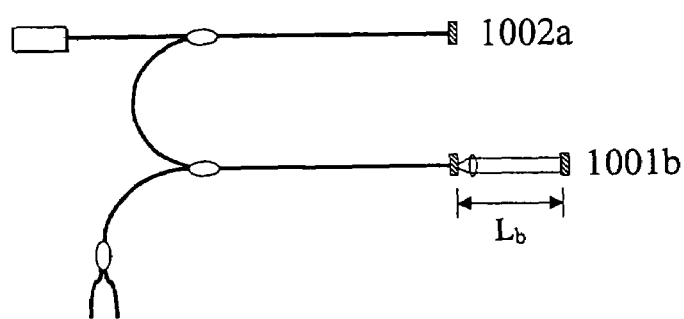
Figure 2D:
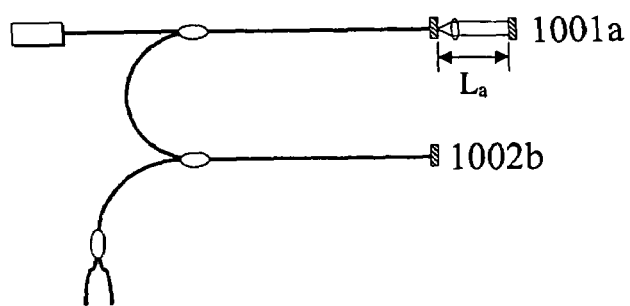

In the present invention structured thus, four kinds of light transmission patterns are available: a light transmission pattern of FIG. 2A where light is reflected on the total reflection mirror 1001a, is reflected on the total reflection mirror 1001b, and is transmitted therefrom, a light transmission pattern of FIG. 2B where light is reflected on the translucent mirror 1002a, is reflected on the translucent mirror 1002b, and is transmitted therefrom, a light transmission pattern of FIG. 2C where light is reflected on the translucent mirror 1002a, is reflected on the total reflection mirror 1001b, and is transmitted therefrom, and a light transmission pattern of FIG. 2D where light is reflected on the total reflection mirror 1001a, is reflected on the translucent mirror 1002b, and is transmitted therefrom.

For convenience of explanation, the transmission pattern of FIG. 2A will be referred to as a first transmission pattern, the transmission pattern of FIG. 2B will be referred to as a second transmission pattern, the transmission pattern of FIG. 2C will be referred to as a third transmission pattern, and the transmission pattern of FIG. 2D will be referred to as a fourth transmission pattern.

Figure 3:
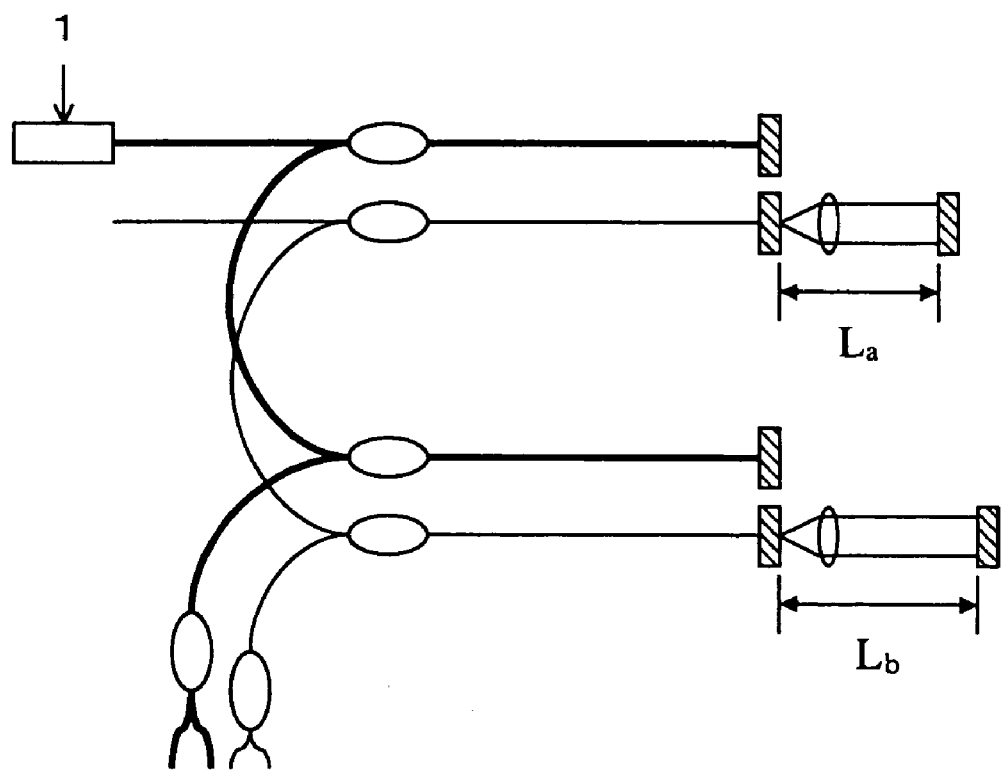
Figure 4A:
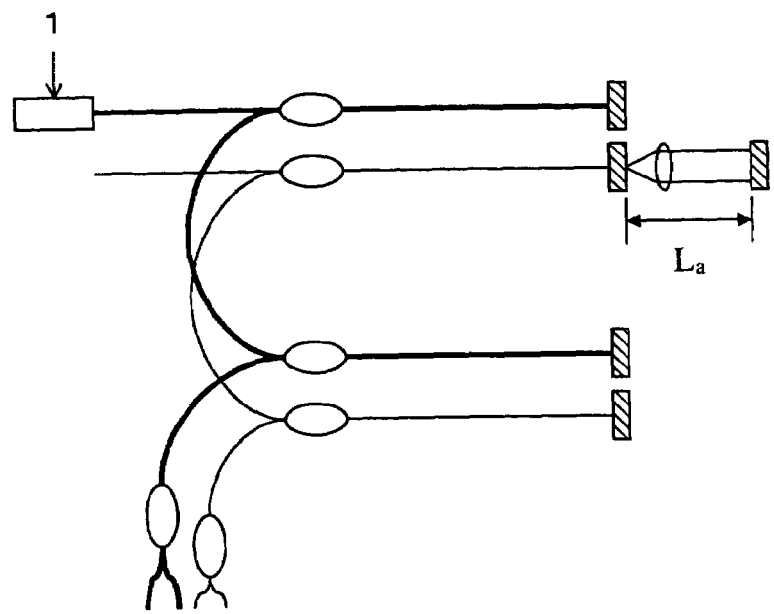
Figure 4B:
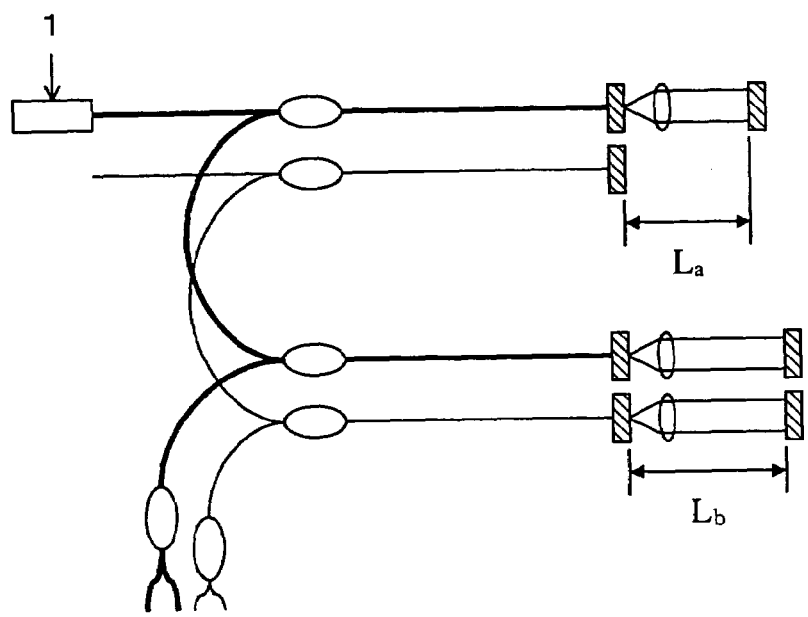
Figure 5A:
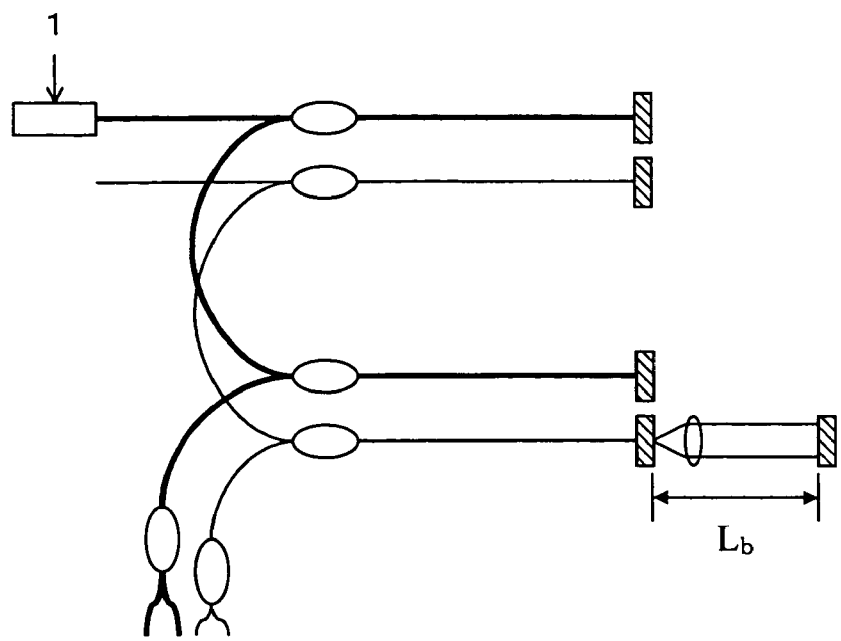
Figure 5B:
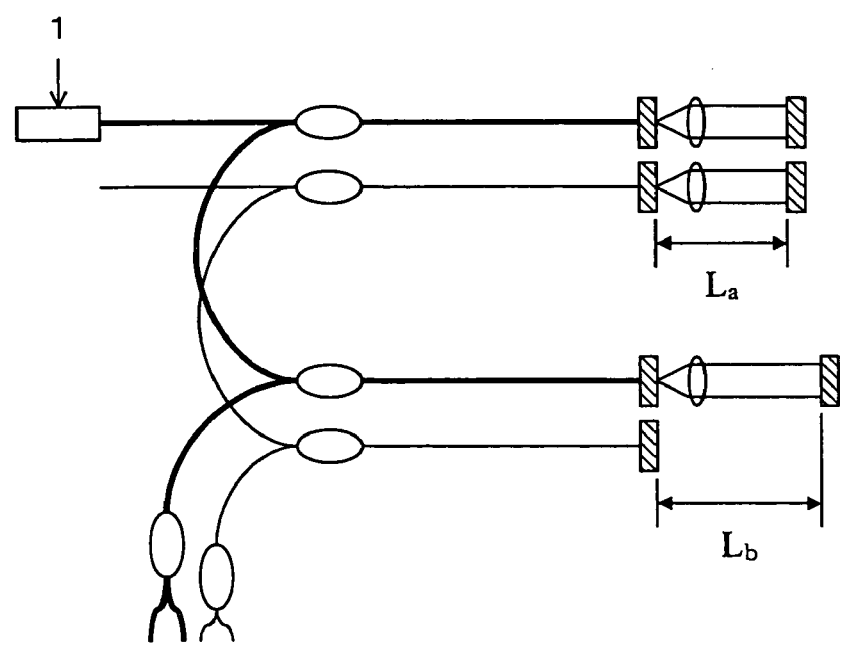
Figure 6:
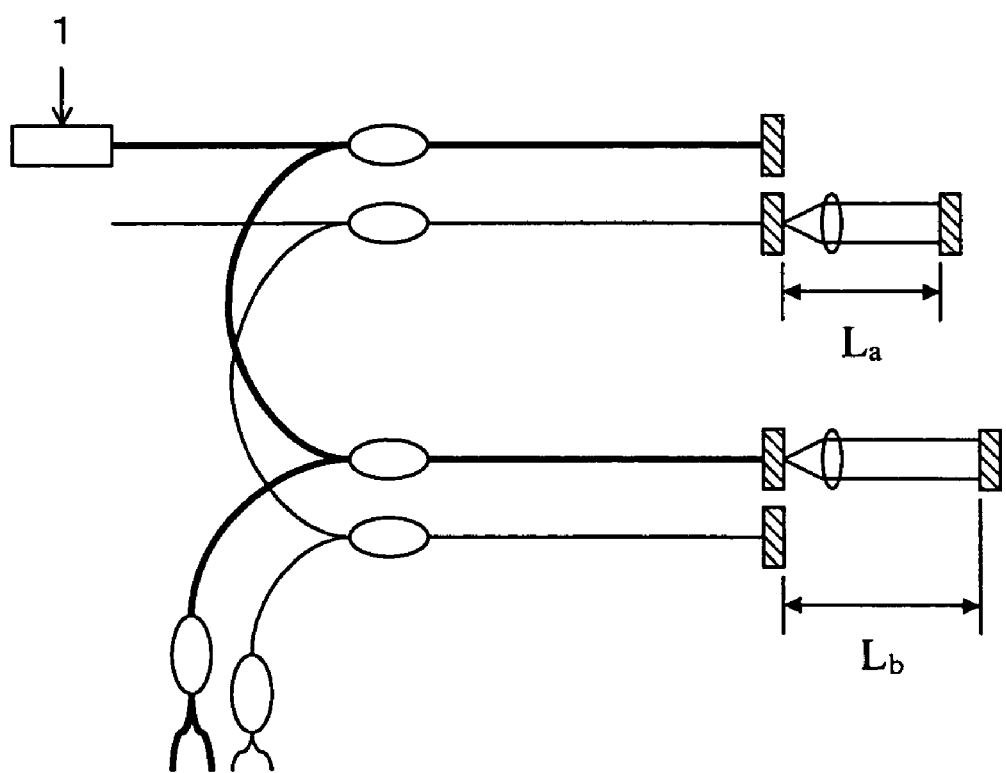

Therefore, light emitted to the line image sensor 9 has four kinds of phase differences:

(I) a phase difference=$k \times 2(n_aL_a+n_bL_b)$ generated by a combination of the first transmission pattern and the second transmission pattern as shown in FIG. 3, (II) a phase difference=$k \times 2n_aL_a$ generated by a combination of the second transmission pattern and the fourth transmission pattern (FIG. 4A) and a combination of the first transmission pattern and the third transmission pattern (FIG. 4B) as shown in FIG. 4, (III) a phase difference=$k \times 2n_bL_b$ generated by a combination of the second transmission pattern and the third transmission pattern (FIG. 5A) and a combination of the first transmission pattern and the fourth transmission pattern (FIG. 5B) as shown in FIG. 5, and (IV) a phase difference=$k \times 2(n_aL_a-n_bL_b)$ generated by a combination of the third transmission pattern and the fourth transmission pattern as shown in FIG. 6.

Figure 7:
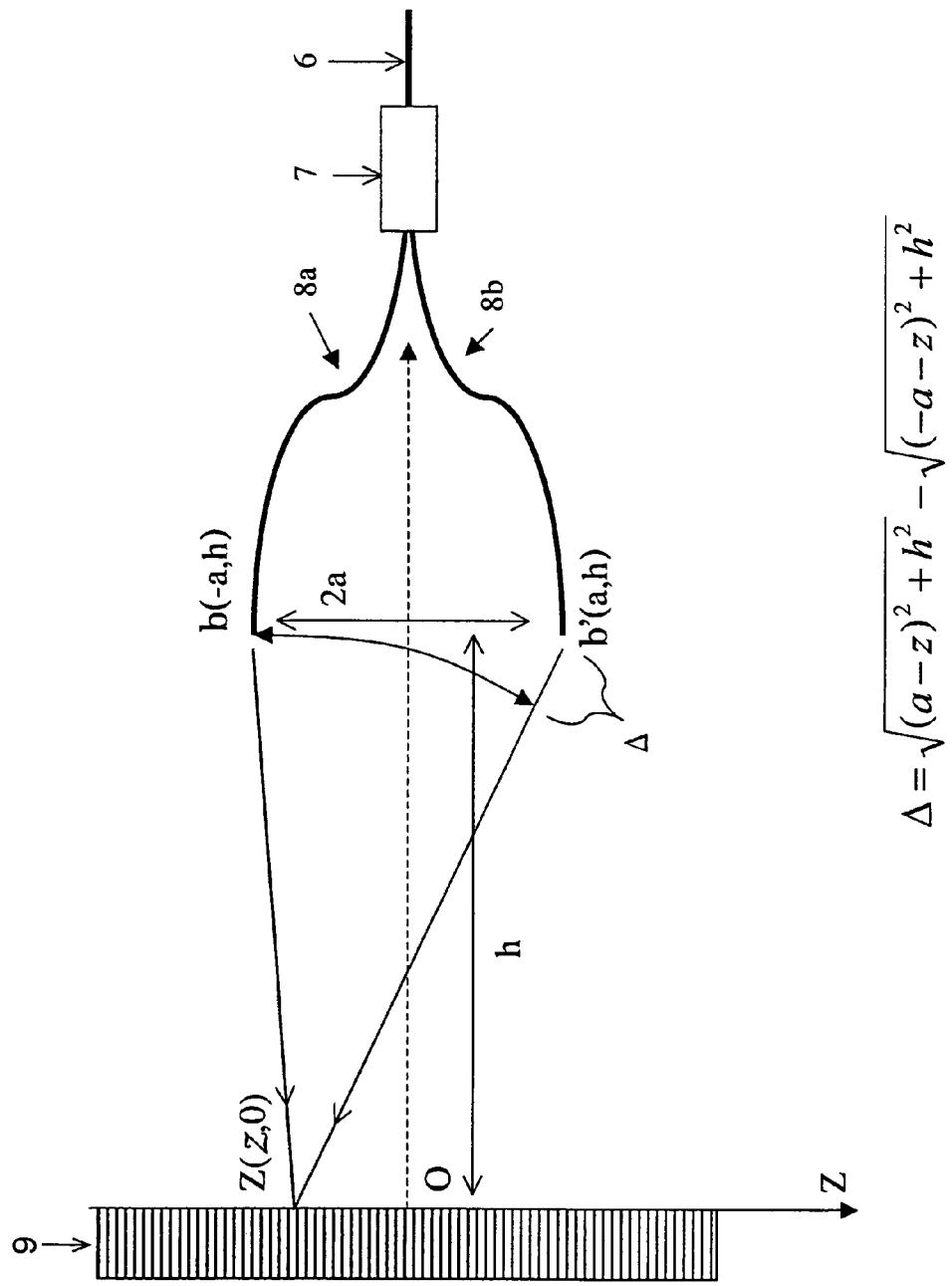
FIG. 7 is an explanatory drawing showing the Young's interferometer.

Meanwhile, between light which is emitted from the optical fiber 8a and reaches a given point (z, 0) on the line image sensor 9, and light which is also emitted from the optical fiber 8b and reaches the given point (z, 0) on the line image sensor 9, an optical path difference $\Delta$ is present which is calculated by the equation of FIG. 7 (the equation of the Young's interferometer).

In this equation, "h" represents a distance between the line image sensor 9 and the ends of the optical fibers 8a and 8b and "2a" represents a distance between the ends of the optical fibers 8a and 8b.

When the following conditions are established:

$$l_c \geq \Delta - 2(n_aL_a+n_bL_b)$$

$$l_c \geq \Delta - 2(n_aL_a-n_bL_b)$$

$$l_c \geq \Delta - 2n_aL_a$$

$$l_c \geq \Delta - 2n_bL_b$$

$$l_c \geq \Delta + 2(n_aL_a+n_bL_b)$$

$$l_c \geq \Delta + 2(n_aL_a-n_bL_b)$$

$$l_c \geq \Delta + 2n_aL_a$$

$$l_c \geq \Delta + 2n_bL_b$$

where $l_c$ represents a coherence length of light emitted from the light source 1, interference fringes generated on the line image sensor 9 have high interference intensity at a place where the following conditions are established:

$$\Delta = 2(n_a L_a + n_b L_b)$$

$$\Delta = 2(n_a L_a - n_b L_b)$$

$$\Delta = 2n_a L_a$$

$$\Delta = 2n_b L_b$$

On the assumption that a beam having a beam intensity of a Gaussian distribution is used, the intensity of interference fringes generated on the line image sensor 9 can be simulated according to the model equation of FIG. 8.

FIG. 9 shows an example of the simulation.

In the simulation of FIG. 9, simulation was performed on (1) interference fringes generated with $L_a=150$ μm and $L_b=150$ μm, (2) interference fringes generated with $L_a=150$ μm and $L_b=200$ μm, and (3) interference fringes generated with $L_a=150$ μm and $L_b=250$ μm on the assumption that h of FIG. 7 is 100 mm, a of FIG. 7 is 10 mm, $n_a$ is 1, which is a refractive index of air, and $n_b$ is 1, which is a refractive index of air.

In FIG. 9, (i) represents a central interference fringe appearing on a fixed position at the center, (ii) represents interference fringes based on an optical path difference factor of $2(n_a L_a - n_b L_b)$, (iii) represents interference fringes based on an optical path difference factor of $2n_a L_a$, (iv) represents interference fringes based on an optical path difference factor of $2n_b L_b$, and (v) represents interference fringes based on an optical path difference factor of $2(n_a L_a + n_b L_b)$.

As is understood from the simulation, the interference fringes appear symmetrically and move in opposite directions as $L_b$ increases.

The optical path difference factor of $2(n_a L_a - n_b L_b)$ represents a pressure difference between a pressure generated on the first measurement point where the first sensor 1000a is disposed and a pressure generated on the second measurement point where the second sensor 1000b is disposed. The pressure difference can be calculated by detecting a movement of the interference fringes generated based on the optical path difference factor of $2(n_a L_a - n_b L_b)$.

Figure 10:
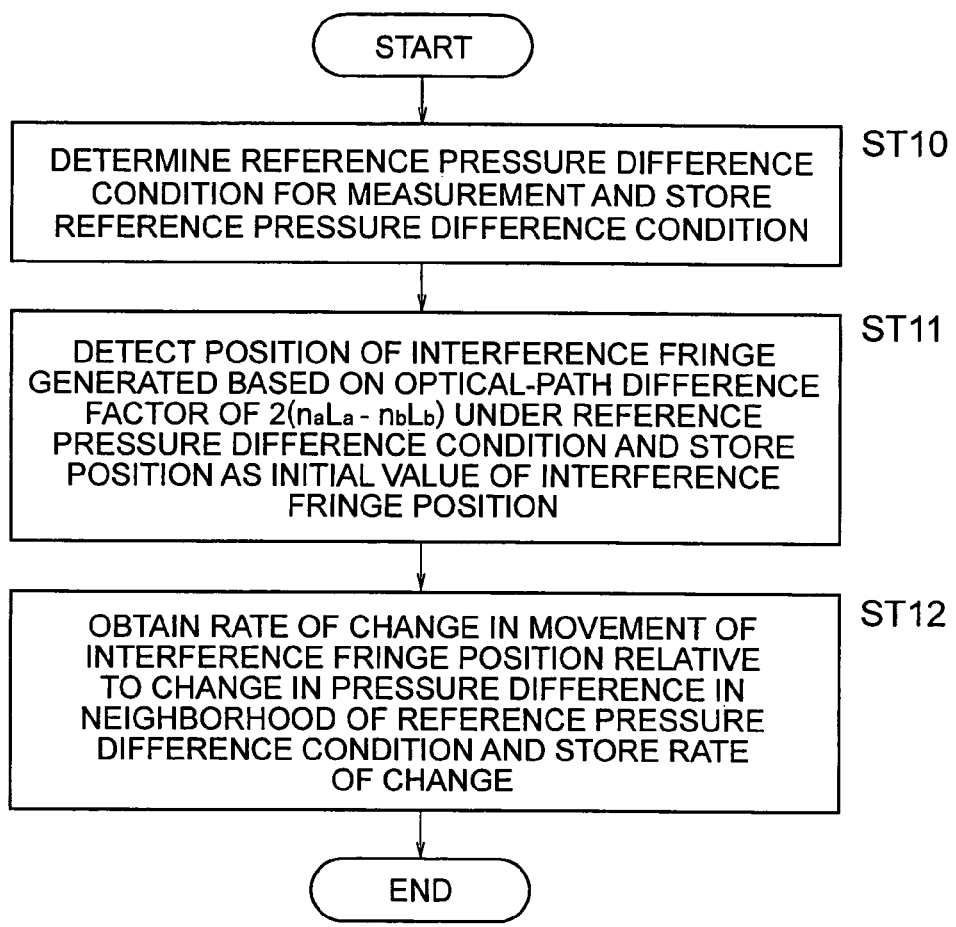
FIGS. 10 and 11 are an explanatory drawing showing the execution processing of an arithmetic unit.
Figure 11:
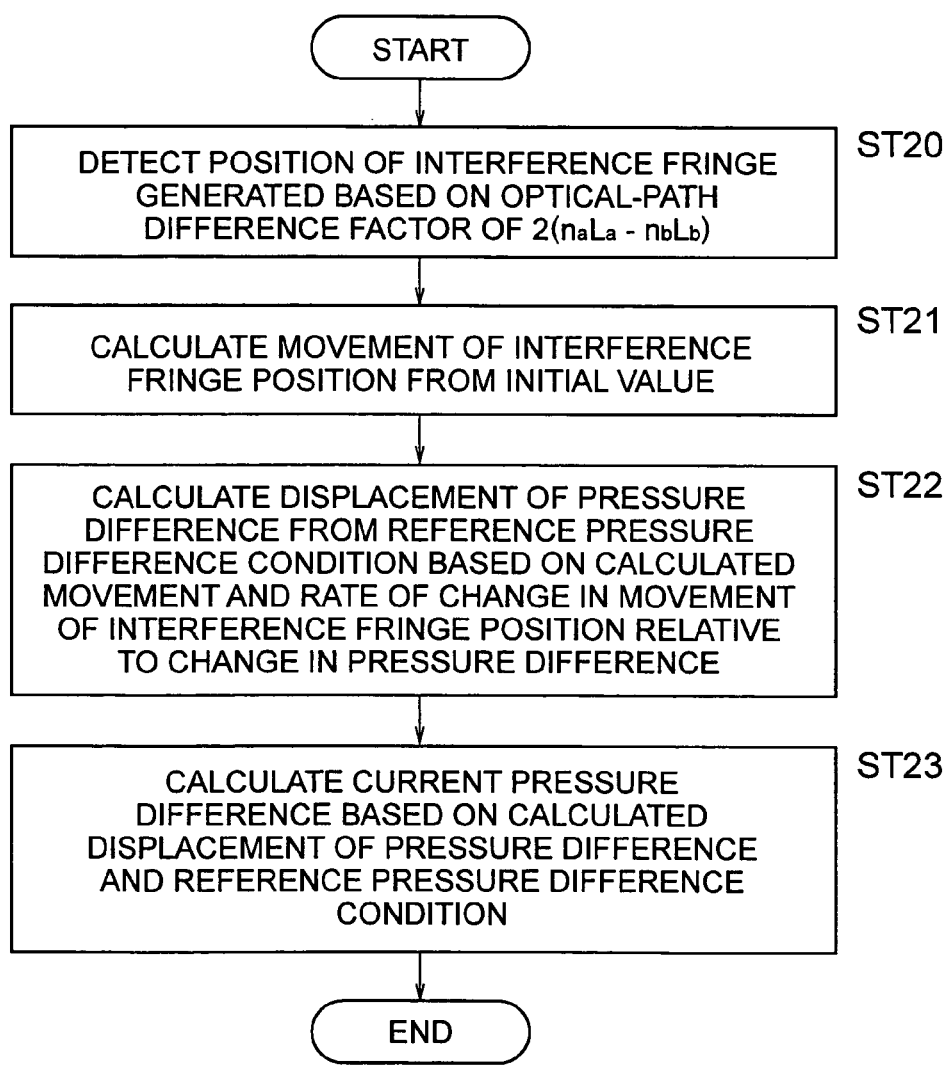

The arithmetic apparatus 10 performs processing to calculate the pressure difference. FIGS. 10 and 11 are flowcharts showing the contents of the processing.

By performing the processing of the flowchart shown in FIG. 10 before actual measurement, the arithmetic apparatus 10 calculates an arithmetic parameter required for actual measurement and stores the parameter in a memory.

Namely, as shown in the flowchart of FIG. 10, the arithmetic apparatus 10 firstly determines a reference pressure difference condition for measurement in step 10 and stores the condition in the memory before actual measurement.

Subsequently, in step 11, the position of an interference fringe based on the optical path difference factor of $2(n_a L_a - n_b L_b)$ is actually detected under the determined reference pressure difference condition and the position is stored in the memory as an initial value of the interference fringe position.

At this point, the interference fringe position is detected by, for example, obtaining a differential value of a pixel value outputted by the line image sensor 9 and detecting the position of the maximum differential value appearing next to the central interference fringe. Further, in order to increase a resolving power, it is preferable to perform detection on symmetrical positions.

When the reference pressure difference condition has a pressure difference of 0, the central interference fringe serves as the initial value of the interference fringe position, so that the processing of step 11 can be omitted.

Subsequently, in step 12, a pressure difference is actually changed in the neighborhood of the determined reference pressure difference condition. A movement at this point is obtained regarding the interference fringe position based on the optical path difference factor of $2(n_a L_a - n_b L_b)$, so that a rate of change in the movement of the interference fringe is obtained relative to a change in pressure difference. Then, the rate of change is stored in the memory.

On the other hand, when a measurement is actually performed, the arithmetic apparatus 10 measures a pressure difference by performing the processing of the flowchart shown in FIG. 11.

Namely, as shown in the flowchart of FIG. 11, when a measurement is actually performed, the arithmetic apparatus 10 first detects, in step 20, the position of interference fringe generated based on the optical path difference factor of $2(n_a L_a - n_b L_b)$.

At this point, the interference fringe position is detected by obtaining a differential value of a pixel value outputted by the line image sensor 9 and detecting the position of the maximum differential value appearing next to the central interference fringe. Further, in order to increase a resolving power, it is preferable to perform detection on symmetrical positions.

Subsequently, in step 21, a difference value is calculated between the detected interference fringe position and the initial value of the interference fringe position that is stored in the memory, so that a movement from the initial value of the interference fringe position is calculated.

Then, in step 22, the calculated movement is divided by the rate of change in the movement of the interference fringe position relative to a change in pressure difference, the rate of change having been stored in the memory, so that a displacement of a pressure difference from the reference pressure difference condition, which is stored in the memory, is calculated.

Subsequently, in step 23, the calculated displacement of the pressure difference and the reference pressure difference condition stored in the memory are added to each other, so that a current pressure difference is calculated and is outputted as a measurement result.

In this way, the arithmetic apparatus 10 detects a movement of the interference fringe generated based on the optical path difference factor of $2(n_a L_a - n_b L_b)$, calculates a pressure difference based on the movement, and outputs the pressure difference.

In the above-described structural example, it is assumed that the first sensor 1000a and the second sensor 1000b are used which have "$n_a L_a = n_b L_b$" when a pressure difference is absent between the first measurement point and the second measurement point.

In this case, as is understood from the simulation results of FIG. 9, the interference fringes based on the optical path difference factor of $2(n_a L_a - n_b L_b)$ indicating a pressure difference between a pressure generated on the first measurement point and a pressure generated on the second measurement point are moved so as to separate from the central interference fringe, starting from the position of the central interference fringe based on the Young's interferometer, as an absolute value of the pressure difference increases.

The present invention is not limited to the use of the first sensor 1000a and the second sensor 1000b that are structured thus. When a pressure difference is absent between the first measurement point and the second measurement point, the first sensor 1000a and second sensor 1000b with "$n_a L_a \neq n_b L_b$" are also applicable. In this case, a negative pressure can be measured.

Namely, in the case where a pressure difference is absent between the first measurement point and the second measurement point, when the first sensor 1000a and the second sensor 1000b with "$n_a L_a \neq n_b L_b$" are used, the interference fringes based on the optical path difference factor of $2(n_a L_a - n_b L_b)$ are moved along a direction indicated by the code of the factor $2(n_a L_a - n_b L_b)$, starting from an interference fringe position other than the central interference fringe. Hence, it is possible to measure a negative pressure which reverses a pressure difference between a pressure generated on the first measurement point and a pressure generated on the second measurement point.

Figure 12A:
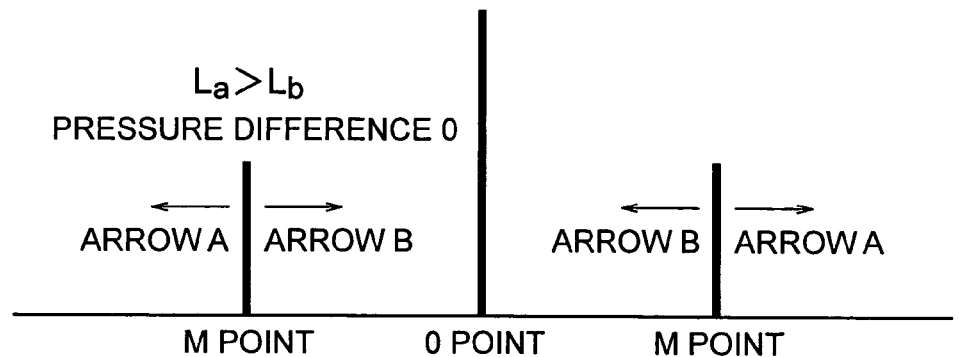
FIGS. 12A and 12B are explanatory drawings showing the movement of interference fringes.

For example, on the assumption that "$n_a = n_b$" and "$L_a > L_b$" are obtained, as shown in FIG. 12A, when the position of the central interference fringe is indicated by O point, a movement is made in the direction of an arrow A as a value of "$L_a - L_b$" increases and a movement is made in the direction of an arrow B as a value of "$L_a - L_b$" decreases, starting from an interference fringe position on M point other than the central interference fringe. Hence, it is possible to measure a negative pressure which reverses a pressure difference between a pressure generated on the first measurement point and a pressure generated on the second measurement point.

Figure 12B:
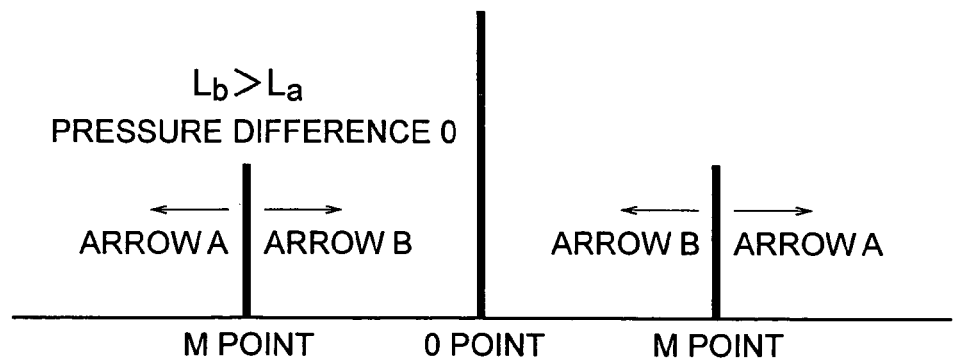

Further, on the assumption that "$n_a = n_b$" and "$L_b > L_a$" are obtained, as shown in FIG. 12B, when the position of the central interference fringe is indicated by O point, a movement is made in the direction of an arrow A as a value of "$L_b - L_a$" increases and a movement is made in the direction of an arrow B as a value of "$L_b - L_a$" decreases, starting from an interference fringe position on M point other than the central interference fringe. Hence, it is possible to measure a negative pressure which reverses a pressure difference between a pressure generated on the first measurement point and a pressure generated on the second measurement point.

As described above, the arithmetic apparatus 10 detects a difference value between pressures by using the method of setting the reference pressure difference condition, detecting the initial value of the interference fringe under the reference pressure difference condition, and detecting a displacement from the initial value. Hence, regarding the movement of the interference fringes of FIG. 12, a pressure difference value can be measured by detecting the movement.

Further, in the above described structural example, although it was assumed that single mode optical fibers are used as the optical fibers 3a and 3b, multimode optical fibers are also applicable.

Since a multimode optical fiber has larger core diameter than that of a single mode optical fiber, when multimode optical fibers are used as the optical fibers 3a and 3b, the following advantage is obtained: light returning from the first sensor 1000a having a Fabry-Perot structure is efficiently returned to the core of the optical fiber 3a, and light returning from the second sensor 1000b having a Fabry-Perot structure is efficiently returned to the core of the optical fiber 3b.

Figure 13:
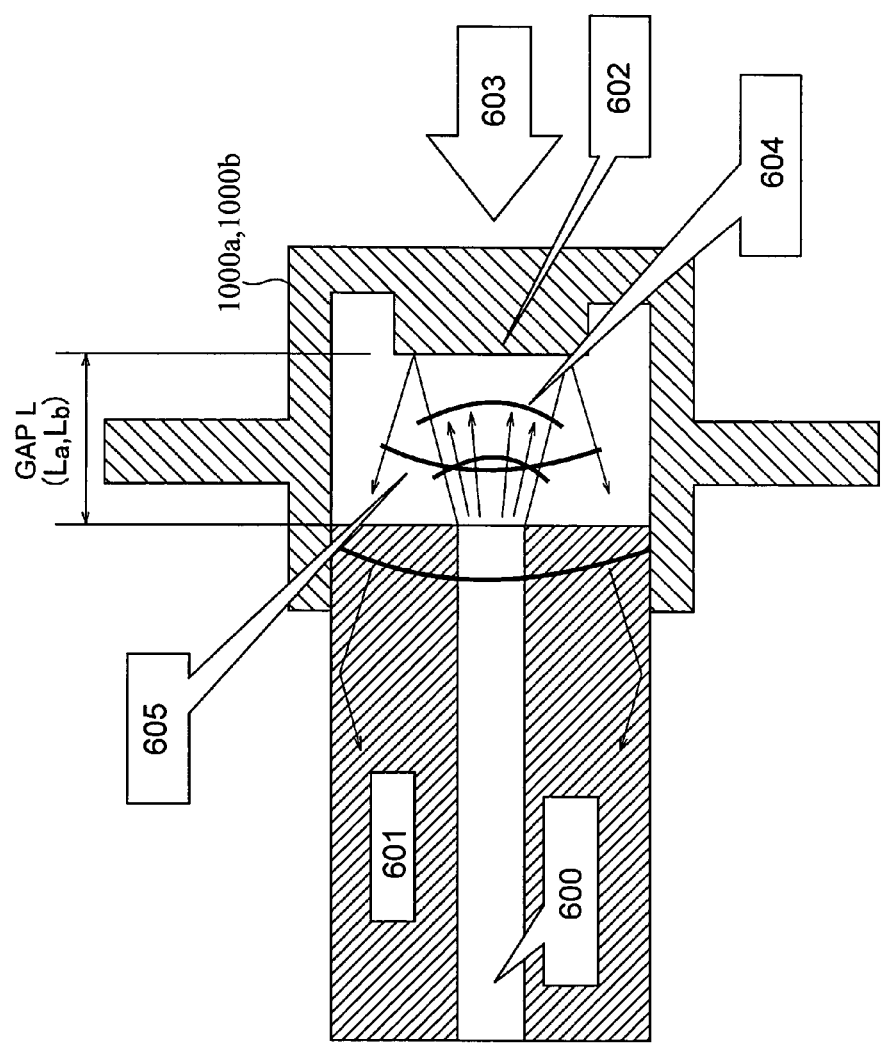
FIG. 13 is an explanatory drawing showing a sensor having a Fabry-Perot structure.

Namely, as shown in FIG. 13, light returning from the first sensor 1000a and the second sensor 1000b of Fabry-Perot structures is partly returned to the clad of the optical fiber 3a and the optical fiber 3b. When the optical fiber 3a and the optical fiber 3b have large core diameters, since a ratio of light returning to the clad is reduced, it is possible to obtain an advantage of efficient return of light from the first sensor 1000a and the second sensor 1000b to the cores of the optical fiber 3a and the optical fiber 3b.

In FIG. 13, reference numeral 600 denotes the core of an optical fiber, reference numeral 601 denotes the clad of the optical fiber, reference numeral 602 denotes a reflection mirror changed by an external force 603, reference numeral 604 denotes light emitted from the core 600, and reference numeral 605 denotes light reflected from the reflection mirror 602.

Meanwhile, as is understood from FIG. 8 showing the model equation of the intensity of interference fringes, an interference fringe generated on the line image sensor 9 has a width determined by a coherence length $l_c$ according to a damping term of $\gamma(A)$, which has a damping coefficient determined by the coherence length $l_c$.

Therefore, unless the interference fringe based on the optical path difference factor of $2(n_a L_a - n_b L_b)$ goes out of the width of the central interference fringe generated based on the Young's interferometer, it is not possible to detect the movement of the interference fringe generated based on the optical path difference factor of $2(n_a L_a - n_b L_b)$.

Thus, it is necessary to increase the lengths of $L_a$ and $L_b$. Also in this case, it is necessary to increase the core diameters of the optical fiber 3a and the optical fiber 3b to efficiently return light to the cores of the optical fiber 3a and the optical fiber 3b.

In this way, when multimode optical fibers are used as the optical fibers 3a and 3b, the following advantage is achieved: light returned from the first sensor 1000a can be efficiently returned to the core of the optical fiber 3a and light returned from the second sensor 1000b can be efficiently returned to the core of the optical fiber 3b. Hence, the lengths of the $L_a$ and $L_b$ can be increased and thus it is possible to achieve an advantage of correct measurement on the movement of interference fringe generated based on the optical path difference factor of $2(n_a L_a - n_b L_b)$.

Subsequently, the following will describe the results of the simulation performed on a light parameter loss based on gap lengths L ($L_a$, $L_b$) of the first sensor 1000a and the second sensor 1000b.

This simulation was performed using a commercial software package implementing Beam Propagation Method for solving Maxwell's electromagnetic equation. An optical fiber had an external diameter of 100 μm, the core of the optical fiber had a refractive index of 1.45, the clad of the optical fiber had a refractive index of 1.447, the light had a wavelength of 0.84 μm, a medium in the gap length L was an air layer, the core diameter φ of the optical fiber was 10/20/40/60 μm, and the gap lengths L of the first sensor 1000a and the second sensor 1000b were 0.5/1/2.5/5/10/25/50/100 μm.

Figure 14:
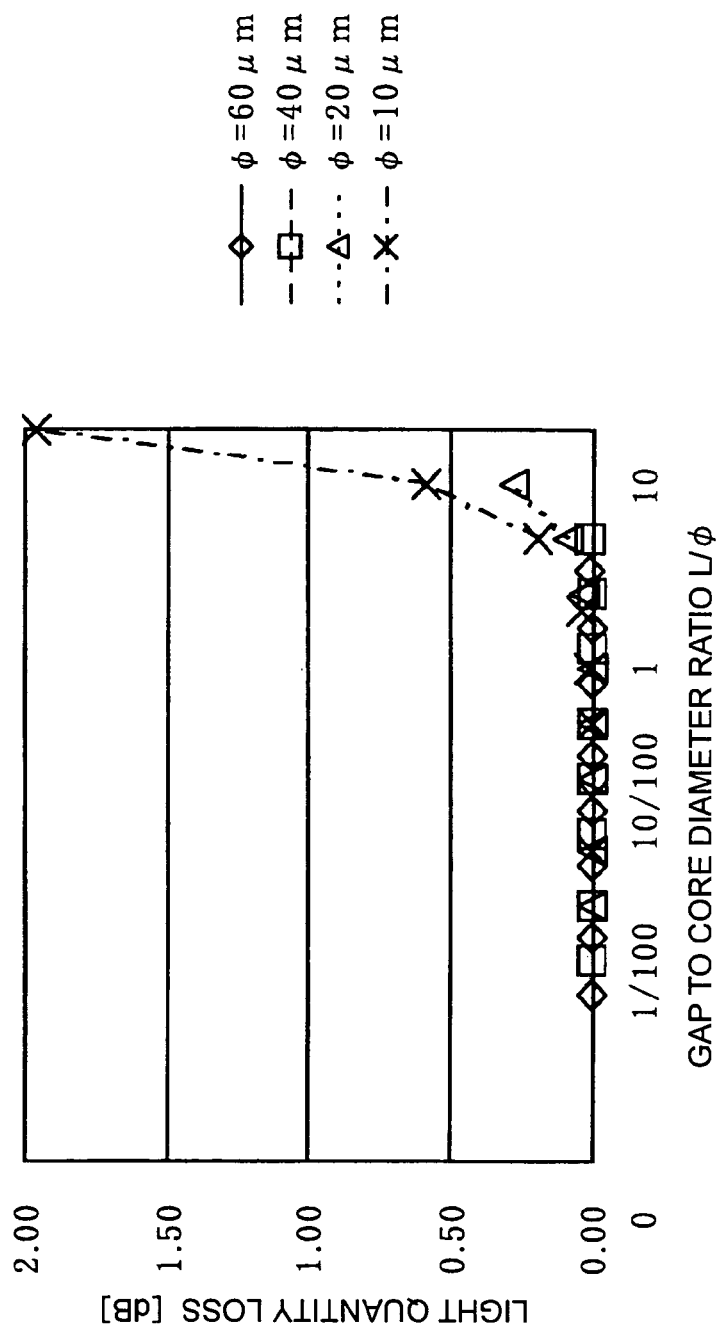
FIGS. 14, 15, and 16 are explanatory drawings showing simulation results on a light parameter loss of the sensor having the Fabry-Perot structure.
Figure 15:
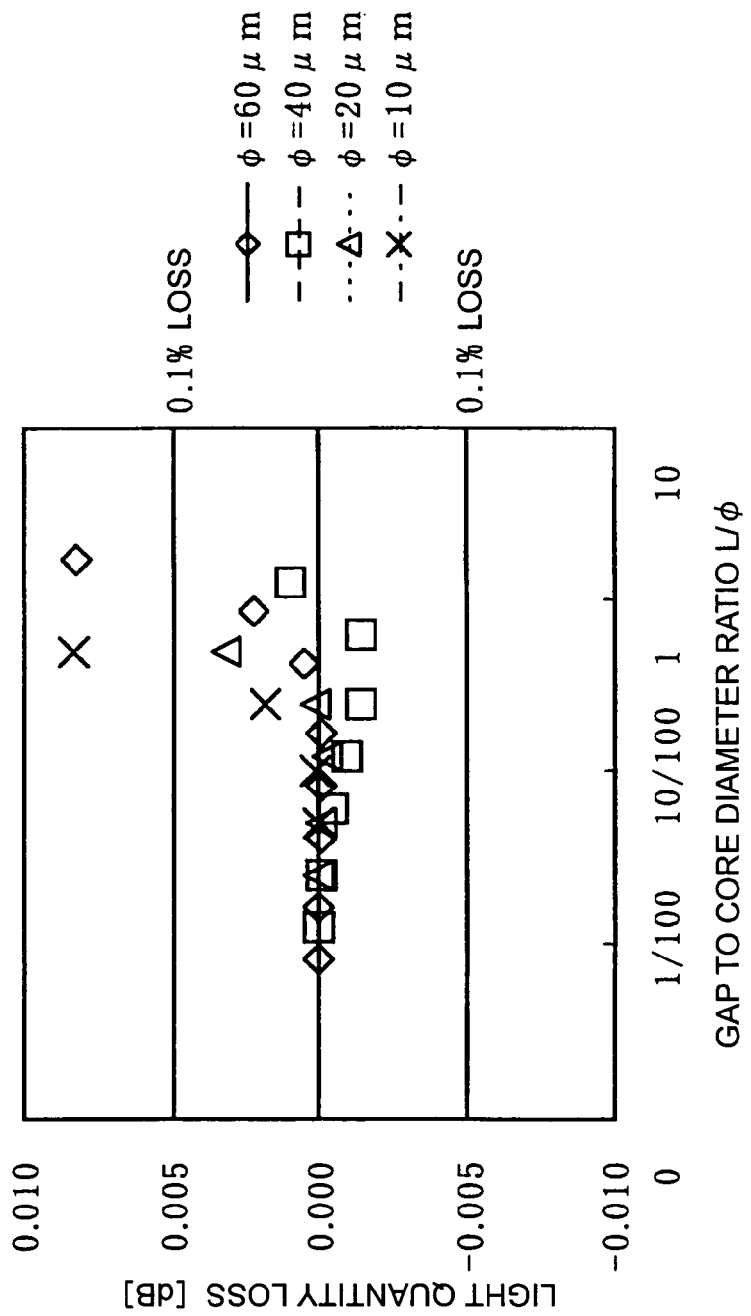
Figure 16:
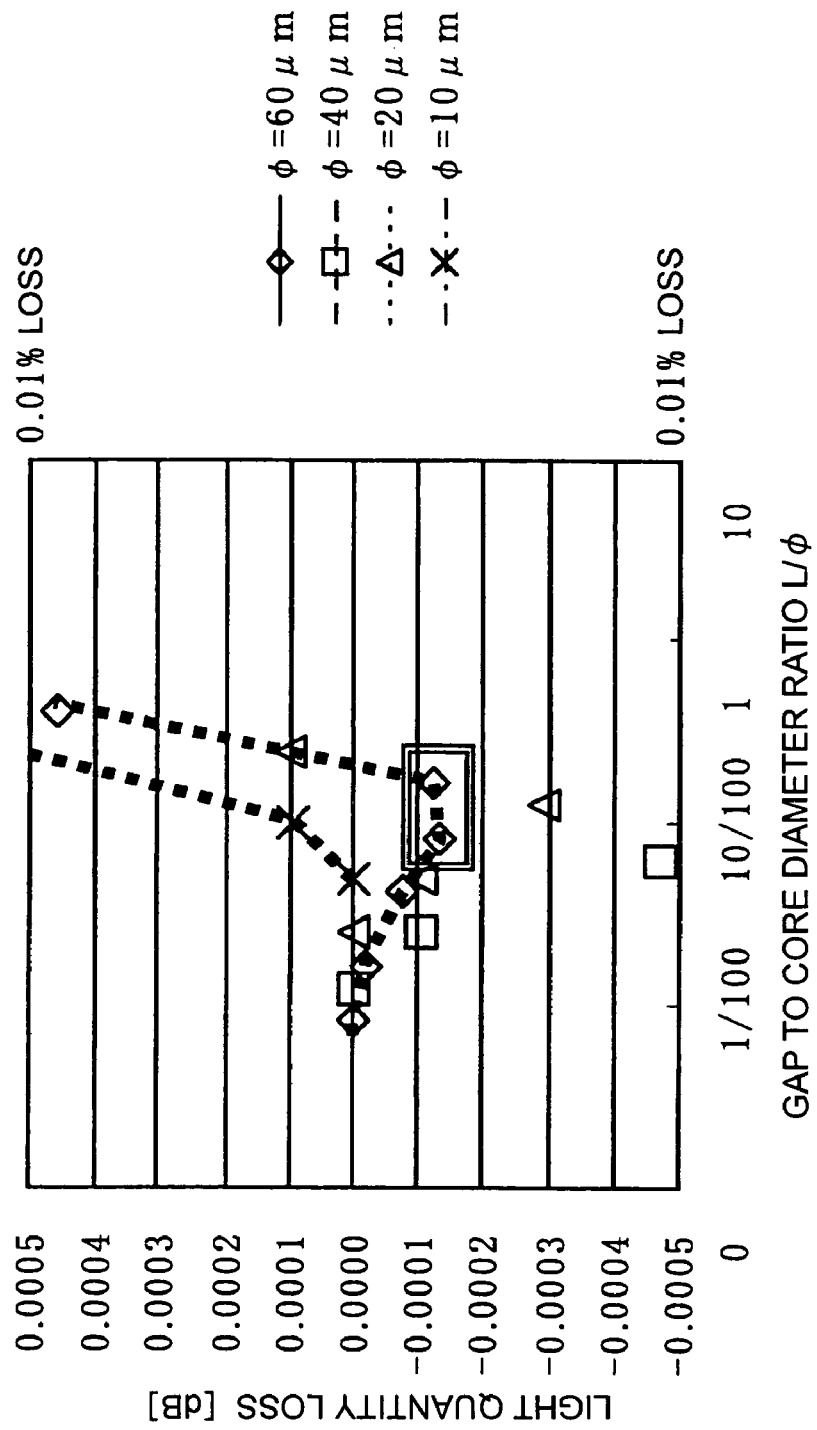

FIGS. 14 to 16 show the simulation results. FIG. 15 is a partially enlarged view showing the simulation results of FIG. 14, and FIG. 16 is a partially enlarged view showing the simulation results of FIG. 15.

In FIGS. 14 to 16, the horizontal axes represent a ratio (L/φ) of a gap length L to a core diameter φ and the vertical axes represents a light parameter loss (%) determined by a ratio of a parameter of reflected light to a parameter of incident light at a place where reverse propagation proceeds for 1 mm in the optical fiber.

As is understood from the simulation results of FIG. 15, when a light parameter loss of 0.1% is used as an index, since the upper limit value of a ratio (L/φ) of the gap length L to the core diameter φ is about 0.5 for the core diameter φ of 10 μm, the upper limit value of the gap length L is about 5 μm.

Further, when the core diameter φ is 20 μm, since the upper limit value of a ratio (L/φ) of the gap length L to the core diameter φ is about 0.8, the upper limit value of the gap length L is found to be about 16 μm.

Moreover, when the core diameter φ is 40 μm, since the upper limit value of a ratio (L/φ) of the gap length L to the core diameter φ is about 1.2, the upper limit value of the gap length L is found to be about 48 μm.

Besides, when the core diameter φ is 60 μm, since the upper limit value of a ratio (L/φ) of the gap length L to the core diameter φ is about 1.5, the upper limit value of the gap length L is found to be about 90 μm.

Additionally, as is understood from the simulation results of FIG. 16, when a light parameter loss of 0.01% is used as an index, since the upper limit value of a ratio (L/φ) of the gap length L to the core diameter φ is about 0.2 for the core diameter φ of 10 μm, the upper limit value of the gap length L is found to be about 2 μm.

Further, when the core diameter φ is 20 μm, since the upper limit value of a ratio (L/φ) of the gap length L to the core diameter φ is about 0.2, the upper limit value of the gap length L is found to be about 4 μm.

Moreover, when the core diameter φ is 40 μm, since the upper limit value of a ratio (L/φ) of the gap length L to the core diameter φ is about 0.4, the upper limit value of the gap length L is about 16 μm.

Besides, when the core diameter φ is 60 μm, since the upper limit value of a ratio (L/φ) of the gap length L to the core diameter φ is about 0.5, the upper limit value of the gap length L is about 30 μm.

As described above, in view of a light parameter loss, it is understood that when the core diameters of the optical fiber 3a and the optical fiber 3b are determined, the gap lengths L of the first sensor 1000a and the second sensor 1000b have upper limit values.

For example, in the case that a commercial single mode optical fiber has the core diameter φ of 12.5 μm and that a light parameter loss is reduced to 0.1%, since the upper limit value of a ratio (L/φ) of the gap length L to the core diameter φ is about 0.6, the gap length L needs to be set at 7.5 μm or smaller. Further, in the case that a commercial multimode optical fiber has the core diameter φ of 50 μm and that a light parameter loss is reduced to 0.1%, since the upper limit value of a ratio (L/φ) of the gap length L to the core diameter φ is about 1.35, the gap length L needs to be set at 67 μm or smaller.

However, it is needless to say that when an increase in light parameter loss is tolerated, the upper limit value is set larger than the above values.

Besides, it is needless to say that this condition is strictly based on the first sensor 1000a and the second sensor 1000b of Fabry-Perot structures, and another structure having a pressure receiving part constituted of an optical waveguide is not limited to these upper limit values.

As described above, when the gap lengths L ($L_a$, $L_b$) of the first sensor 1000a and the second sensor 1000b are increased, since interference fringe based on the optical path difference factor of $2(n_a L_a - n_b L_b)$ goes far out of the width of the central interference fringe generated based on the Young's interferometer, it is possible to correctly detect the movement of the interference fringe with advantage.

Figure 17A:
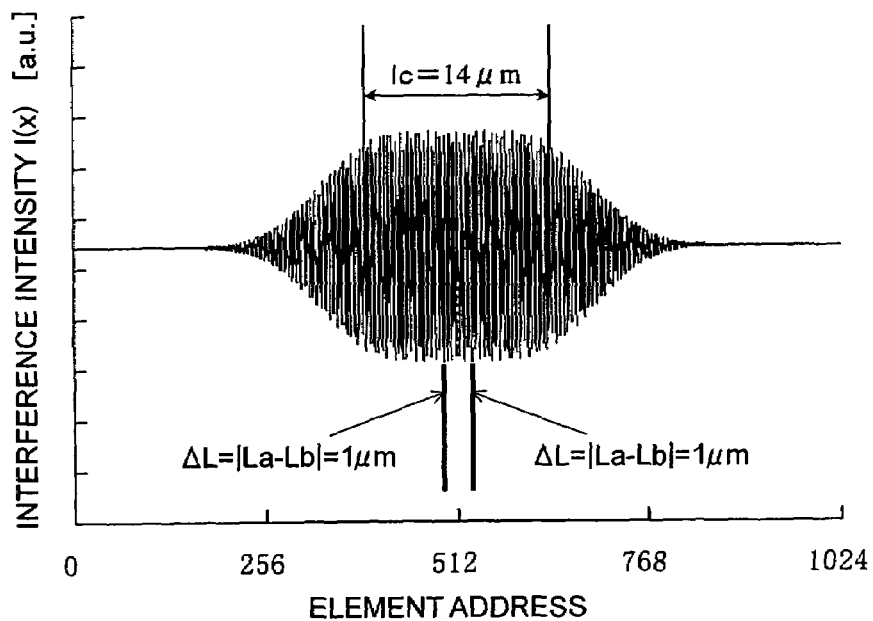
FIGS. 17A, 17B, and 18 are explanatory drawings showing simulation results on the generation of interference fringes.

For example, the simulation results of FIG. 17A show simulation results obtained based on the model equation of FIG. 8, on the assumption that single mode optical fibers are used with "$L_a$=6 μm, $L_b$=5 μm". In this case, since $L_a$ and $L_b$ are small, the interference fringe based on the optical path difference factor of $2(n_a L_a - n_b L_b)$ enters the width of the central interference fringe generated based on the Young's interferometer. Thus, it is substantially impossible to detect the movement of the interference fringe.

Figure 17B:
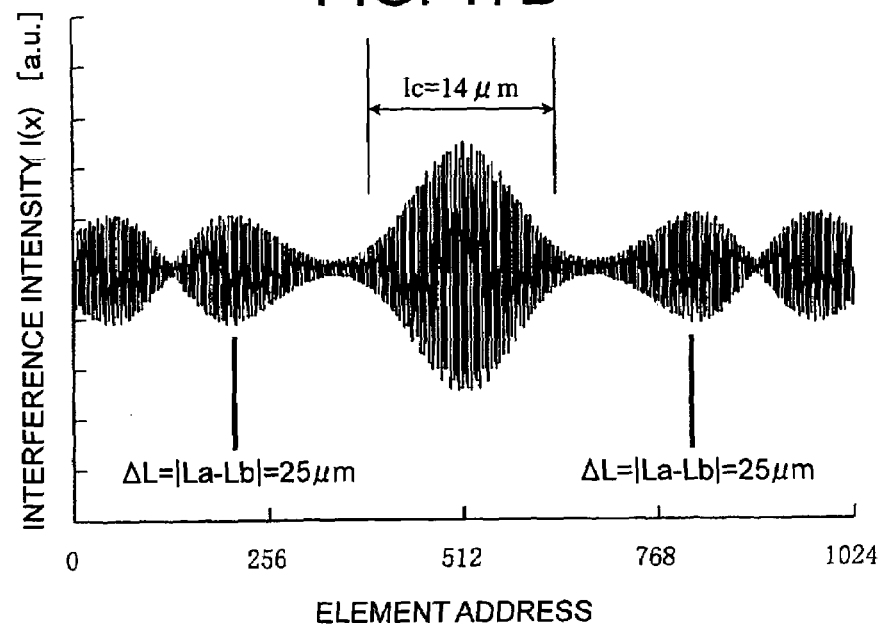

In contrast, the simulation results of FIG. 17B show simulation results obtained based on the model equation of FIG. 8, on the assumption that multimode optical fibers are used with "$L_a$=60 μm, $L_b$=35 μm". In this case, since $L_a$ and $L_b$ are large, the interference fringe based on the optical path difference factor of $2(n_a L_a - n_b L_b)$ goes out of the width of the central interference fringe generated based on the Young's interferometer. Thus, it is possible to detect the movement of the interference fringe.

The simulation results shown in FIGS. 17A and 17B were obtained with h=100 mm, a=1.0 mm, a center wavelength $\lambda_0$=850 nm, a luminescence band half width Δλ=22 nm, a coherence length $l_c$ ($0.44 \times \lambda_0^2/\Delta\lambda$)=14 μm, and a sensor element length=8 mm.

Additionally, the coherence length $l_c$ in FIGS. 17A and 17B should not be compared with the sensor element length but just indicates a width of an interference fringe determined by the coherence length $l_c$.

Although these simulation results apparently conclude that single mode optical fibers are not applicable, this is not true.

Figure 18:
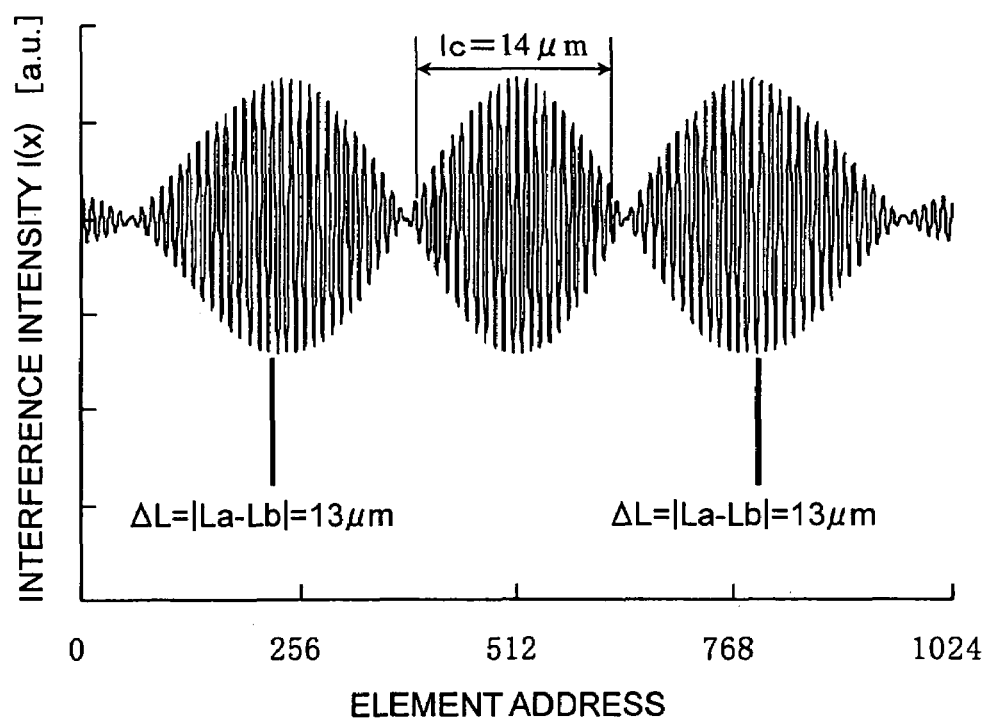

For example, the simulation results of FIG. 18 show simulation results obtained based on the model equation of FIG. 8, on the assumption that single mode optical fibers are used with "$L_a$=20 μm, $L_b$=7 μm". In this case, the interference fringe based on the optical path difference factor of $2(n_a L_a - n_b L_b)$ goes out of the width of the central interference fringe generated based on the Young's interferometer. Thus, it is possible to detect the movement of the interference fringe.

Here, the simulation results of FIG. 18 are same to those of FIGS. 17A and 17B except for the conditions of $L_a$ and $L_b$.

As is understood from the simulation results of FIG. 18, it is not always necessary to use multimode optical fibers and thus single mode optical fibers are also applicable.

The following will describe the detail of constituent elements constituting the present invention shown in FIG. 1.

(A) Structure of the Light Source 1

The light source 1 is a white light source for emitting low-coherent light. This is because high-coherent light attenuates less the central interference fringe and thus the width of the fringe is increased, so that it becomes impossible to correctly detect the position of an interference fringe generated based on the optical path difference factor of $2(n_a L_a - n_b L_b)$.

FIGS. 19 to 22 show simulation results for examining the above fact.

The simulations were performed while h of FIG. 7 was set at 100 mm, a of FIG. 7 was set at 10 mm, $n_a$ was set at 1 which is a refractive index of air, $n_b$ was set at 1 which is a refractive index of air, and the luminous wavelength of the light source 1 was set at 850 nm with $L_a$=50 μm, $L_b$=150 μm, 200 μm, and 250 μm. The simulations were performed on (1) an interference fringe generated when the light source 1 has a luminescence band half width of 0.44 nm, (2) an interference fringe generated when the light source 1 has a luminescence band half width of 2.2 nm, (3) an interference fringe generated when the light source 1 has a luminescence band half width of 22 nm, and (4) an interference fringe generated when the light source 1 has a luminescence band half width of 44 nm.

Figure 19:
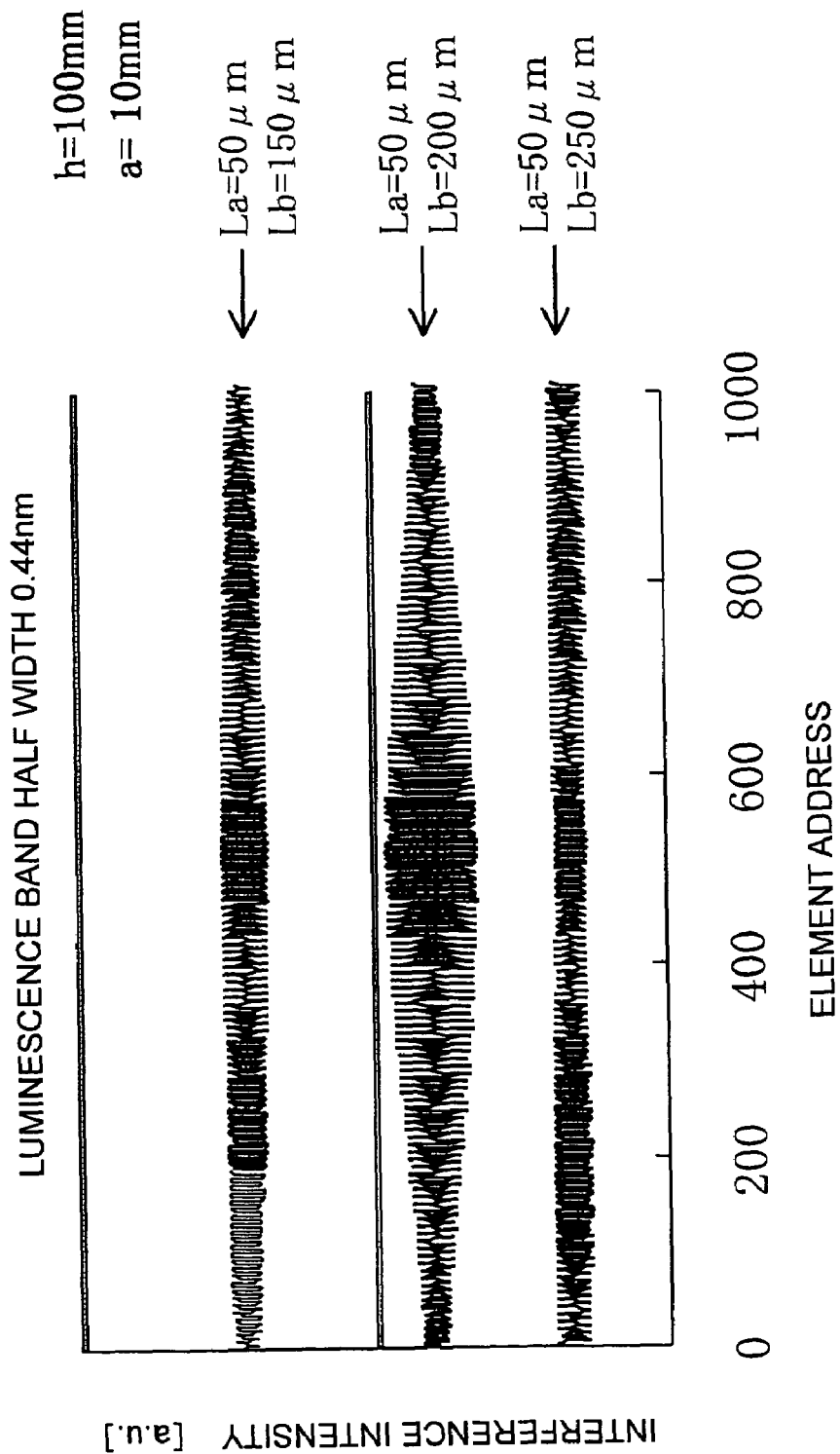
FIGS. 19, 20, 21, and 22 are explanatory drawings showing simulation results on the coherency of a light source.
Figure 20:
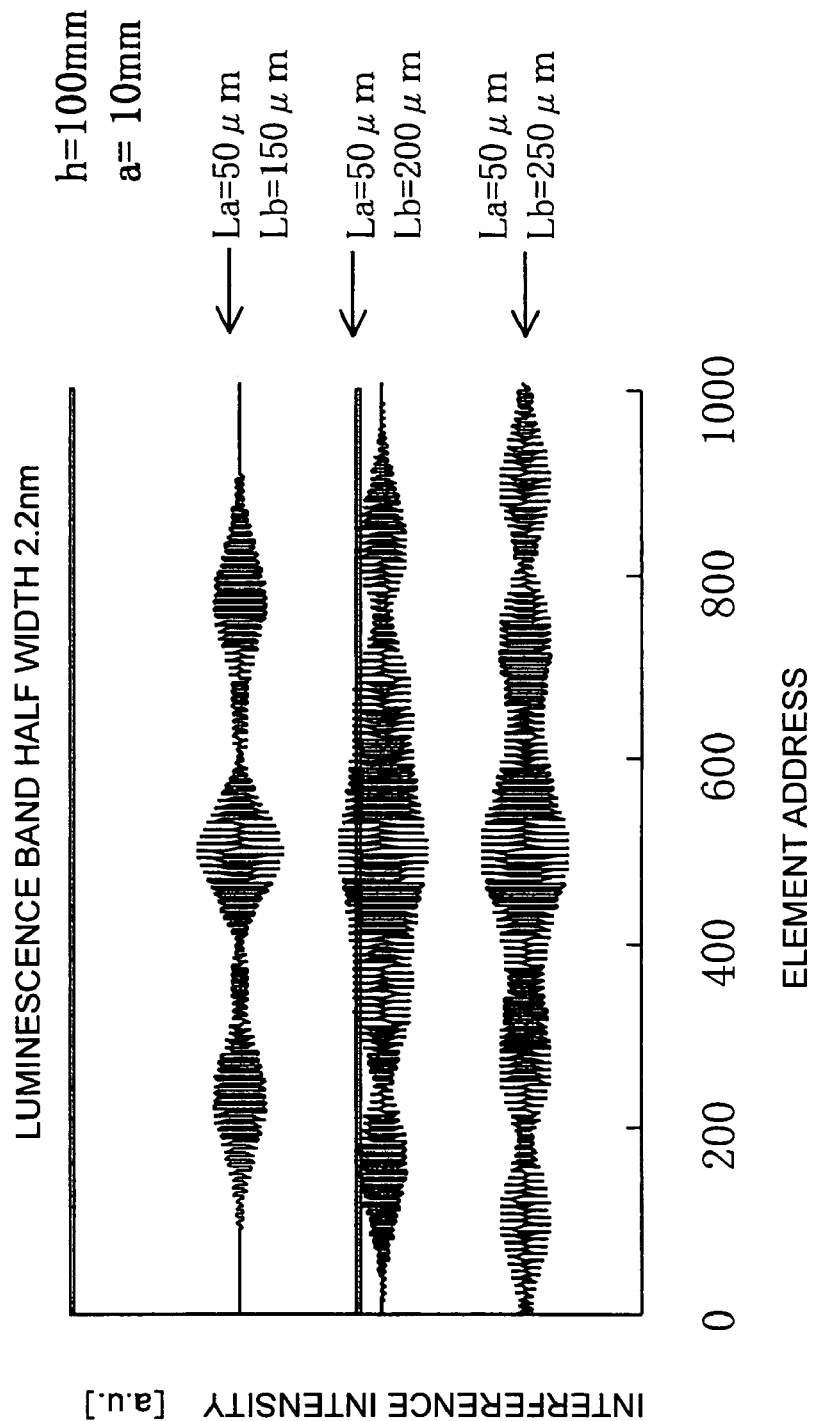
Figure 21:
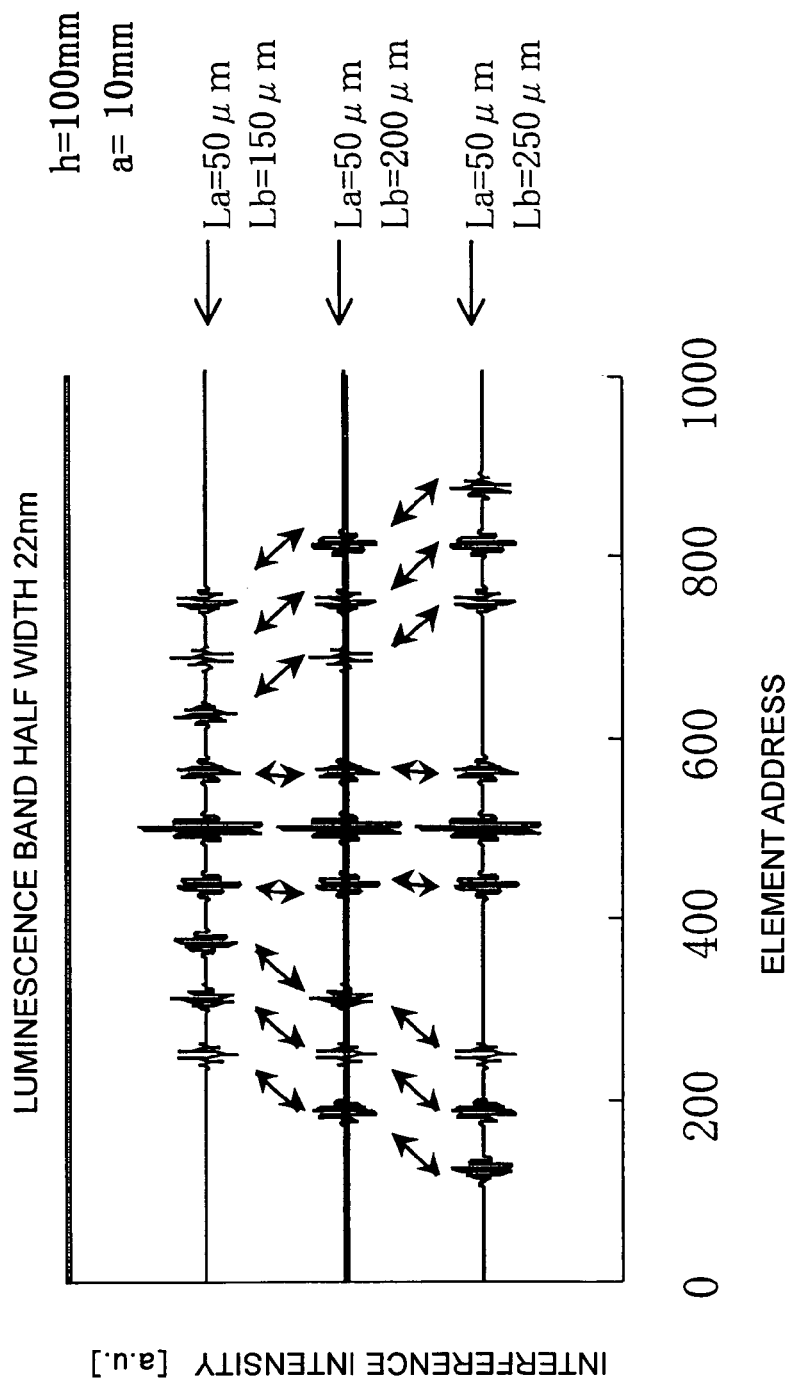
Figure 22:
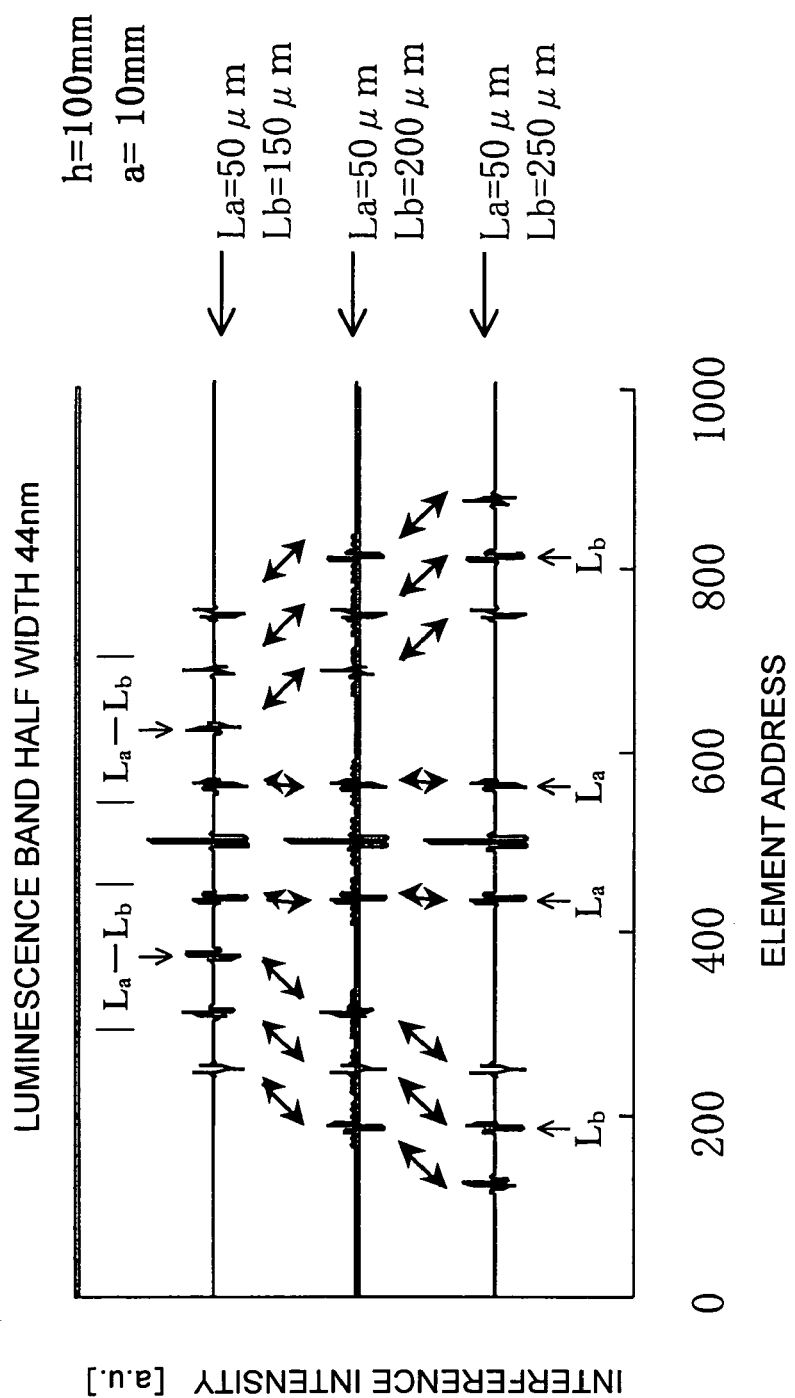

FIG. 19 shows the simulation results of the interference fringe generated when the light source 1 has a luminescence band half width of 0.44 nm. FIG. 20 shows the simulation results of the interference fringe generated when the light source 1 has a luminescence band half width of 2.2 nm. FIG. 21 shows the simulation results of the interference fringe generated when the light source 1 has a luminescence band half width of 22 nm. FIG. 22 shows the simulation results of the interference fringe generated when the light source 1 has a luminescence band half width of 44 nm.

The coherence length $l_c$ of the light source 1 is calculated by the equation below based on the luminous wavelength of $\lambda_0$ and the luminescence band half width of $\Delta\lambda$.

$$l_c = 0.44 \times (\lambda_0^2 / \Delta\lambda)$$

Thus, the coherence length $l_c$ is 722 μm in the simulation results of FIG. 19, the coherence length $l_c$ is 144 μm in the simulation results of FIG. 20, the coherence length $l_c$ is 14 μm in the simulation results of FIG. 21, and the coherence length $l_c$ is 7 μm in the simulation results of FIG. 22.

According to these simulation results, it was understood that the position of interference fringe based on the optical path difference factor of $2(n_aL_a - n_bL_b)$ can be detected by using the light source 1 emitting low-coherent light with a luminescence band half width of about 22 nm.

Namely, when the coherence length $l_c$ is increased, since the width of the central interference fringe that is determined by the coherence length $l_c$ is increased, the interference fringe based on the optical path difference factor of $2(n_aL_a - n_bL_b)$ is embedded in the central interference fringe and thus the position of the interference fringe cannot be detected. Thus, it is necessary to use the light source 1 emitting low-coherent light.

Figure 23:
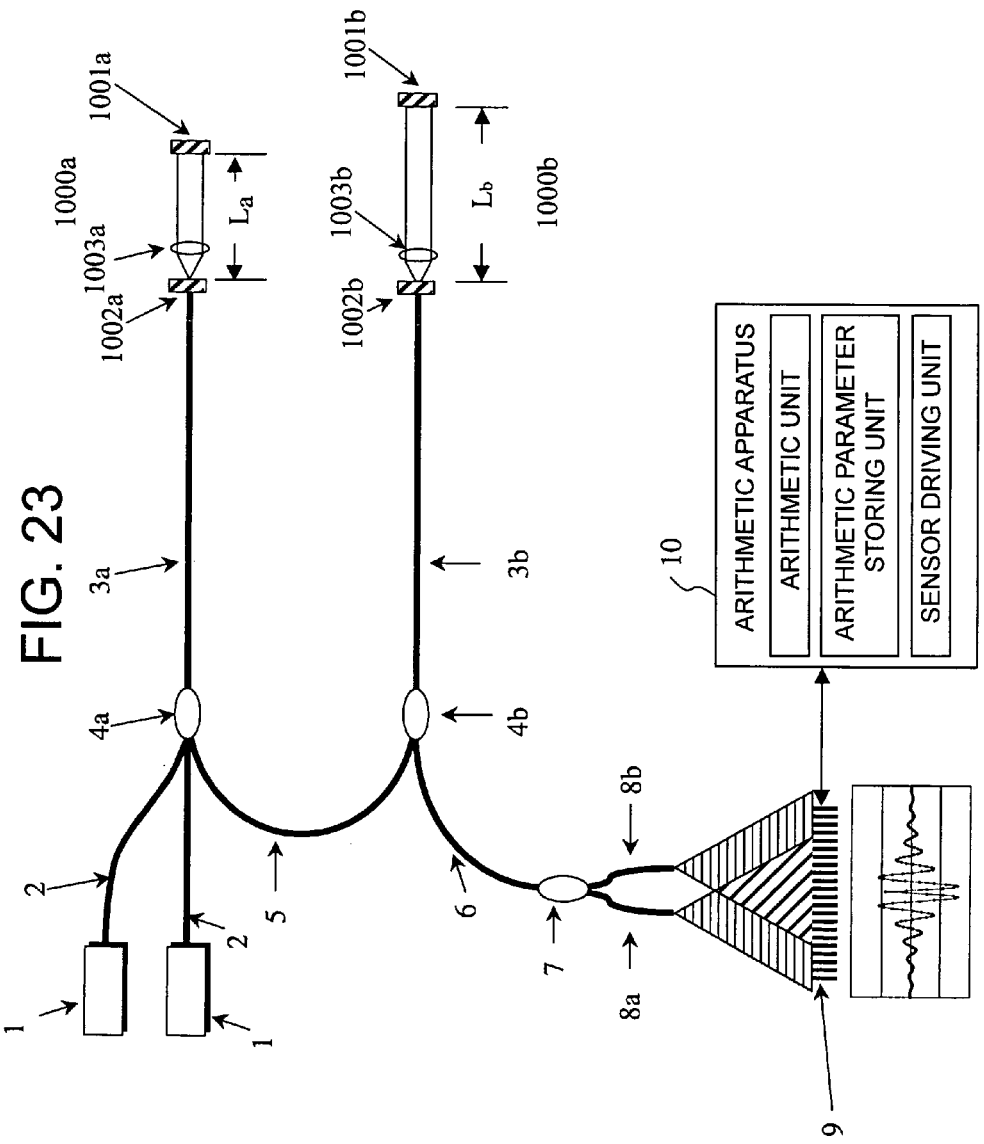
FIG. 23 shows a structural example of the structure of the light source.

In order to have such low-coherent light emission, the structure of FIG. 23 may be used, in which a plurality of light sources 1 with different luminous wavelengths are provided and light from the plurality of light sources 1 is transmitted to the optical branching coupler 4*a*.

(B) Structures of the First Sensor 1000*a*/the Second Sensor 1000*b*

Figure 24:
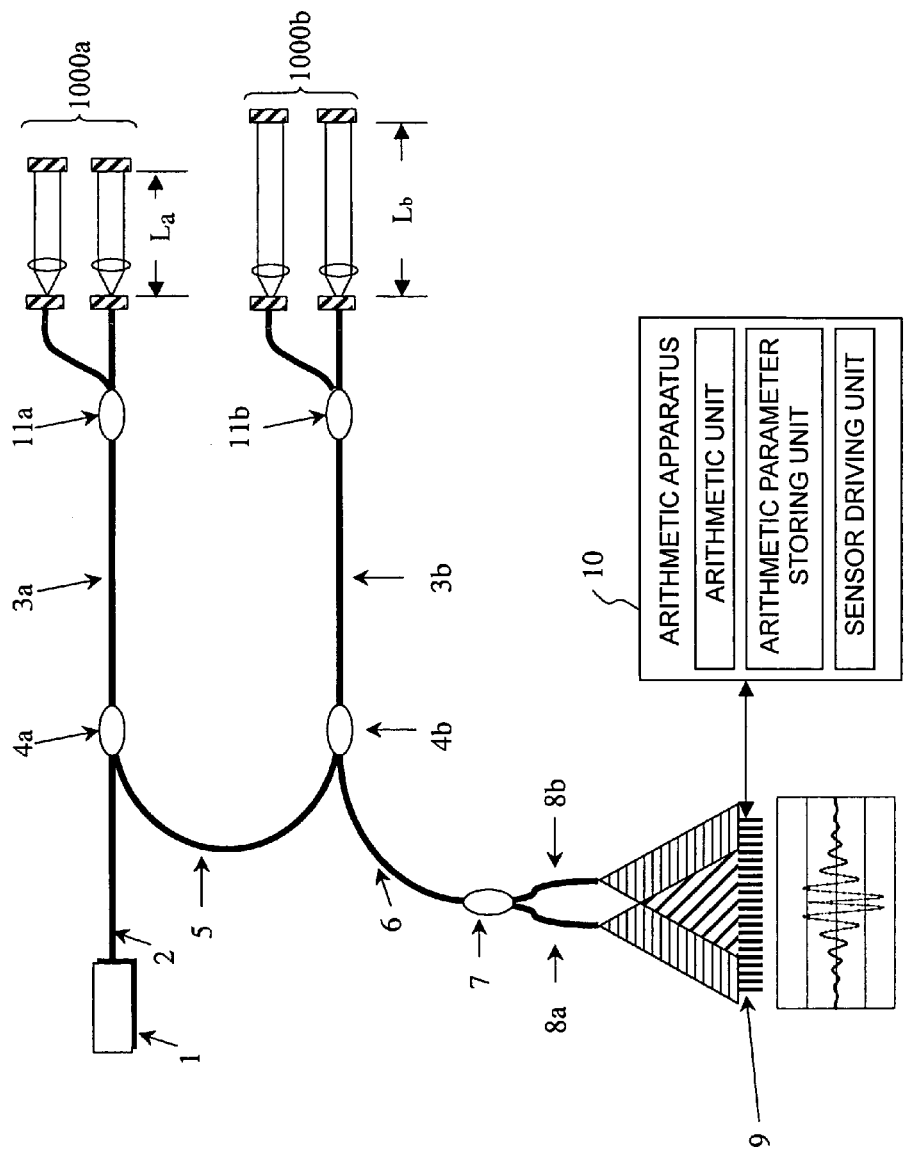
FIG. 24 shows a structural example of the structure of a sensor.

In addition to a single structure, the first sensor 1000*a* may be a plurality of sensors with same structures which are connected in parallel via optical fibers as shown in FIG. 24. Reference numeral 1*a* of FIG. 24 denotes an optical branching coupler mounted so as to have equal distances from the sensors connected in parallel.

The first sensor 1000*a* detects a pressure generated on the first measurement point. When the plurality of sensors are connected in parallel, each of the sensors generates an equal optical path difference of $2n_aL_a$ on input light and thus an average value is optically calculated, thereby accurately detecting a pressure generated on the first measurement point.

Further, in addition to a single structure, the second sensor 1000*b* may be a plurality of sensors with the same structures which are connected in parallel via optical fibers as shown in FIG. 24. Reference numeral 11*b* of FIG. 24 denotes an optical branching coupler mounted so as to have equal distances from the sensors connected in parallel.

The second sensor 1000*b* detects a pressure generated on the second measurement point. When the plurality of sensors are connected in parallel, each of the sensors generates an equal optical path difference of $2n_bL_b$ on input light and thus an average value is optically calculated, thereby accurately detecting a pressure generated on the second measurement point.

(C) Structure of the Young's Interferometer

In the structural example of FIG. 1, the Young's interferometer is structured so that the optical branching coupler 7 is used to split light reversely transmitted from the second sensor 1000*b* to the optical fiber 8*a* and the optical fiber 8*b*.

The method of constituting the interferometer is not limited to this constituting method. It is possible to use various constituting methods including the Young's interferometers of FIGS. 25 to 27 and Lummer-Gehrcke interferometers of FIGS. 28 to 31.

Figure 25:
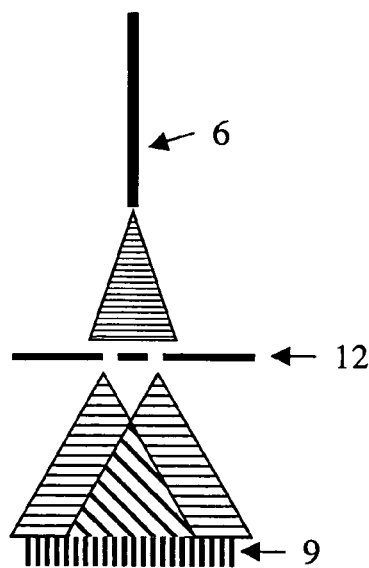
FIGS. 25, 26, and 27 are explanatory drawings showing a method of constituting the Young's interferometer.

In the method of constituting the Young's interferometer shown in FIG. 25, the Young's interferometer is constituted of a light shielding plate 12 having two slits or pin holes on the front surface of the optical fiber 6, instead of the optical fibers 8*a* and 8*b* connected to the optical fiber 6 via the optical branching coupler 7.

Figure 26:
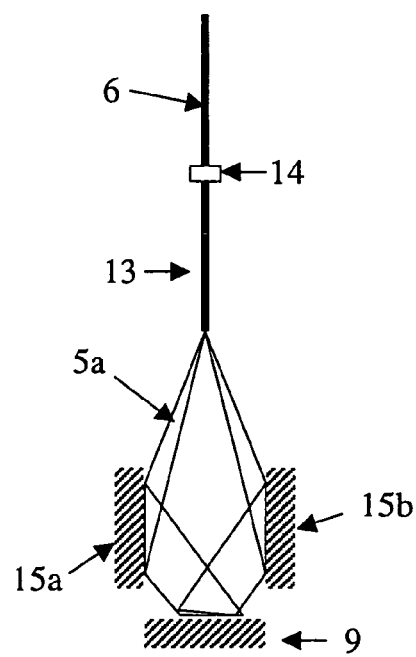

Further, in the method of constituting the Young's interferometer shown in FIG. 26, the Young's interferometer is structured so that a two-mode optical fiber 13 is connected instead of the single mode optical fibers 8*a* and 8*b*.

In FIG. 26, reference numeral 14 denotes a connector for connecting the optical fiber 6 and the optical fiber 13, and reference numerals 15*a* and 15*b* denote total reflection mirrors for irradiating the line image sensor 9 with light emitted from the two-mode optical fiber 13.

Figure 27:
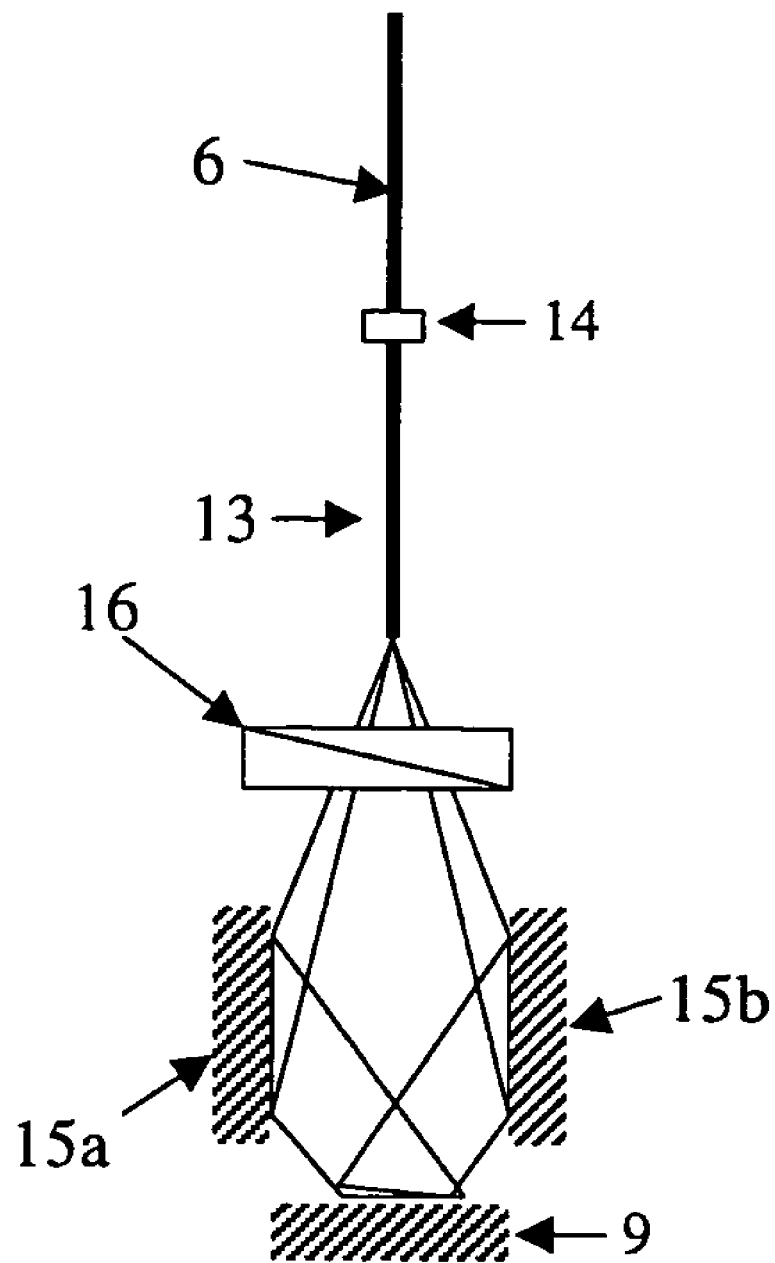

Moreover, the method of constituting the Young's interferometer shown in FIG. 27 basically uses the constituting method of FIG. 26 and further uses a polarizer 16 for turning light emitted from the two-mode optical fiber 13 into linear polarization. The polarizer 16 is provided because a higher degree of polarization improves interference.

Figure 28:
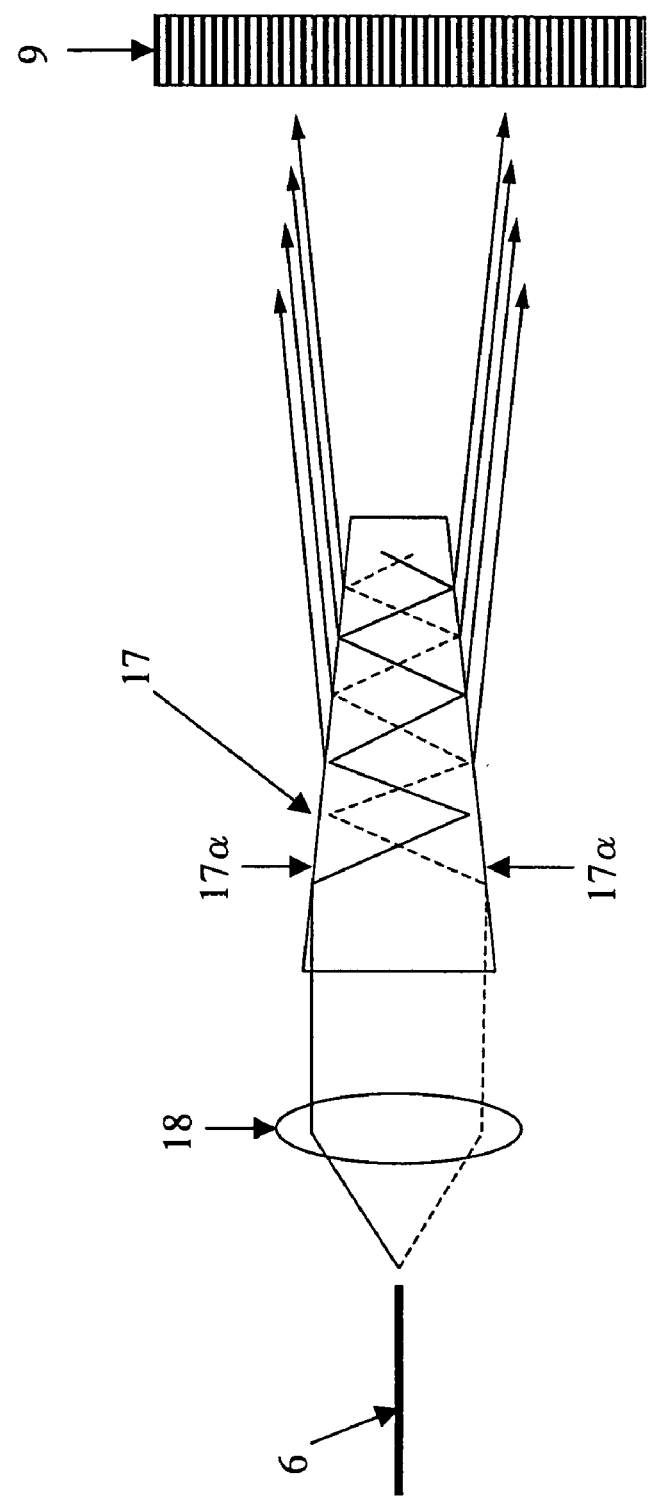
FIGS. 28, 29, 30, and 31 are explanatory drawings showing a method of constituting a Lummer-Gehrcke interferometer.

Further, in the method of constituting the Lummer-Gehrcke interferometer shown in FIG. 28, the Lummer-Gehrcke interferometer constitutes, instead of the optical fibers 8*a* and 8*b*, a conical glass body 17 and a lens 18 which makes parallel light emitted from the optical fiber 6 and emits the parallel light to the bottom of the glass body 17. In this constituting method, interference fringes are generated with two-dimensional expansion.

According to this structure, the Lummer-Gehrcke interferometer is structured so that light made parallel by the lens 18 repeats multiple reflection between tapered parts 17*a* of the glass body 17 and the light partially passes through the glass body 17 at this point so as to generate an optical path difference Δ.

Partial reflection mirrors may be formed on the tapered parts 17*a* of the glass body 17. Further, a lens may be provided between the glass body 17 and the line image sensor 9 to make parallel light having passed through the glass body 17.

Figure 29:
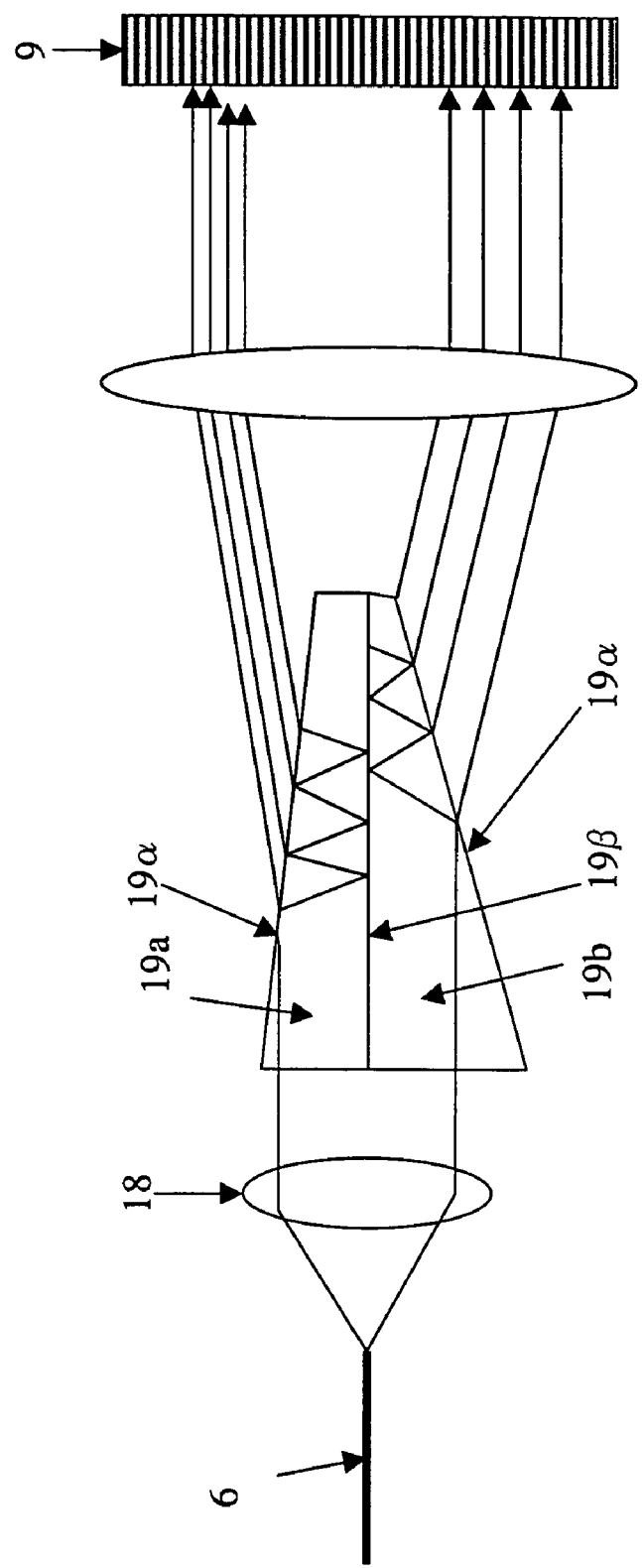

Moreover, in the method of constituting the Lummer-Gehrcke interferometer shown in FIG. 29, the Lummer-Gehrcke interferometer is constituted of two plane glass plates 19*a* and 19*b* bonded to each other, both having tapered part 19*a*, instead of the conical glass body 17 used in the constituting method of FIG. 28.

In this structure, a total reflection mirror 19β is formed between the glass plate 19*a* and the glass plate 19*b*. According to the structure, the Lummer-Gehrcke interferometer is structured so that multiple reflection is repeated between the total reflection mirror 19β and the tapered parts 19α and the light partially passes through the glass plates 19a and 19b at this point so as to generate an optical path difference Δ.

Figure 30:
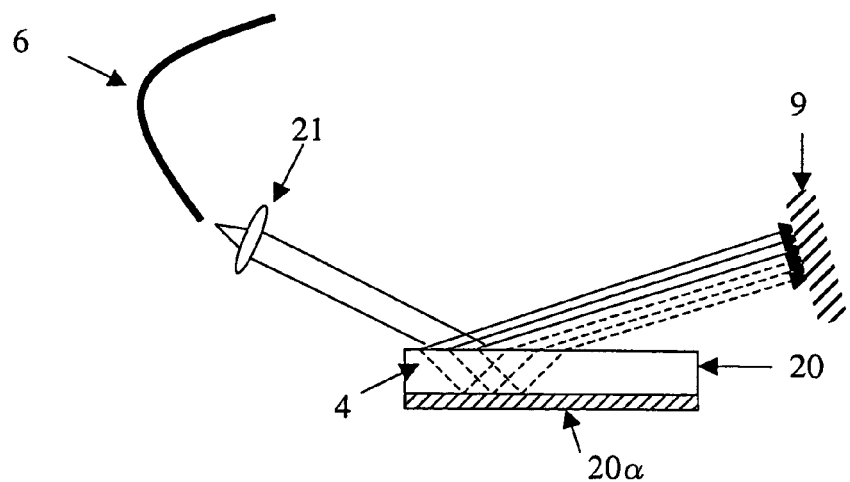

Moreover, in the method of constituting the Lummer-Gehrcke interferometer shown in FIG. 30, the Lummer-Gehrcke interferometer is constituted of, instead of the optical fibers 8a and 8b, a plane glass plate 20 having a total refection mirror 20a formed on its bottom surface, and a lens 21 which makes parallel light emitted from the optical fiber 6 and emits the parallel light to the plane glass plate 20.

According to this structure, the Lummer-Gehrcke interferometer is structured so that light made parallel by the lens 21 repeats multiple reflection between the upper surface and the bottom surface of the plane glass plate 20 and the light partially passes through the plane glass plate 20 at this point so as to generate an optical path difference Δ.

Figure 31:
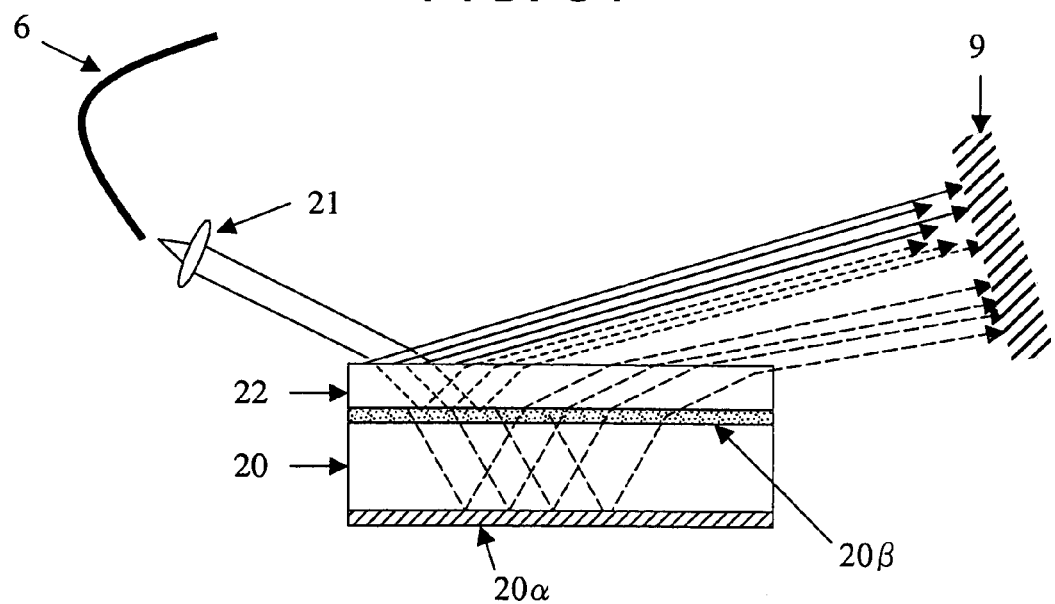

Moreover, in the method of constituting the Lummer-Gehrcke interferometer shown in FIG. 31, the Lummer-Gehrcke interferometer is constituted of another plane glass plate 22 disposed on the plane glass plate 20, in addition to the plane glass plate 20 used in the constituting method of FIG. 30.

In this structure, the Lummer-Gehrcke interferometer is structured so that a partial reflection mirror 20p is formed between the plane glass plate 20 and the plane glass plate 22 disposed thereon and an optical path difference Δ is generated according to this structure.

Besides, in the structures of the Lummer-Gehrcke interferometers shown in FIGS. 30 and 31, it is preferable to use tapered glass plates as the plane glass plate 20 and the plane glass plate 22 in order to positively generate an optical path difference.

(D) Structure of the Young's Interferometer for Expanding a Measuring Range

In the structural example of FIG. 1, the Young's interferometer is structured so that the optical branching coupler 7 is used to split light reversely transmitted from the second sensor 1000b to the optical fiber 8a and the optical fiber 8b.

In this case, the position of an interference fringe is changed according to a distance between the ends of the optical fibers 8a and 8b (2a of FIG. 7).

Figure 32A:
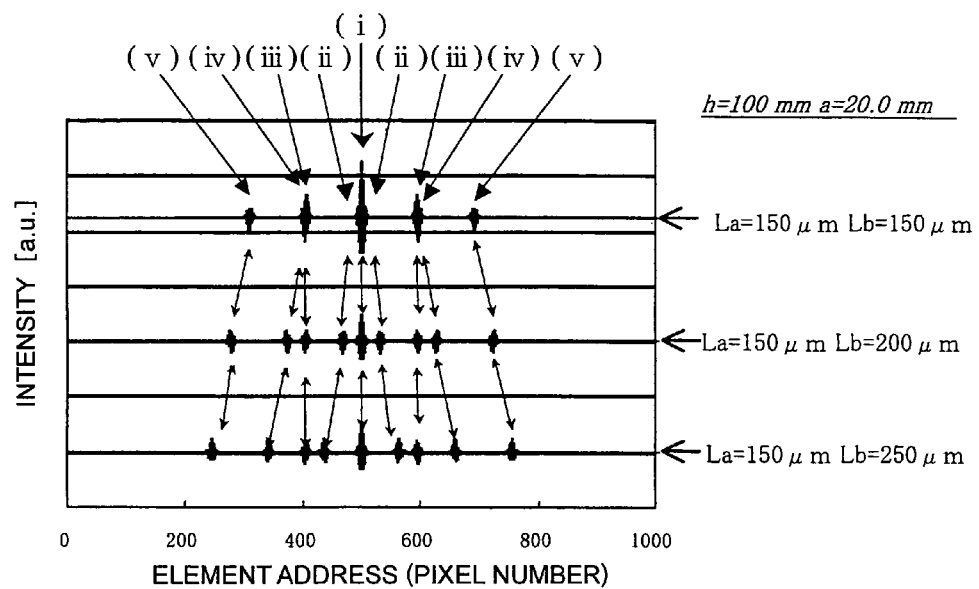
FIGS. 32A and 32B are explanatory drawings showing simulation results on the generation of interference fringes.
Figure 32B:
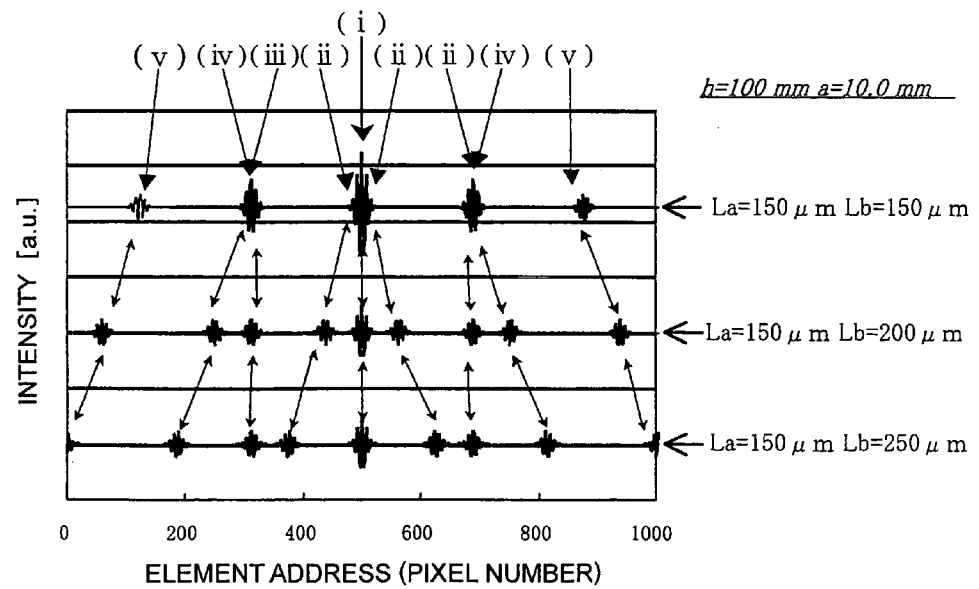

FIG. 32A shows the results of simulation performed with a=20 mm. The other conditions are same to those of the simulation of FIG. 9. FIG. 32B shows the simulation results of FIG. 9 that are obtained with a=10 mm.

As is understood from the simulation results, when a distance is reduced between the ends of the optical fibers 8a and 8b, the expansion of an interference fringe position is increased.

As is evident from the above results, when a pressure difference to be measured is large, it is better to increase a distance between the ends of the optical fibers 8a and 8b. This is because when the distance is reduced, a large pressure difference to be measured goes out of the pixel range of the line image sensor 9. On the other hand, when a pressure difference to be measured is small, it is better to reduce a distance between the ends of the optical fibers 8a and 8b. This is because the smaller distance improves a resolving power.

Figure 33:
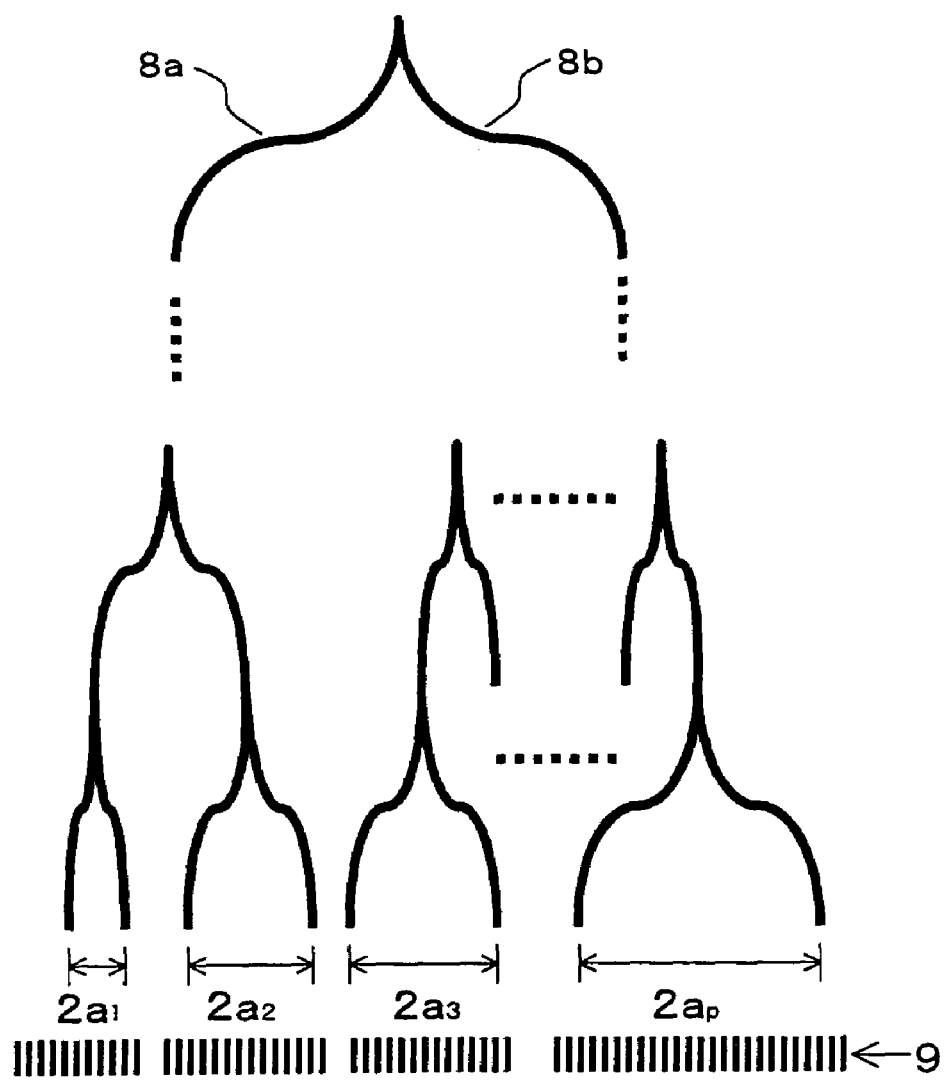
FIG. 33 shows a structural example for expanding a measuring range.

Thus, as shown in FIG. 33, it is preferable to expand a measuring range by using a hierarchical structure which has one or more stages of optical fibers, starting from the optical fiber 8a, to split input light into two, and a hierarchical structure which has one or more stages of optical fibers, starting from the optical fiber 8b, to split input light into two, the optical fibers having different emitting intervals in the final stage where light is emitted to the line image sensor 9.

In this structure, the image sensor 9 may be a single line image sensor or a plurality of line image sensors.

When this structure is used, for example, the arithmetic apparatus 10 firstly measures pressure differences with the largest pressure difference range, selects from the measured pressure differences a pressure difference measuring range having the highest resolving power in a pressure difference measuring range within the pixel range of the line image sensor 9, and measures a pressure difference again by using the measuring range, so that a final pressure difference is measured.

(E) Structure for Miniaturizing the Apparatus

Figure 34A:
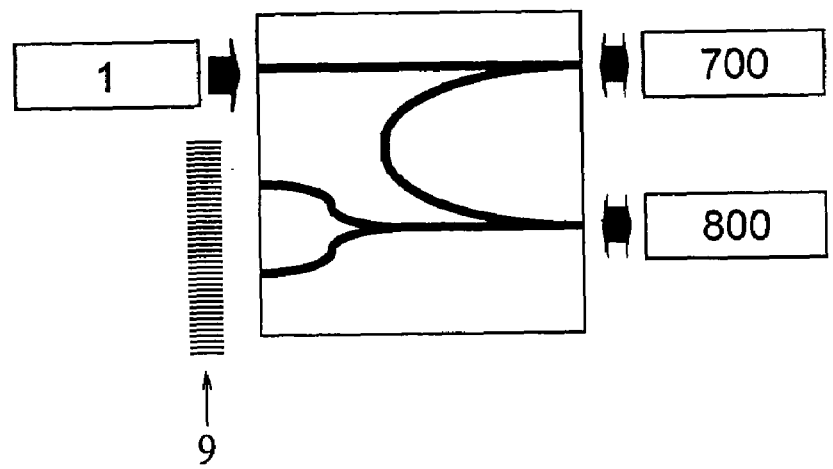
FIGS. 34A, 34B, 35A, 35B, and 36 show examples of a structure for achieving integration.
Figure 34B:
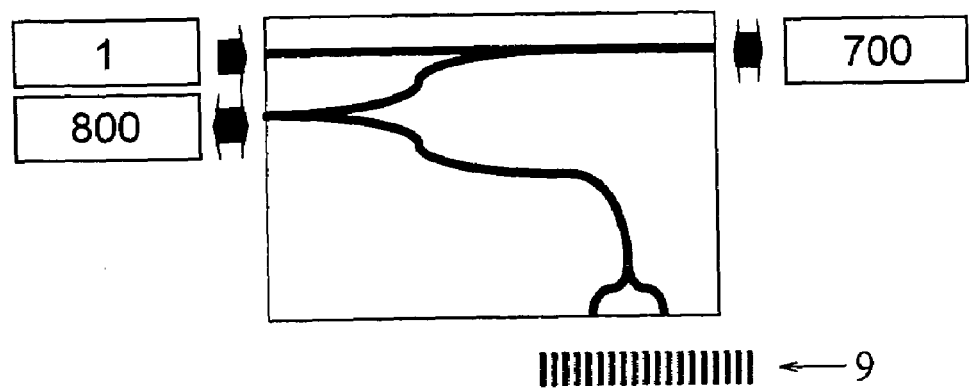
Figure 35A:
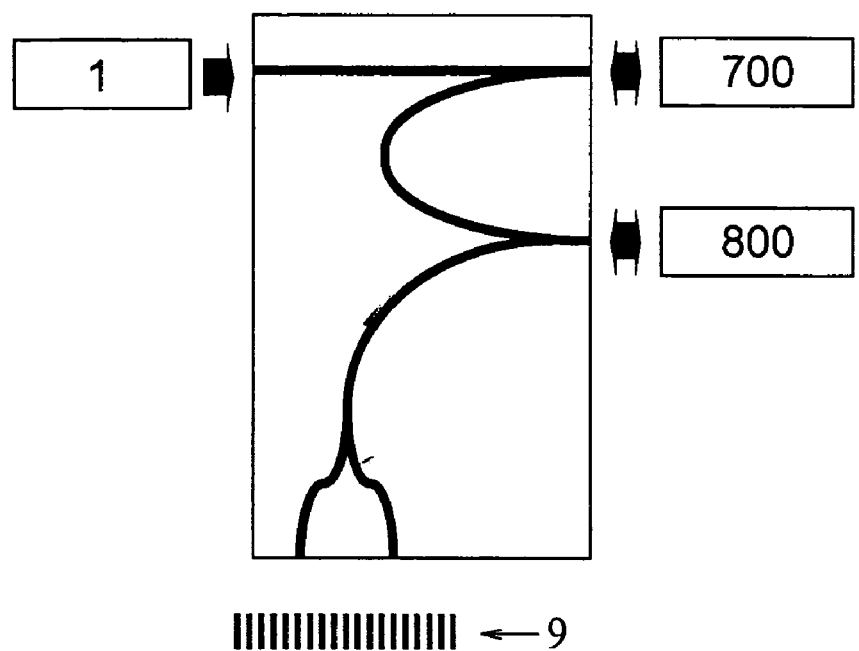
Figure 35B:
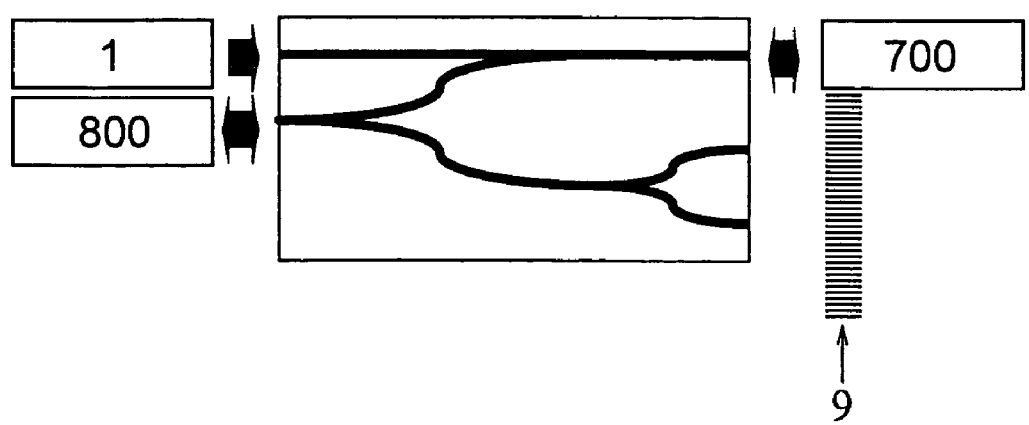

In order to miniaturize the apparatus implementing the structural example of FIG. 1, as shown in FIGS. 34 and 35, it is preferable to integrate the optical fiber 2, optical branching coupler 4a, optical fiber 5, optical branching coupler 4b, optical fiber 6, optical branching coupler 7, optical fiber 8a and optical fiber 8b into one platform.

Figure 36:
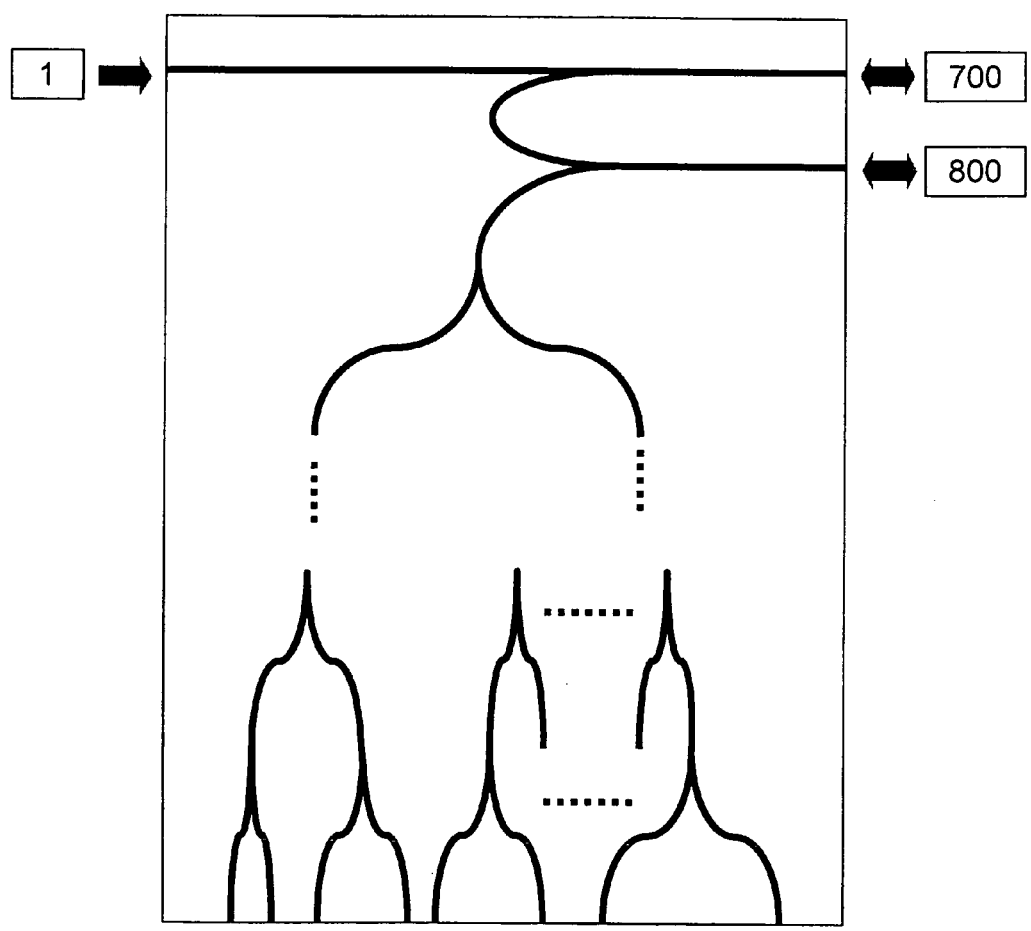

Further, also in the structure for expanding the measuring range as shown in FIG. 33, it is preferable to make integration into one platform as shown in FIG. 36.

In FIGS. 34 to 36, reference numeral 700 denotes a first sensor head corresponding to the first sensor 1000a and the second sensor 1000b, and reference numeral 800 denotes a second sensor head corresponding to the first sensor 1000a and the second sensor 1000b.

When the integrated structure is adopted, it is preferable to integrate the optical fiber 3a connected to the first sensor 1000a and the optical fiber 3b connected to the second sensor 1000b into the platform within a permissible range.

The following will describe another structural example of Embodiment 1.

Figure 37:
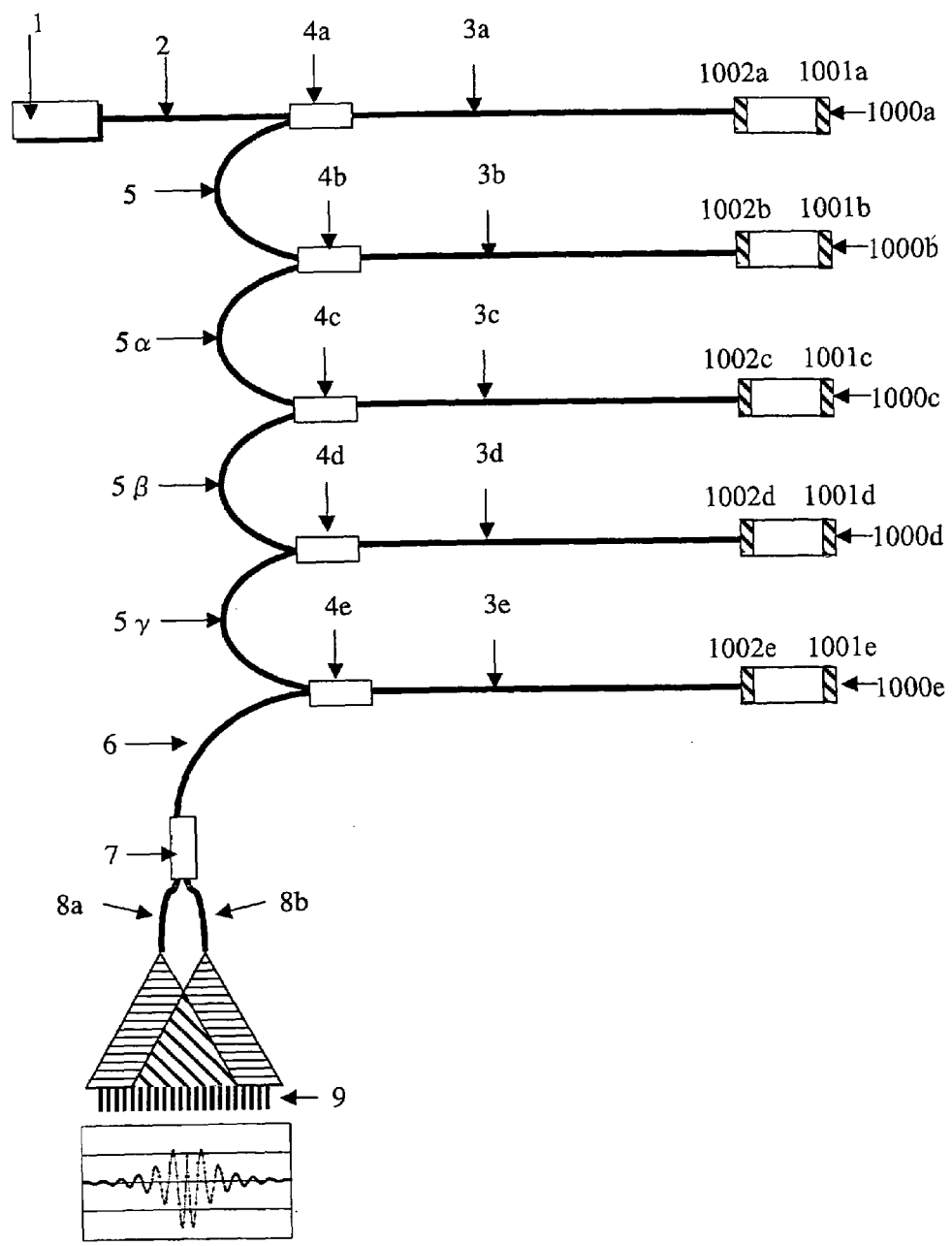
FIG. 37 shows a structural example for enabling measurement on a number of points.

FIG. 37 shows another structural example according to Embodiment 1.

While the structural example of FIG. 1 has two measurement points, the present structural example has five measurement points.

Accordingly, in addition to a first sensor 1000a and a second sensor 1000b, the structural example of FIG. 37 includes a third sensor 1000c which is mounted on a third measurement point and generates an optical path difference on input light according to a pressure generated on the third measurement point, a fourth sensor 1000d which is mounted on a fourth measurement point and generates an optical path difference on input light according to a pressure generated on the fourth measurement point, and a fifth sensor 1000e which is mounted on a fifth measurement point and generates an optical path difference on input light according to a pressure generated on the fifth measurement point.

The third sensor 1000c generates an optical path difference of $2n_c L_c$ on input light according to a structure similar to that of the first sensor 1000a. $L_c$ represents a distance between a translucent mirror 1002c and a total reflection mirror 1001c and $n_c$ represents a refractive index of a material provided between the translucent mirror 1002c and the total reflection mirror 1001c.

On one hand, the fourth sensor 1000d generates an optical path difference of $2n_d L_d$ on input light according to a structure similar to that of the first sensor 1000a. $L_d$ represents a distance between a translucent mirror 1002d and a total reflection mirror 1001d and $n_d$ represents a refractive index of a material provided between the translucent mirror 1002d and the total reflection mirror 1001d.

On the other hand, the fifth sensor 1000e generates an optical path difference of $2n_e L_e$ on input light according to a structure similar to that of the first sensor 1000a. $L_e$ represents a distance between a translucent mirror 1002e and a total reflection mirror 1001e and $n_e$ represents a refractive index of a substance provided between the translucent mirror 1002e and the total reflection mirror 1001e.

Further, along with the third sensor 1000c, the fourth sensor 1000d, and the fifth sensor 1000e, an optical fiber 5α, an optical fiber 3c, an optical branching coupler 4c, an optical fiber 5β, an optical fiber 3d, an optical branching coupler 4d, an optical fiber 5γ, an optical fiber 3e, and an optical branching coupler 4e are provided in addition to the structure of FIG. 1. The optical fiber 6 of FIG. 1 extracts light split by the optical branching coupler 4e and transmits the light to the optical branching coupler 7.

The optical fiber 5α is an optical fiber of a single mode that extracts light split by the optical branching coupler 4b. The optical fiber 3c is an optical fiber of a single mode that is provided so as to correspond to the third sensor 1000c and transmits light extracted by the optical fiber 5α to the third sensor 1000c. The optical branching coupler 4c couples the optical fiber 5α and the optical fiber 3c and splits light reversely transmitted through the optical fiber 3c.

The optical fiber 5β is an optical fiber of a single mode that extracts light split by the optical branching coupler 4c. The optical fiber 3d is an optical fiber of a single mode that is provided so as to correspond to the fourth sensor 1000d and transmits light extracted by the optical fiber 5β to the fourth sensor 1000d. The optical branching coupler 4d couples the optical fiber 5β and the optical fiber 3d and splits light reversely transmitted through the optical fiber 3d.

The optical fiber 5γ is an optical fiber of a single mode that extracts light split by the optical branching coupler 4d. The optical fiber 3e is an optical fiber of a single mode that is provided so as to correspond to the fifth sensor 1000e and transmits light extracted by the optical fiber 5γ to the fifth sensor 1000e. The optical branching coupler 4e couples the optical fiber 5γ and the optical fiber 3e and splits light reversely transmitted through the optical fiber 3e.

According to this structure, on the line image sensor 9, an interference fringe is generated which has an interference fringe position corresponding to a pressure difference between given two measurement points, such as an interference fringe generated based on an optical path difference factor of $2(n_a L_a - n_b L_b)$, an interference fringe generated based on an optical path difference factor of $2(n_a L_a - n_c L_c)$, etc., for example.

Figure 38:
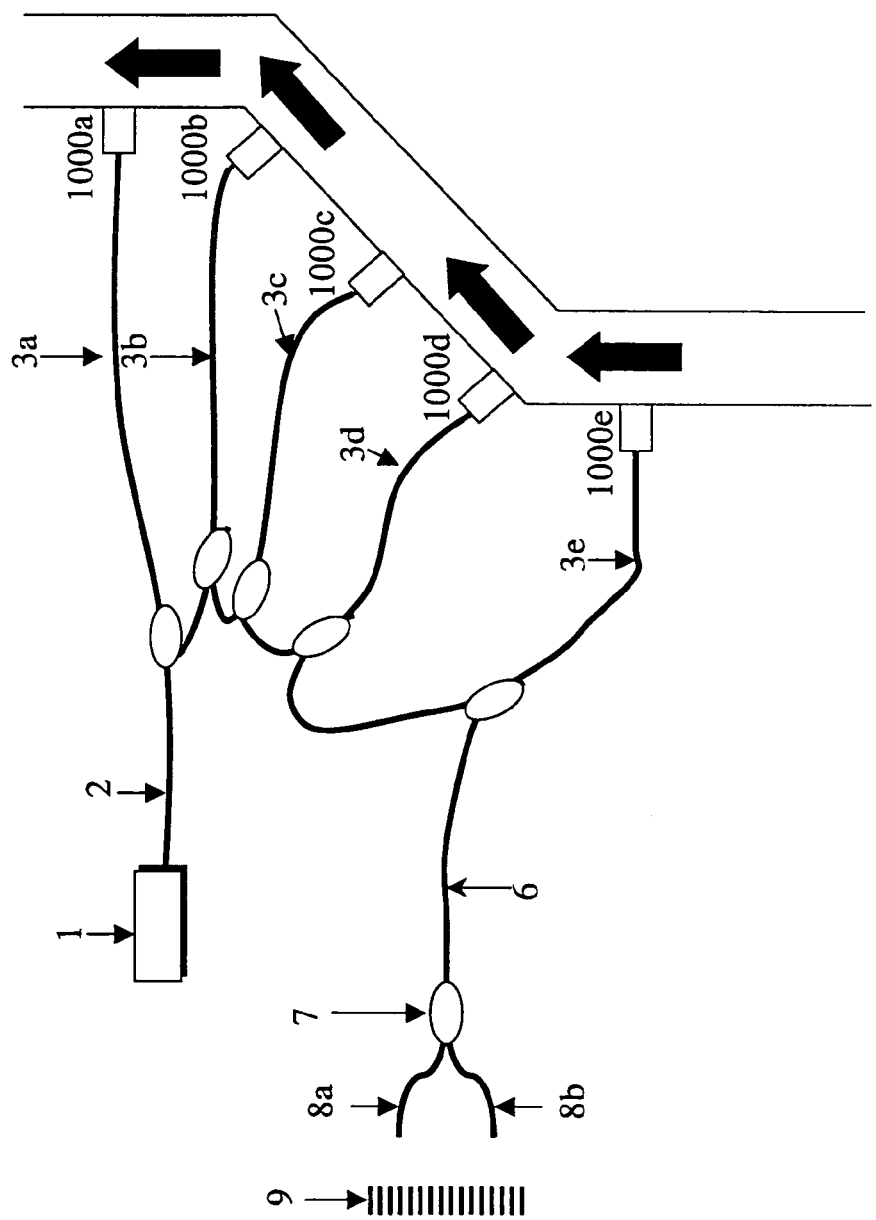
FIG. 38 is an explanatory drawing showing a method of performing measurements on a number of points.

Further, as shown in FIG. 38, with the present invention implementing the above structural example, pressure differences between two or more measurement points can be measured at once by using the sensors of the single structures.

Figure 39:
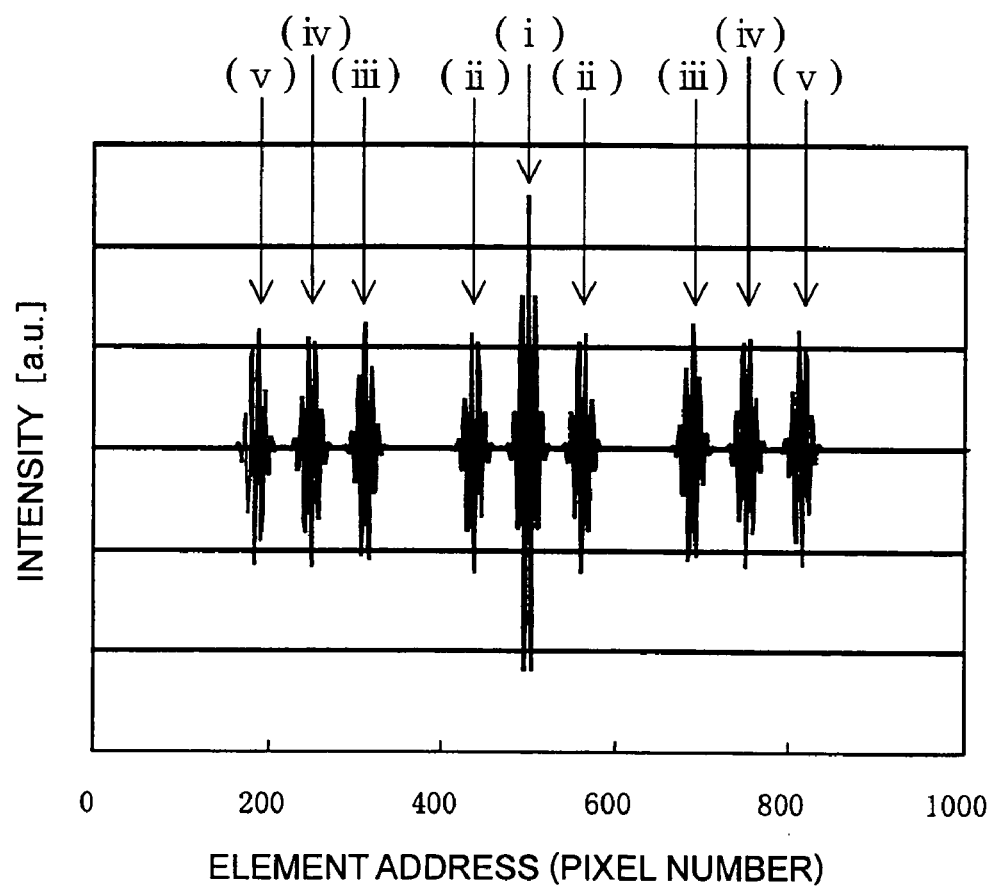
FIG. 39 is an explanatory drawing showing simulation results on the generation of interference fringes.

When the present invention implementing the structural example is used, for example, in the pattern of FIG. 39, positions (ii) of FIG. 39 generate interference fringes corresponding to a difference value between a pressure on the first measurement point and a pressure on the second measurement point, positions (ii) of FIG. 39 generate interference fringes corresponding to a difference value between a pressure on the second measurement point and a pressure on the third measurement point, positions (iv) of FIG. 39 generate interference fringes corresponding to a difference value between a pressure on the second measurement point and a pressure on the fourth measurement point, and positions (v) of FIG. 39 generate interference fringes corresponding to a difference value between a pressure on the fourth measurement point and a pressure on the fifth measurement point. Thus, based on the positions of the interference fringes, pressure differences between the two or more measurement points can be measured at once by using the sensors of the single structures.

Additionally, (i) of FIG. 39 indicates a central interference fringe appearing on a fixed position at the center. An interference fringe with a smaller pressure difference (optical path difference) is generated closer to the central interference fringe, so that the order of generating interference fringes may be changed. However, in the case of normal measurement targets, the order of pressure differences is not changed and thus the present invention makes it possible to measure pressure differences between the two or more measurement points.

When the structure of FIG. 37 is used, the optical fibers are not limited to single mode optical fibers and thus multimode optical fibers are also applicable.

Further, when the structure of FIG. 37 is used, it is needless to say that sensors generating the interference fringes of FIG. 12 can be used. In a case of using such sensors, the interference fringes generated with no pressure difference between the two measurement points are not coincident with the central interference fringe.

In the above-described structural example, a pressure difference is measured by using the first sensor 1000a or the like which has a function of changing an optical path difference generated on input light by moving the total reflection mirror 1001a according to a pressure.

When the total reflection mirror 1001a or the like is moved according to a temperature, a temperature difference can be measured by the present invention. When the total reflection mirror 1001a or the like is moved according to a magnetic field strength, a difference in magnetic field strength can be measured by the present invention. When the total reflection mirror 1001a or the like is moved according to an electric field strength, a difference in electric field strength can be measured by the present invention. In this way, the application of the present invention is not limited to the measurement of a pressure difference.

On the other hand, even when the total reflection mirror 1001a or the like is not moved, the present invention can use a sensor having a function of changing an optical path difference on input light by changing a refractive index of a material provided between the total reflection mirror 1001a or the like and the translucent mirror 1002a or the like.

Figure 40:
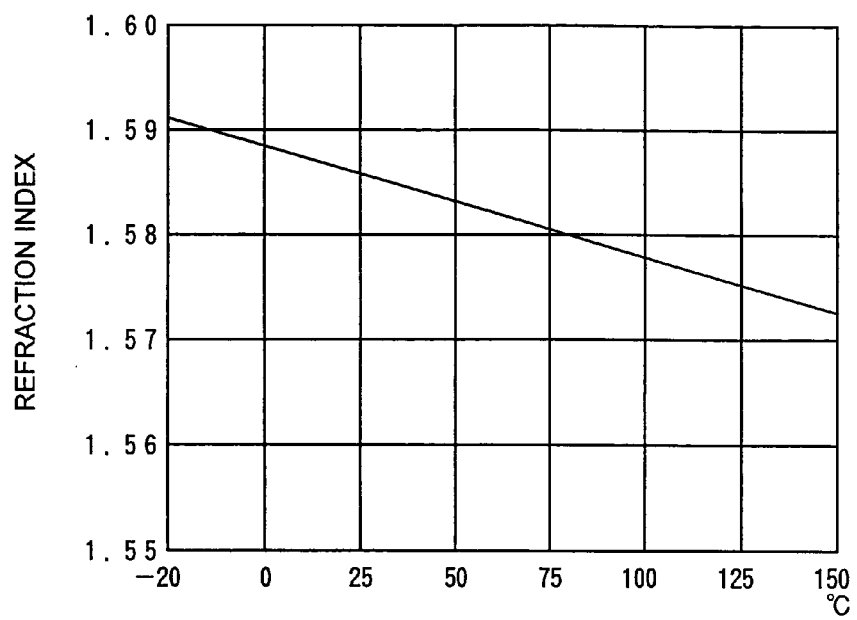
FIG. 40 is an explanatory drawing showing the characteristic of a high polymer.

For example, as shown in FIG. 40, some high polymers change its refractive indexes according to a temperature. A temperature difference can be measured by providing a high polymer having such a characteristic between the total reflection mirror 1001a or the like and the translucent mirror 1002a or the like.

In general, materials are changed in refractive index and length according to a change in temperature, pressure, concentration, a magnetic field, and an electric field, thereby changing the phase difference of passing light.

Thus, a material which sensitively reacts to such an external factor and changes its refractive index and length is provided between the total reflection mirror 1001a or the like and the translucent mirror 1002a or the like, so that a pressure difference or the like can be measured by the present invention even when the total reflection mirror 1001a or the like is not moved.

Figure 41:
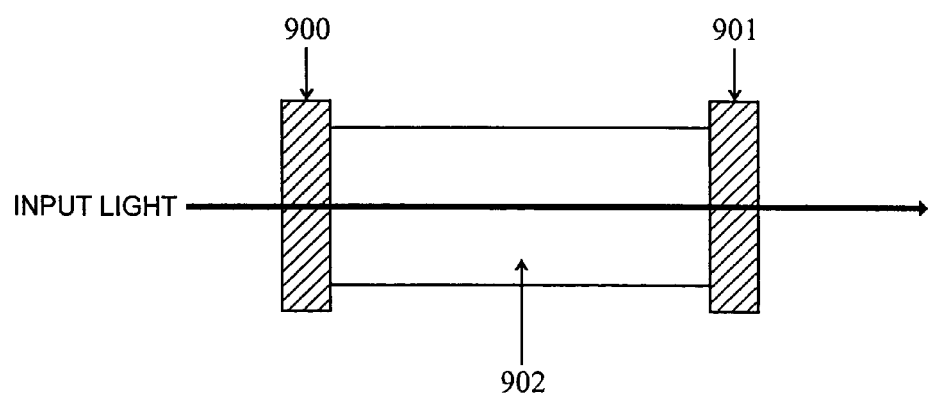
FIG. 41 is an explanatory drawing showing a transmission sensor to generate an optical path difference on input light.

Moreover, when the material is used which sensitively reacts to such an external factor and changes its refractive index and length, a transmission sensor may be provided instead of reflection sensors such as the first sensor 1000a as shown in FIG. 41. The transmission sensor has transparent glass plates 900 and 901 which are arranged in parallel and has a reactant 902 which sensitively reacts to such an external factor and changes its refractive index and length is provided between the two glass plates 900 and 901, so that an optical path difference is generated on input light.

Figure 42:
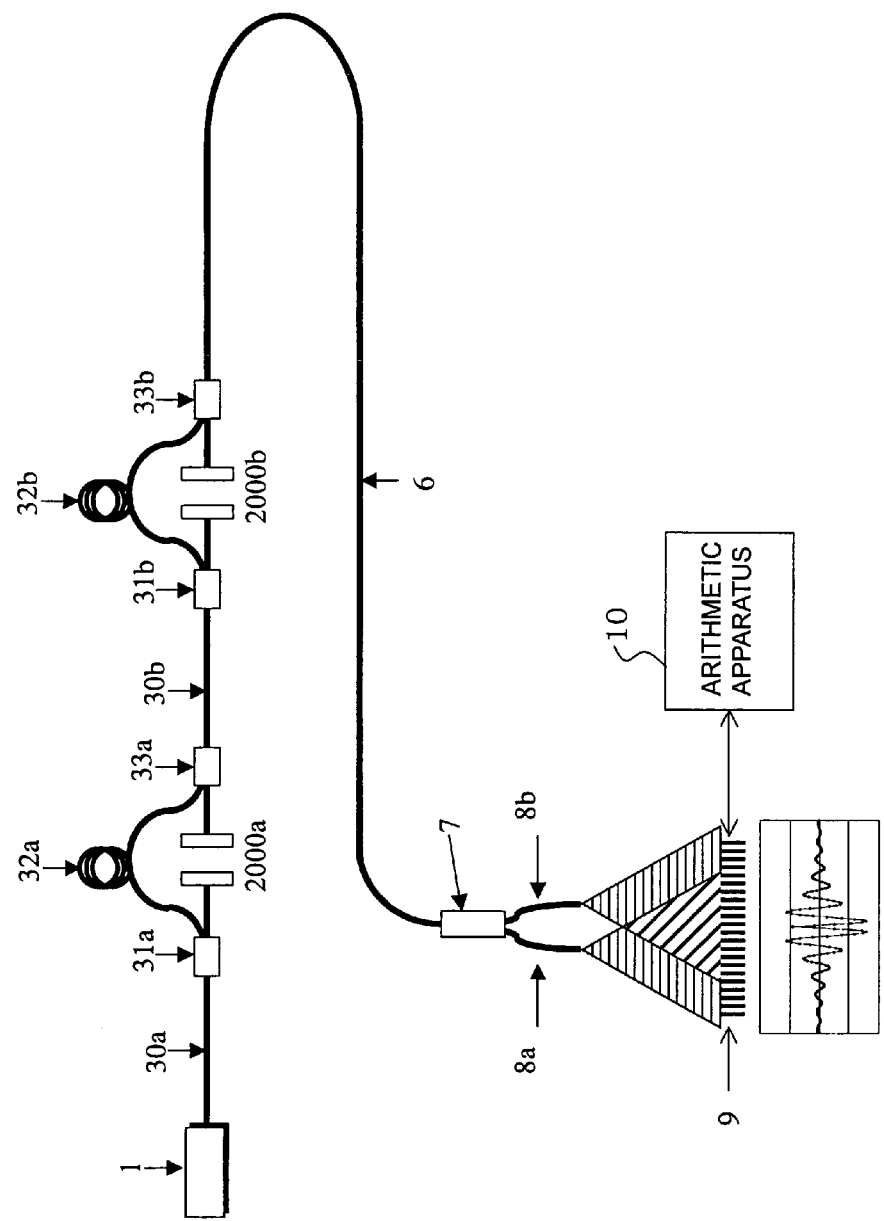

FIG. 42 shows a structural example of the present invention that is suitable for such a transmission sensor.

In this structural example, by using a first transmission sensor 2000*a* for changing an optical path length according to a pressure generated on the first measurement point and a second transmission sensor 2000*b* for changing an optical path length according to a pressure generated on the second measurement point, a difference value is measured between the pressure generated on the first measurement point and the pressure generated on the second measurement point.

The first sensor 2000*a* provides input light with an optical path length of $n_a L_a$ during the passage of the light. $L_a$ represents a distance between the two glass plates and $n_a$ represents a refractive index of a material between the two glass plates.

On the other hand, the second sensor 2000*b* has the same structure as the first sensor 2000*a* and provides input light with an optical path length of $n_b L_b$ during the passage of the light. $L_b$ represents a distance between the two glass plates and $n_b$ represents a refractive index of a material between the two glass plates.

For convenience of explanation, it is assumed that "$n_a = n_b$" is obtained and the first sensor 2000*a* and the second sensor 2000*b* are used with "$L_a = L_b$" when a pressure difference is absent between the first measurement point and the second measurement point.

In this structure, when a pressure difference is absent between a pressure generated on the first measurement point and a pressure generated on the second measurement point, "$L_a = L_b$" is obtained, and when a material between the two glass plates of the first sensor 2000*a* is the same as a material between the two glass plates of the second sensor 2000*b*, "$n_a = n_b$" is obtained. Thus, an optical path length $n_a L_a$ provided by the first sensor 2000*a* and an optical path length $n_b L_b$ provided by the second sensor 2000*b* are equal to each other.

In contrast, when a pressure difference is present between a pressure generated on the first measurement point and a pressure generated on the second measurement point, the two optical path lengths are different from each other.

In the structural example of FIG. 42, a difference value between a pressure generated on the first measurement point and a pressure generated on the second measurement point can be measured by detecting a difference of the two optical path lengths. In addition to the first sensor 2000*a* and the second sensor 2000*b*, the structural example includes a light source 1, an optical fiber 30*a*, an optical branching coupler 31*a*, an optical fiber 32*a*, an optical branching coupler 33*a*, an optical fiber 30*b*, an optical branching coupler 31*b*, an optical fiber 32*b*, an optical branching coupler 33*b*, an optical fiber 6, optical branching coupler 7, an optical fiber 8*a*, an optical fiber 8*b*, a line image sensor 9, and an arithmetic apparatus 10.

The light source 1 is constituted of a so-called white light source such as an LED for emitting low-coherent light. The optical fiber 30*a* is an optical fiber of a single mode that extracts light emitted from the light source 1 and transmits the light to the first sensor 2000*a*. The optical branching coupler 31*a* splits light passing though the optical fiber 30*a* into two and inputs one of split light beams to the first sensor 2000*a*.

The optical fiber 32*a* is an optical fiber of a single mode that uses, as input, the other light beam split by the optical branching coupler 31*a* and forms a path bypassing the first sensor 2000*a*. The optical branching coupler 33*a* couples light outputted by the first sensor 2000*a* and light outputted by the optical fiber 32*a*.

The optical fiber 30*b* is an optical fiber of a singe mode that transmits light outputted by the optical branching coupler 33*a* to the second sensor 2000*b*. The optical branching coupler 31*b* splits light transmitted by the optical fiber 30*b* into two and inputs one of the split light beams to the second sensor 2000*b*.

The optical fiber 32*b* is an optical fiber of a single mode that uses, as input, the other light beam split by the optical branching coupler 31*b* and forms a path bypassing the second sensor 2000*b*. The optical branching coupler 33*b* couples light outputted by the second sensor 2000*b* and light outputted by the optical fiber 32*b*.

The optical fiber 6 is an optical fiber of a single mode that extracts light split by the optical branching coupler 33*b*. The optical branching coupler 7 splits light extracted by the optical fiber 6 into two. The optical fiber 8*a* is an optical fiber of a single mode that extracts one of light beams split by the optical branching coupler 7. The optical fiber 8*b* is an optical fiber of a single mode that extracts the other light beam split by the optical branching coupler 7.

The line image sensor 9 detects interference fringes generated by light emitted from the optical fiber 8*a* and the optical fiber 8*b*. The arithmetic apparatus 10 calculates a pressure difference between a pressure generated on the first measurement point and a pressure generated on the second measurement point based on the fringe positions of the interference fringes detected by the line image sensor 9.

According to the structural example, four kinds of light transmission patterns are present: (I) a transmission pattern of light passing through the first sensor 2000*a* and then passing through the second sensor 2000*b*, (II) a transmission pattern of light passing through the optical fiber 32*a*, which bypasses the first sensor 2000*a*, and then passing through the optical fiber 32*b*, which bypasses the second sensor 2000*b*, (III) a transmission pattern of light passing through the optical fiber 32*a*, which bypasses the first sensor 2000*a*, and then passing through the second sensor 2000*b*, and (IV) a transmission pattern of light passing through the first sensor 2000*a* and then passing through the optical fiber 32*b*, which bypasses the second sensor 2000*b*.

In consideration that optical path lengths provided by the optical fibers 32*a* and 32*b* are fixed, transmission using the transmission pattern (III) provides input light with an optical path length of $n_b L_b$, and transmission using the transmission pattern (IV) provides input light with an optical path length of $n_a L_a$, so that the phase difference of light emitted to the line image sensor 9 includes a phase difference $= k \times (n_a L_a - n_b L_b)$.

The optical path difference factor of $(n_a L_a - n_b L_b)$ indicates a pressure difference between a pressure generated on the first measurement point where the first sensor 2000*a* is disposed and a pressure generated on the second measurement point where the second sensor 2000*b* is disposed. As described in the structural example of FIG. 1, a pressure difference can be calculated by detecting a movement of an interference fringe generated based on an optical path difference factor of $(n_a L_a - n_b L_b)$.

In this way, also in the structural example of FIG. 42 where the transmission type first sensor 2000*a* and transmission type second sensor 2000*b* are used, it is possible to measure a pressure difference between a pressure generated on the first measurement point and a pressure generated on the second measurement point by detecting a movement of an interference fringe generated based on an optical path difference factor of $(n_aL_a-n_bL_b)$.

Also when the structural example of FIG. 42 is used, the optical fibers are not limited to single mode optical fibers and thus multimode optical fibers are also applicable.

Further, also when the structural example of FIG. 42 is used, it is needless to say that sensors generating the interference fringes of FIG. 12 are applicable. In a case of using such sensor, the interference fringes generated with no pressure difference between the two measurement points are not coincident with the central interference fringe.

Figure 43:
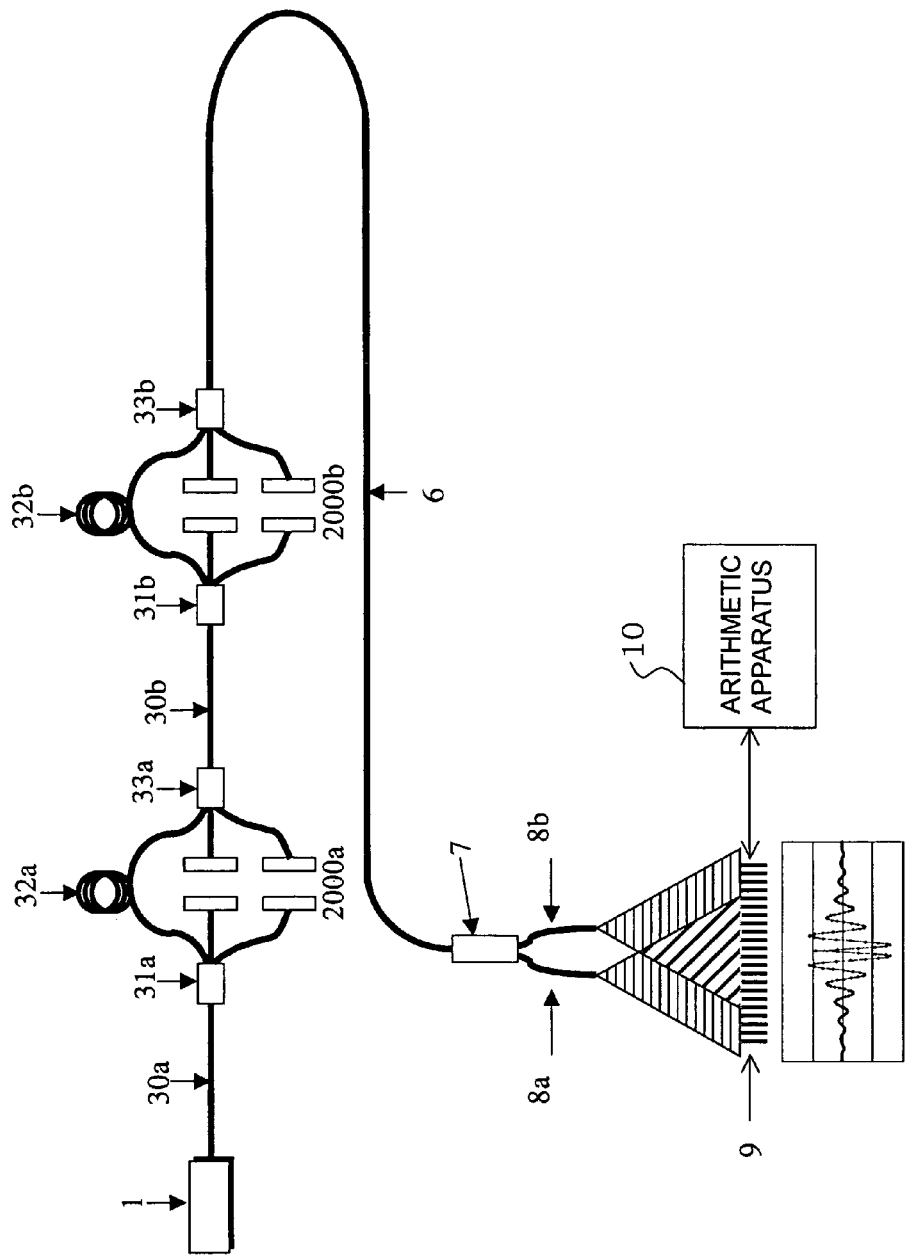

Moreover, also when the structural example of FIG. 42 is used, in addition to a single structure, the first sensor 2000a may be a plurality of sensors with same structures which are connected in parallel via optical fibers as shown in FIG. 43.

The first sensor 2000a detects a pressure generated on the first measurement point. With the plurality of sensors connected in parallel, each of the sensors generates an equal optical path length of $n_aL_a$ on input light and thus an average value is optically calculated, achieving accurate detection of a pressure generated on the first measurement point.

In addition to a single structure, the second sensor 2000b may be a plurality of sensors with same structures which are connected in parallel via optical fibers as shown in FIG. 43.

The second sensor 2000b detects a pressure generated on the second measurement point. With the plurality of sensors connected in parallel, each of the sensors generates an equal optical path length of $n_bL_b$ on input light and thus an average value is optically calculated, achieving accurate detection of a pressure generated on the second measurement point.

In the structural example of FIG. 42, the following method was used: the optical path difference of $n_aL_a$ is generated on input light during passage through the first sensor 2000a by using the optical fiber 32a bypassing the first sensor 2000a, and the optical path difference $n_bL_b$ is generated on input light during passage through the second sensor 2000b by using the optical fiber 32b bypassing the second sensor 2000b. However, as shown in FIG. 44, the following method is also applicable: a sensor 2001a, which provides input light with an optical path length of $q \times n_aL_a$ (q is a value other than 1) different from that of the first sensor 2000a, is used instead of the optical fiber 32a bypassing the first sensor 2000a, and a sensor 2001b, which provides input light with an optical path length of $q \times n_bL_b$ different from that of the second sensor 2000b, is used instead of the optical fiber 32b bypassing the second sensor 2000b.

In this case, four kinds of light transmission patterns are present: (I) a transmission pattern of light passing through the first sensor 2000a and then passing through the second sensor 2000b, (II) a transmission pattern of light passing through the sensor 2001a provided instead of the optical fiber 32a and then passing through the sensor 2001b provided instead of the optical fiber 32b, (III) a transmission pattern of light passing through the sensor 2001a provided instead of the optical fiber 32a and then passing through the second sensor 2000b, and (IV) a transmission pattern of light passing through the first sensor 2000a and then passing through the sensor 2001b provided instead of the optical fiber 32b.

Transmission using the transmission pattern (III) provides input light with an optical path length of "$q \times n_aL_a + n_bL_b$". Transmission using the transmission pattern (IV) provides input light with an optical path length of "$n_aL_a + q \times n_bL_b$". Thus, a phase difference of light emitted to the line image sensor 9 includes a phase difference=$k \times (q-1) \times (n_aL_a - n_bL_b)$.

Therefore, also in the structural example of FIG. 44, it is possible to measure a pressure difference between a pressure generated on the first measurement point and a pressure generated on the second measurement point by detecting a movement of an interference fringe based on an optical path difference of $(q-1) \times (n_aL_a - n_bL_b)$.

Also when the structure of FIG. 44 is used, the first sensor 2000a may be a plurality of sensors with same structures which are connected in parallel via optical fibers, and the sensor 2001a provided instead of the optical fiber 32a may be a plurality of sensors with same structures which are connected in parallel via optical fibers.

Moreover, the second sensor 2000b may be a plurality of sensors with same structures which are connected in parallel via optical fibers, and the sensor 2001b provided instead of the optical fiber 32b may be a plurality of sensors with same structures which are connected in parallel via optical fibers.

Also when the structural example of FIG. 44 is used, it is needless to say that sensors generating the interference fringes of FIG. 12 are applicable. In a case of using such a sensor, the interference fringes generated with no pressure difference between the two measurement points are not coincident with the central interference fringe.

FIGS. 42 to 44 have two measurement points. In the case of three or more measurement points, optical fibers and optical branching couplers are provided so that sensors are connected in series.

Moreover, also in the implementation of the structural examples shown FIGS. 42 to 44, as shown in FIG. 33, it is preferable to expand a measuring range by using a hierarchical structure which has one or more stages of optical fibers, starting from the optical fiber 8a, to split input light into two, and a hierarchical structure which has one or more stages of optical fibers, starting from the optical fiber 8b, to split input light into two, the optical fibers having different emitting intervals in the final stage where light is emitted to the line image sensor 9. In this structure, the line image sensor 9 may be a single line image sensor or a plurality of line image sensors.

Further, also in the implementation of the structural examples shown in FIGS. 42 to 44, in order to achieve miniaturization, it is preferable to integrate the optical fibers and optical branching couplers as many as possible into one platform, as shown in FIGS. 34, 35, and 36.

[4] Detail of Embodiment 2

The following will describe the detail of the present invention according to Embodiment 2. The measurement of a difference value between pressures on measurement points away from each other will be discussed as a concrete example.

FIG. 45 shows a structural example of the present invention according to Embodiment 2.

In the structural example of FIG. 45 according to the present invention, a first sensor pair 100 mounted on a first measurement point and a second sensor pair 200 mounted on a second measurement point are used to measure a difference value between a pressure generated on the first measurement point and a pressure on the second measurement point.

The first sensor pair 100 is constituted of a first pressure temperature sensor 100a to generate an optical path difference on input light according to a pressure generated on the first measurement point while being affected by a temperature on the first measurement point, and a first temperature sensor 100b to generate an optical path difference on input light only according to a temperature on the first measurement point.

On the other hand, the second sensor pair 200 is constituted of a second pressure temperature sensor 200a to generate an optical path difference on input light according to a pressure generated on the second measurement point while being affected by a temperature on the second measurement point, and a second temperature sensor $200b$ to generate an optical path difference on input light only according to a temperature on the second measurement point.

The first pressure temperature sensor $100a$ is constituted of a total reflection mirror $101a$ which is set on a pressure receiving member such as a diaphragm, a translucent mirror $102a$ which is opposed to the total reflection mirror $101a$, reflects a part of input light, and transmits the other part of the light, and a lens $103a$ which makes parallel light passing through the translucent mirror $102a$ and emits the parallel light to the total reflection mirror $101a$.

When a distance between the translucent mirror $102a$ and the total reflection mirror $101a$ is indicated by $L_{1a}$ and a refractive index of a material provided between the translucent mirror $102a$ and the total reflection mirror $101a$ is indicated by $n_{1a}$, the first pressure temperature sensor $100a$ generates an optical path difference of $2n_{1a}L_{1a}$ on input light for reflection on the translucent mirror $102a$ and reflection on the total reflection mirror $101a$.

Further, the first temperature sensor $100b$ is constituted of a total reflection mirror $101b$ which is set on a pressure receiving member such as a diaphragm, a translucent mirror $102b$ which is opposed to the total reflection mirror $101b$, reflects a part of input light, and transmits the other part of the light, and a lens $103b$ which makes parallel light passing through the translucent mirror $102b$ and emits the parallel light to the total reflection mirror $101b$.

When a distance between the translucent mirror $102b$ and the total reflection mirror $101b$ is indicated by $L_{1b}$ and a refractive index of a material provided between the translucent mirror $102b$ and the total reflection mirror $101b$ is indicated by $n_{1b}$, the first temperature sensor $100b$ generates an optical path difference of $2n_{1b}L_{1b}$ on input light for reflection on the translucent mirror $102b$ and reflection on the total reflection mirror $101b$.

On the other hand, the second pressure temperature sensor $200a$ has the same structure as the first pressure temperature sensor $100a$ and is constituted of a total reflection mirror $201a$ which is set on a pressure receiving member such as a diaphragm, a translucent mirror $202a$ which is opposed to the total reflection mirror $201a$, reflects a part of input light, and transmits the other part of the light, and a lens $203a$ which makes parallel light passing through the translucent mirror $202a$ and emits the parallel light to the total reflection mirror $201a$.

When a distance between the translucent mirror $202a$ and the total reflection mirror $201a$ is indicated by $L_{2a}$ and a refractive index of a material provided between the translucent mirror $202a$ and the total reflection mirror $201a$ is indicated by $n_{2a}$, the second pressure temperature sensor $200a$ generates an optical path difference of $2n_{2a}L_{2a}$ on input light for reflection on the translucent mirror $202a$ and reflection on the total reflection mirror $201a$.

Moreover, the second temperature sensor $200b$ has the same structure as the first temperature sensor $100b$ and is constituted of a total reflection mirror $201b$ which is set on a pressure receiving member such as a diaphragm, a translucent mirror $202b$ which is opposed to the total reflection mirror $201b$, reflects a part of input light, and transmits the other part of the light, and a lens $203b$ which makes parallel light passing through the translucent mirror $202b$ and emits the parallel light to the total reflection mirror $201b$.

When a distance between the translucent mirror $202b$ and the total reflection mirror $201b$ is indicated by $L_{2b}$ and a refractive index of a material provided between the translucent mirror $202b$ and the total reflection mirror $201b$ is indicated by $n_{2b}$, the second temperature sensor $200b$ generates an optical path difference of $2n_{2b}L_{2b}$ on input light for reflection on the translucent mirror $202b$ and reflection on the total reflection mirror $201b$.

For convenience of explanation, it is assumed that "$n_{1a}=n_{2a}$" is obtained and the first pressure temperature sensor $100a$ and the second pressure temperature sensor $200a$ are used with "$L_{1a}=L_{2a}$" when a pressure difference and a temperature difference are absent between the first measurement point and the second measurement point.

Moreover, for convenience of explanation, it is assumed that "$n_{1b}=n_{2b}$" is obtained and the first temperature sensor $100b$ and the second temperature sensor $200b$ are used with "$L_{1b}=L_{2b}$" when a temperature difference is absent between the first measurement point and the second measurement point.

In such a structure, when a pressure difference and a temperature difference are absent between a pressure and a temperature on the first measurement point and a pressure and a temperature on the second measurement point, "$L_{1a}=L_{2a}$" is obtained. The material provided between the translucent mirror $102a$ and the total reflection mirror $101a$ is the same as that between the translucent mirror $202a$ and the total reflection mirror $201a$, so that "$n_{1a}=n_{2a}$" is obtained. Thus, the optical path difference $2n_{1a}L_{1a}$ generated by the first pressure temperature sensor $100a$ and the optical path difference $2n_{2a}L_{2a}$ generated by the second pressure temperature sensor $200a$ are equal to each other.

In contrast, when a pressure difference is present between a pressure generated on the first measurement point and a pressure generated on the second measurement point, the two optical path differences are varied from each other. Additionally, the optical path differences are affected by temperatures.

On the other hand, when a temperature difference is absent between a temperature on the first measurement point and a temperature on the second measurement point, "$L_{1b}=L_{2b}$" is obtained. The material provided between the translucent mirror $102b$ and the total reflection mirror $101b$ is the same as that between the translucent mirror $202b$ and the total reflection mirror $201b$, so that "$n_{1b}=n_{2b}$" is obtained. Thus, the optical path difference $2n_{1b}L_{1b}$ generated by the first temperature sensor $100b$ and the optical path difference $2n_{2b}L_{2b}$ generated by the second temperature sensor $200b$ are equal to each other.

In contrast, when a temperature difference is present between a temperature on the first measurement point and a temperature on the second measurement point, the two optical path differences are varied from each other.

The structural example of FIG. 45, by detecting these optical path differences, makes it possible to measure a difference value between a pressure generated on the first measurement point and a pressure on the second measurement point without being affected by temperatures on the first and second measurement points. In addition to the first sensor pair $100$ and the second sensor pair $200$, the structural example of FIG. 45 includes a light source $1$, an optical fiber $2$, an optical fiber $3a$, an optical branching coupler $50a$, an optical branching coupler $4a$, an optical fiber $5$, an optical fiber $3b$, an optical branching coupler $50b$, an optical branching coupler $4b$, an optical fiber $6$, an optical branching coupler $7$, an optical fiber $8a$, an optical fiber $8b$, a line image sensor $9$, and an arithmetic apparatus $10$.

The light source $1$ is constituted of a so-called white light source such as an LED for emitting low-coherent light. The optical fiber 2 is an optical fiber of a single mode that extracts light emitted from the light source 1. The optical fiber 3a is an optical fiber of a single mode that is provided so as to correspond to the first sensor pair 100 and transmits light extracted by the optical fiber 2 to the first sensor pair 100.

The optical branching coupler 50a splits light transmitted through the optical fiber 3a into two and inputs the light to the first sensor pair 100. The optical branching coupler 4a couples the optical fiber 2 and the optical fiber 3a and splits light reversely transmitted through the optical fiber 3a. The optical fiber 5 is an optical fiber of a single mode that extracts light split by the optical branching coupler 4a. The optical fiber 3b is an optical fiber of a single mode that is provided so as to correspond to the second sensor pair 200 and transmits light extracted by the optical fiber 5 to the second sensor pair 200.

The optical branching coupler 50b splits light transmitted through the optical fiber 3b into two and inputs the light to the second sensor pair 200. The optical branching coupler 4b couples the optical fiber 5 and the optical fiber 3b and splits light reversely transmitted through the optical fiber 3b. The optical fiber 6 is an optical fiber of a single mode that extracts light split by the optical branching coupler 4b. The optical branching coupler 7 splits light extracted by the optical fiber 6 into two.

The optical fiber 8a is an optical fiber of a single mode that extracts one of the light beams split by the optical branching coupler 7. The optical fiber 8b is an optical fiber of a single mode that extracts the other light beam split by the optical branching coupler 7. The line image sensor 9 detects interference fringes generated by light emitted from the optical fiber 8a and the optical fiber 8b. The arithmetic apparatus 10 calculates a pressure difference between a pressure generated on the first measurement point and a pressure on the second measurement point based on the fringe positions of interference fringes detected by the line image sensor 9.

Additionally, as will be discussed later, the optical fibers 3a and 3b are not limited to single mode optical fibers and thus multimode optical fibers are also applicable. Accordingly, the optical fibers 2, 5, 6, 8a, and 8b are not limited to single mode optical fibers and thus multimode optical fibers are also applicable.

Figure 46A:
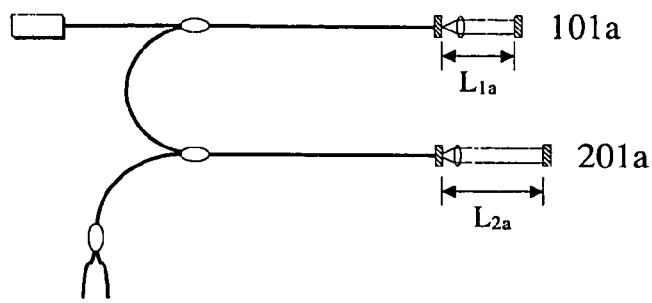
FIGS. 46A, 46B, 46C, and 46D are explanatory drawings showing light transmission patterns.
Figure 46B:
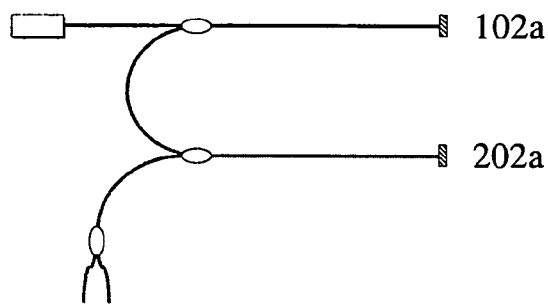
Figure 46C:
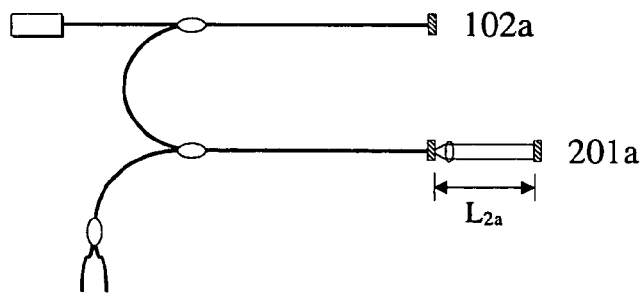
Figure 46D:
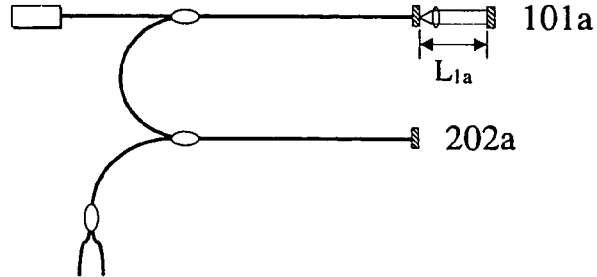

According to the present invention structured thus, in the relationship between the first pressure temperature sensor 100a and the second pressure temperature sensor 200a, four kinds of light transmission patterns are available: a transmission pattern of FIG. 46A where light is reflected on the total reflection mirror 101a, is reflected on the total reflection mirror 201a, and is transmitted from there, a transmission pattern of FIG. 46B where light is reflected on the translucent mirror 102a, is reflected on the translucent mirror 202a, and is transmitted from there, a transmission pattern of FIG. 46C where light is reflected on the translucent mirror 102a, is reflected on the total reflection mirror 201a, and is transmitted from there, and a transmission pattern of FIG. 46D where light is reflected on the total reflection mirror 101a, is reflected on the translucent mirror 202a, and is transmitted from there.

For convenience of explanation, the transmission pattern of FIG. 46A will be referred to as a first transmission pattern, the transmission pattern of FIG. 46B will be referred to as a second transmission pattern, the transmission pattern of FIG. 46C will be referred to as a third transmission pattern, and the transmission pattern of FIG. 46D will be referred to as a fourth transmission pattern.

Figure 47:
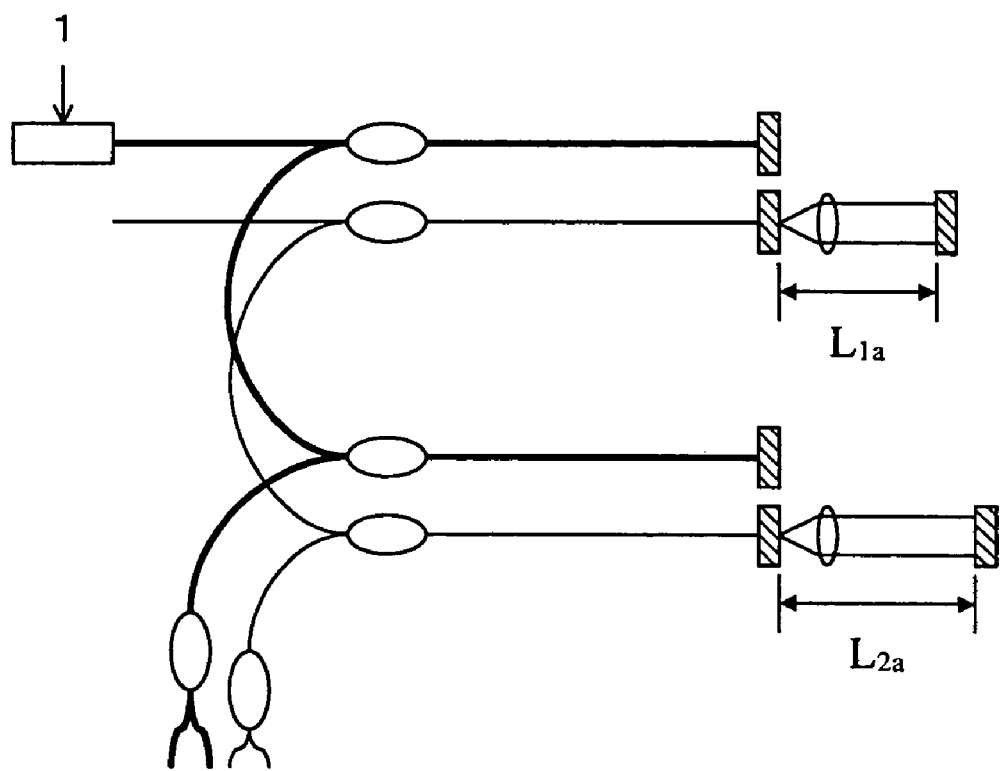
FIGS. 47, 48A, 48B, 49A, 49B, and 50 an explanatory drawings showing a light transmission pattern or patterns.
Figure 48A:
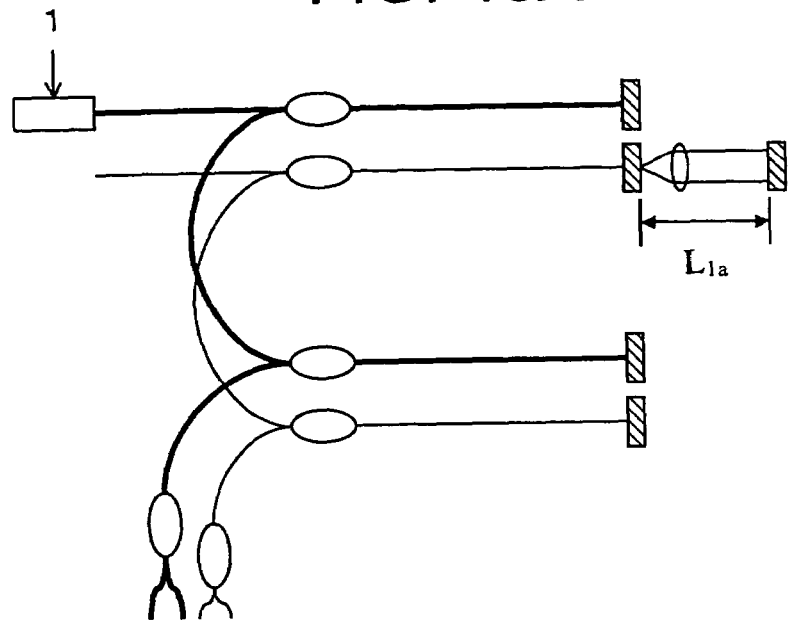
Figure 48B:
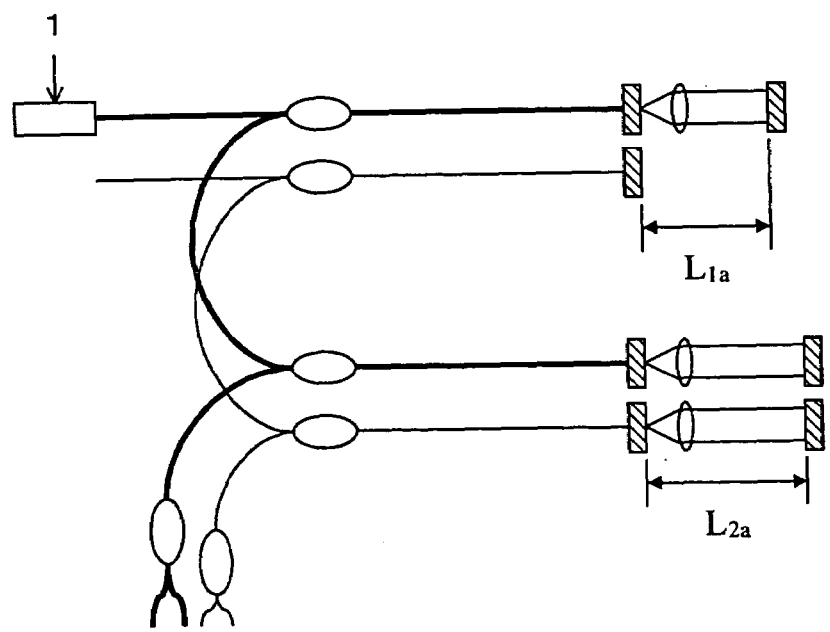
Figure 49A:
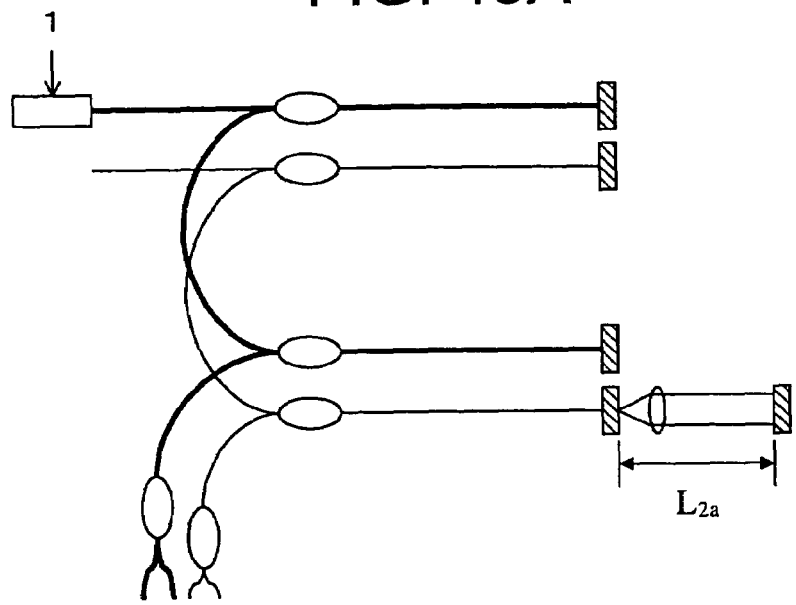
Figure 49B:
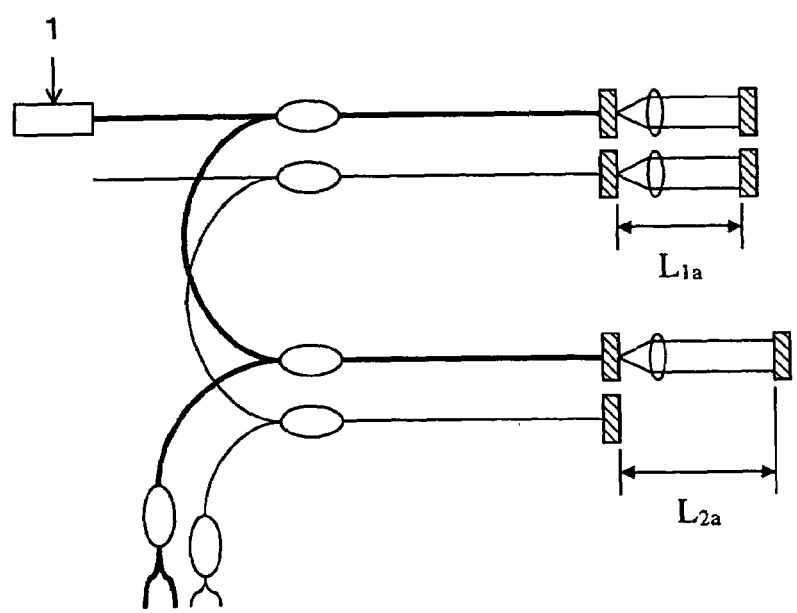
Figure 50:
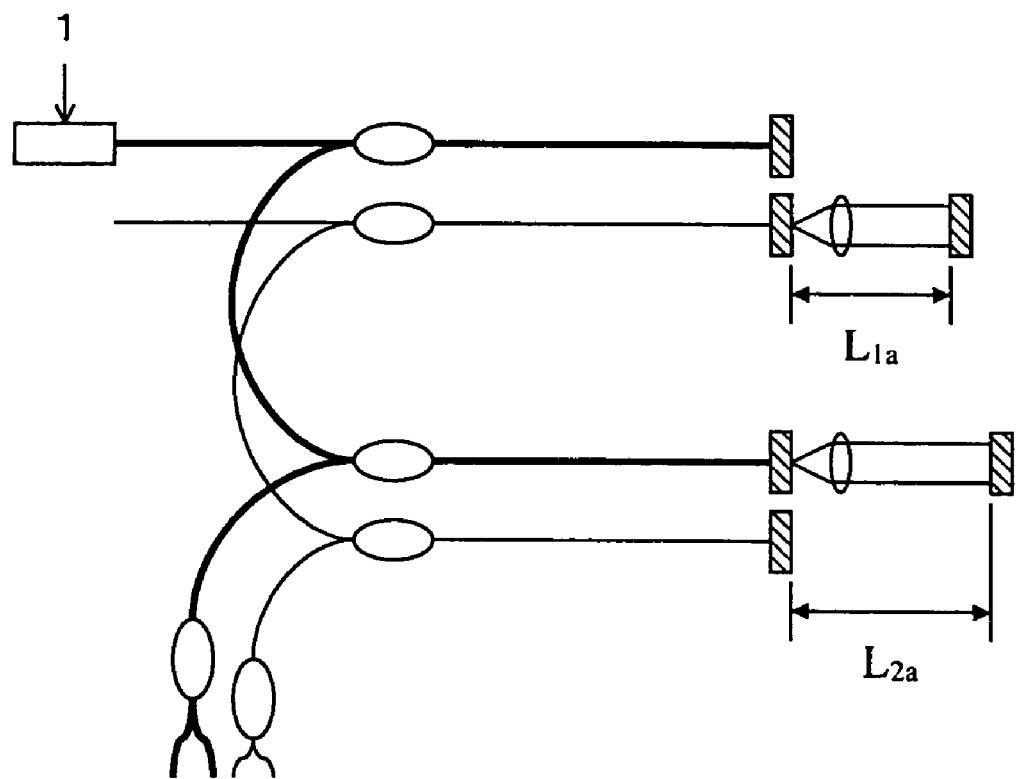

Therefore, light emitted to the line image sensor 9 has four kinds of phase differences:

(I) a phase difference=$k \times 2(n_{1a}L_{1a}+n_{2a}L_{2a})$ generated by a combination of the first transmission pattern and the second transmission pattern as shown in FIG. 47, (II) a phase difference=$k \times 2n_{1a}L_{1a}$ generated by a combination of the second transmission pattern and the fourth transmission pattern (FIG. 48A) and a combination of the first transmission pattern and the third transmission pattern (FIG. 48B) as shown in FIG. 48, (III) a phase difference=$k \times 2n_{2a}L_{2a}$ generated by a combination of the second transmission pattern and the third transmission pattern (FIG. 49A) and a combination of the first transmission pattern and the fourth transmission pattern (FIG. 49B) as shown in FIG. 49, and (IV) a phase difference=$k \times 2(n_{1a}L_{1a}-n_{2a}L_{2a})$ generated by a combination of the third transmission pattern and the fourth transmission pattern as shown in FIG. 50.

As with the above, the relationship between the first temperature sensor 100b and the second temperature sensor 200b also has the four kinds of light transmission patterns shown in FIG. 46. Accordingly, four kinds of phase differences of $k \times 2(n_{1b}L_{1b}+n_{2b}L_{2b})$, $k \times 2n_{1b}L_{1b}$, $k \times 2n_{2b}L_{2b}$, and $k \times 2(n_{1b}L_{1b}-n_{2b}L_{2b})$ are available which correspond to FIGS. 47 to 50.

Meanwhile, between the light which is emitted from the optical fiber 8a and reaches a given point (z, 0) on the line image sensor 9 and light which is also emitted from the optical fiber 8b and reaches the given point (Z, 0) on the line image sensor 9, an optical path difference $\Delta$ is present which is calculated by the equation of FIG. 7 (equation of Young's interferometer) described in the Embodiment 1.

In this equation, "h" represents a distance between the line image sensor 9 and the ends of the optical fibers 8a and 8b and "2a" represents a distance between the ends of the optical fibers 8a and 8b.

Based on the relationship between the first pressure temperature sensor 100a and the second pressure temperature sensor 200a, when the following conditions are established:

$$l_c \geq \Delta - 2(n_{1a}L_{1a}+n_{2a}L_{2a})$$

$$l_c \geq \Delta - 2(n_{1a}L_{1a}-n_{2a}L_{2a})$$

$$l_c \geq \Delta - 2n_{1a}L_{1a}$$

$$l_c \geq \Delta - 2n_{2a}L_{2a}$$

$$l_c \geq \Delta + 2(n_{1a}L_{1a}+n_{2a}L_{2a})$$

$$l_c \geq \Delta + 2(n_{1a}L_{1a}-n_{2a}L_{2a})$$

$$l_c \geq \Delta + 2n_{1a}L_{1a}$$

$$l_c \geq \Delta + 2n_{2a}L_{2a}$$

where $l_c$ represents a coherence length of light emitted from the light source 1, interference fringes generated on the line image sensor 9 have high interference intensity at a place where the following conditions are established:

$$\Delta = 2(n_{1a}L_{1a}+n_{2a}L_{2a})$$

$$\Delta = 2(n_{1a}L_{1a}-n_{2a}L_{2a})$$

$$\Delta = 2n_{1a}L_{1a}$$

$$\Delta = 2n_{2a}L_{2a}$$

On the assumption that a beam having a beam intensity of a Gaussian distribution is used, the intensity of interference fringes generated on the line image sensor 9 can be simulated according to the model equation of FIG. 51.

The model equation indicates interference fringes generated by the first pressure temperature sensor 100a and the second pressure temperature sensor 200a. $n_{1a}L_{1a}$ and $n_{2a}L_{2a}$ included in the equation are changed according to a pressure and a temperature.

Additionally, regarding the interference fringes generated by the first temperature sensor 100b and the second temperature sensor 200b, the intensity is calculated by a model equation obtained by replacing $n_{1a}L_{1a}$ and $n_{2a}L_{2a}$ included in the above equation with $n_{1b}L_{1b}$ and $n_{2b}L_{2b}$ (changed only according to a temperature).

It can be said that the simulation results of FIG. 9 described in Embodiment 1 show a simulation example of interference fringes generated by the first pressure temperature sensor 100a and the second pressure temperature sensor 200a.

However, in this case, $L_a$ of FIG. 9 is replaced with $L_{1a}$ and $L_b$ of FIG. 9 is replaced with $L_{2a}$. (i) of FIG. 9 represents a central interference fringe appearing on a fixed position at the center, (ii) of FIG. 9 represents interference fringes based on an optical path difference factor of $2(n_{1a}L_{1a}-n_{2a}L_{2a})$, (ii) of FIG. 9 represents interference fringes based on an optical path difference factor of $2n_{1a}L_{1a}$, (iv) of FIG. 9 represents interference fringes based on an optical path difference factor of $2n_{2a}L_{2a}$, and (v) of FIG. 9 represents interference fringes based on an optical path difference factor of $2(n_{1a}L_{1a}+n_{2a}L_{2a})$.

As is understood from the simulation, the interference fringes appear symmetrically and move in opposite directions as $L_{2a}$ increases.

The optical path difference factor of $2(n_{1a}L_{1a}-n_{2a}L_{2a})$ represents a pressure difference between a pressure generated on the first measurement point where the first pressure temperature sensor 100a is disposed and a pressure generated on the second measurement point where the second pressure temperature sensor 200a is disposed. The pressure difference can be measured by detecting a movement of the interference fringe generated based on the optical path difference factor of $2(n_{1a}L_{1a}-n_{2a}L_{2a})$.

However, since the first pressure temperature sensor 100a and the second pressure temperature sensor 200a are affected by temperatures, when a movement of the interference fringe based on the optical path difference factor of $2(n_{1a}L_{1a}-n_{2a}L_{2a})$ is detected and a pressure difference is calculated based on the movement, the measurement of the pressure difference is affected by temperatures.

On the other hand, as in the relationship between the first temperature sensor 100b and the second temperature sensor 200b, high interference intensity is obtained under the same conditions at a place where the following conditions are satisfied:

$\Delta=2(n_{1b}L_{1b}+n_{2b}L_{2b})$ $\Delta=2(n_{1b}L_{1b}-n_{2b}L_{2b})$ $\Delta=2n_{1b}L_{1b}$ $\Delta=2n_{2b}L_{2b}$ Further, the optical path difference factor of $2(n_{1b}L_{1b}-n_{2b}L_{2b})$ represents a temperature difference between a temperature on the first measurement point where the first temperature sensor 100b is disposed and a temperature on the second measurement point where the second temperature sensor 200b is disposed. The temperature difference can be measured by detecting a movement of the interference fringe generated based on the optical path difference factor of $2(n_{1b}L_{1b}-n_{2b}L_{2b})$.

Moreover, in order to prevent interference between the first pressure temperature sensor 100a and the first temperature sensor 100b, the following conditions are established:

$l_c \leq \Delta - 2(n_{1a}L_{1a}-n_{1b}L_{1b})$ $l_c \leq \Delta + 2(n_{1a}L_{1a}-n_{1b}L_{1b})$ Besides, in order to prevent interference between the second pressure temperature sensor 200a and the second temperature sensor 200b, the following conditions are established:

$l_c \leq \Delta - 2(n_{2a}L_{2a}-n_{2b}L_{2b})$ $l_c \leq \Delta + 2(n_{2a}L_{2a}-n_{2b}L_{2b})$ The arithmetic apparatus 10 detects a movement of the interference fringe generated based on the optical path difference factor of $2(n_{1a}L_{1a}-n_{2a}L_{2a})$, detects a movement of the interference fringe generated based on the optical path difference factor of $2(n_{1b}L_{1b}-n_{2b}L_{2b})$, and performs a processing to calculate, based on the movements, a pressure difference between a pressure generated on the first measurement point and a pressure generated on the second measurement point without being affected by temperatures.

Figure 53:
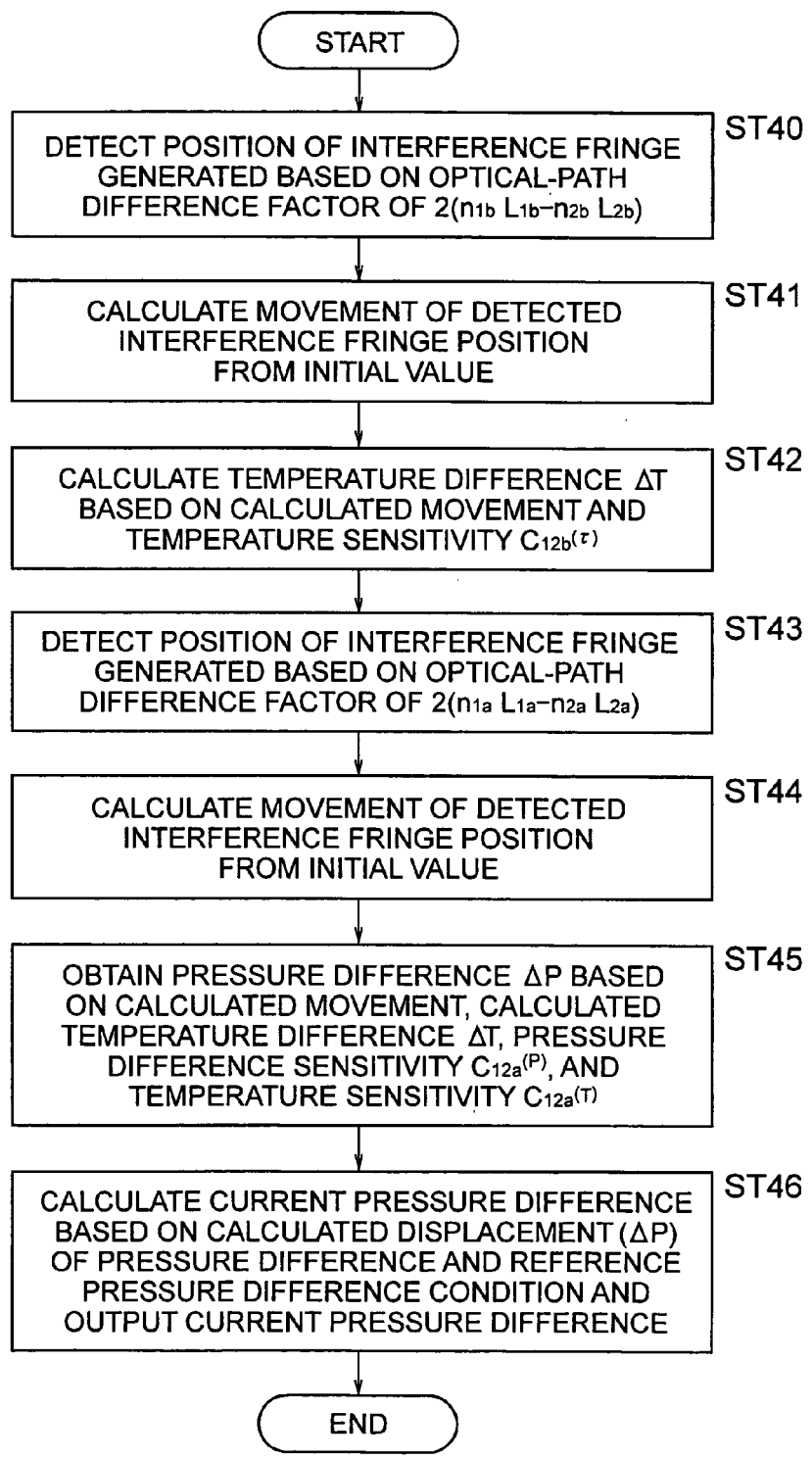

FIGS. 52 and 53 show the processing contents of the arithmetic apparatus 10 in flowcharts.

By performing the processing of the flowchart shown in FIG. 52 before actual measurement, the arithmetic apparatus 10 calculates an arithmetic parameter required for actual measurement and stores the parameter in a memory.

Namely, as shown in the flowchart of FIG. 52, the arithmetic apparatus 10 firstly determines a reference pressure difference condition for measurement in step 30 and stores the condition in the memory before actual measurement.

Subsequently in step 31, under the determined reference pressure difference condition, the position of interference fringe based on the optical path difference factor of $2(n_{1a}L_{1a}-n_{2a}L_{2a})$ is actually detected, the position of interference fringe based on the optical path difference factor of $2(n_{1b}L_{1b}-n_{2b}L_{2b})$ is actually detected, and the positions are stored in the memory as the initial values of the interference fringe positions.

As is understood from the simulation results of FIG. 9, in the case where a pressure difference and a temperature difference are absent between the first measurement point and the second measurement point, when the first pressure temperature sensor 100a and the second pressure temperature sensor 200a are used with "$n_{1a}L_{1a}=n_{2a}L_{2a}$", the position of the interference fringe based on the optical path difference factor of $2(n_{1a}L_{1a}-n_{2a}L_{2a})$ is brought closer to the central interference fringe than the positions of the interference fringes based on the optical path difference factors of $2(n_{1a}L_{1a}-n_{2a}L_{2a})$, $2n_{1a}L_{1a}$, and $2n_{2a}L_{2a}$.

Further, in the case where a temperature difference is absent between the first measurement point and the second measurement point, when the first temperature sensor 100b and the second temperature sensor 200b are used with "$n_{1b}L_{1b}=n_{2b}L_{2b}$", the position of the interference fringe based on the optical path difference factor of $2(n_{1b}L_{1b}-n_{2b}L_{2b})$ is brought closer to the central interference fringe than the positions of the interference fringes based on the optical path difference factors of $2(n_{1b}L_{1b}+n_{2b}L_{2b})$, $2n_{1b}L_{1b}$, and $2n_{2b}L_{2b}$.

Meanwhile, whether the position of the interference fringe based on the optical path difference factor of $2(n_{1a}L_{1a}-n_{2a}L_{2a})$ or the position of the interference fringe based on the optical path difference factor of $2(n_{1b}L_{1b}-n_{2b}L_{2b})$ is closer to the central interference fringe is fundamentally determined by the magnitude relation of $L_{1a}$ (coincident with $L_{2a}$ when a pressure difference and a temperature difference are absent) and $L_{1b}$ (coincident with $L_{2b}$ when a temperature difference is absent).

As is understood from the above fact, it is possible to uniquely determine the order of generating interference fringes, starting from the central interference fringe, based on matters of design variation and thus it is possible to detect the position of the interference fringe generated based on the optical path difference factor of $2(n_{1a}L_{1a}-n_{2a}L_{2a})$ or the position of the interference fringe generated based on the optical path difference factor of $2(n_{1b}L_{1b}-n_{2b}L_{2b})$. Hence, in step 31, processings are performed so that the positions of these interference fringes are actually detected under the determined reference pressure difference condition and are stored in the memory as the initial values of the interference fringe positions.

At this point, the positions of the interference fringes are detected by, for example, obtaining a differential value of a pixel value outputted by the line image sensor 9 and detecting the position of the maximum differential value appearing from the central interference fringe according to a prescribed order. Further, in order to increase a resolving power, it is preferable to perform detection on symmetrical positions.

When the reference pressure difference condition has a pressure difference of 0, since the central interference fringe serves as the initial value of the interference fringe position, the processing of step 31 can be omitted.

Subsequently, in step 32, a pressure difference is actually changed in the neighborhood of the determined reference pressure difference condition with a constant temperature difference. Regarding a pressure difference determined as a movement of an interference fringe per unit pressure difference, a sensitivity $C_{12a}^{(P)}$ is determined according to a movement of the position of the interference fringe generated based on the optical path difference factor of $2(n_{1a}L_{1a}-n_{2a}L_{2a})$, and the sensitivity is stored in the memory.

Then, in step 33, a temperature difference is actually changed in the neighborhood of the determined reference pressure difference condition with a constant pressure difference. Regarding a temperature determined as a movement of an interference fringe per unit temperature difference, a sensitivity $C_{12a}^{(T)}$ is determined according to a movement of the position of the interference fringe generated based on the optical path difference factor of $2(n_{1a}L_{1a}-n_{2a}L_{2a})$, and the sensitivity is stored in the memory.

Subsequently, in step 34, a temperature difference is actually changed in the neighborhood of the determined reference pressure difference condition with a constant pressure difference. Regarding a temperature determined as a movement of an interference fringe per unit temperature difference, a sensitivity $C_{12b}^{(T)}$ is determined according to a movement of the position of the interference fringe generated based on the optical path difference factor of $2(n_{1b}L_{1b}-n_{2b}L_{2b})$, and the sensitivity is stored in the memory.

On the other hand, when measurements are actually performed, the arithmetic apparatus 10 performs the processing of the flowchart shown in FIG. 53 so as to measure a pressure difference without being affected by temperatures.

Namely, as shown in the flowchart of FIG. 53, when measurements are actually performed, the arithmetic apparatus 10 first detects, in step 40, the position of an interference fringe generated based on the optical path difference factor of $2(n_{1b}L_{1b}-n_{2b}L_{2b})$.

At this point, the interference fringe position is detected by, for example, obtaining a differential value of a pixel value outputted by the line image sensor 9 and detecting the position of a maximum differential value appearing from the central interference fringe according to the prescribed order. Further, in order to increase a resolving power, it is preferable to perform detection on symmetrical positions.

Subsequently, in step 41, a difference value is calculated between the detected interference fringe position and the initial value of the corresponding interference fringe position that is stored in the memory, so that a movement $\Delta D_{12b}$ is calculated from the initial value of the position of interference fringe generated based on the optical path difference factor of $2(n_{1b}L_{1b}-n_{2b}L_{2b})$.

Then, in step 42, the calculated movement $\Delta D_{12b}$ is divided by the temperature sensitivity $C_{12b}^{(T)}$ stored in the memory, so that a temperature difference $\Delta T$ between a temperature on the first measurement point and a temperature on the second measurement point is calculated.

Subsequently, in step 43, the position of the interference fringe based on the optical path difference factor of $2(n_{1a}L_{1a}-n_{2a}L_{2a})$ is detected.

At this point, the interference fringe position is detected by, for example, obtaining a differential value of a pixel value outputted by the line image sensor 9 and detecting the position of the maximum differential value appearing from the central interference fringe according to the prescribed order. Further, in order to increase a resolving power, it is preferable to perform detection on symmetrical positions.

Subsequently, in step 44, a difference value is calculated between the detected interference fringe position and the initial value of the corresponding interference fringe position that is stored in the memory, so that a movement $\Delta D_{12a}$ is calculated from the initial value of the interference fringe position generated based on the optical path difference factor of $2(n_{1a}L_{1a}-n_{2a}L_{2a})$.

Then, in step 45, a displacement of a pressure difference from the reference pressure difference condition stored in the memory is calculated based on the calculated movement $\Delta D_{12a}$, the calculated temperature difference $\Delta T$, the pressure sensitivity $C_{12a}^{(P)}$ stored in the memory, and the temperature sensitivity $C_{12a}^{(T)}$ stored in the memory according to the above-described equation:

$$\Delta P=(\Delta D_{12a}-C_{12a}^{(T)}\times\Delta T)/C_{12a}^{(P)}$$

Subsequently, in step 46, a current pressure difference is calculated by adding the calculated pressure difference displacement $\Delta P$ and the reference pressure difference condition stored in the memory, and the current pressure difference is outputted as a measurement result.

In this way, the arithmetic apparatus 10 detects a movement of the interference fringe generated based on the optical path difference factor of $2(n_{1a}L_{1a}-n_{2a}L_{2a})$ and a movement of the interference fringe generated based on the optical path difference factor of $2(n_{1b}L_{1b}-n_{2b}L_{2b})$, calculates a pressure difference between a pressure generated on the first measurement point and a pressure on the second measurement point based on the movements without being affected by temperatures, and outputs the pressure difference.

In the above structural example, it was assumed that the first pressure temperature sensor 100a and the second pressure temperature sensor 200a are used with "$n_{1a}L_{1a}=n_{2a}L_{2a}$" when a pressure difference and a temperature difference are absent between the first measurement point and the second measurement point.

In this case, as is understood from the simulation results of FIG. 9, the interference fringe generated based on the optical path difference factor of $2(n_{1a}L_{1a}-n_{2a}L_{2a})$ indicating a pressure difference and a temperature difference between the first measurement point and the second measurement point is moved so as to be separated from the central interference fringe, starting from the position of the central interference fringe generated based on the Young's interferometer, as an absolute value of the pressure difference increases.

The present invention is not limited to the use of the first pressure temperature sensor 100a and second pressure temperature sensor 200a structured thus. It is also possible to use the first pressure temperature sensor 100a and the second pressure temperature sensor 200a with "$n_{1a}L_{1a}\neq n_{2a}L_{2a}$" when a pressure difference and a temperature difference are absent between the first measurement point and the second measurement point. In this case, a negative pressure can be measured.

Namely in the case where a pressure difference and a temperature difference are absent between the first measurement point and the second measurement point, when the first pressure temperature sensor 100a and the second pressure temperature sensor 200a are used with "$n_{1a}L_{1a}\neq n_{2a}L_{2a}$", the interference fringe based on the optical path difference factor of $2(n_{1a}L_{1a}-n_{2a}L_{2a})$ is moved along a direction indicated by the code of $2(n_{1a}L_{1a}-n_{2a}L_{2a})$, starting from the position of an interference fringe other than the central interference fringe. Thus, it is possible to measure a negative pressure reversing a pressure difference between the first measurement point and the second measurement point.

Figure 54A:
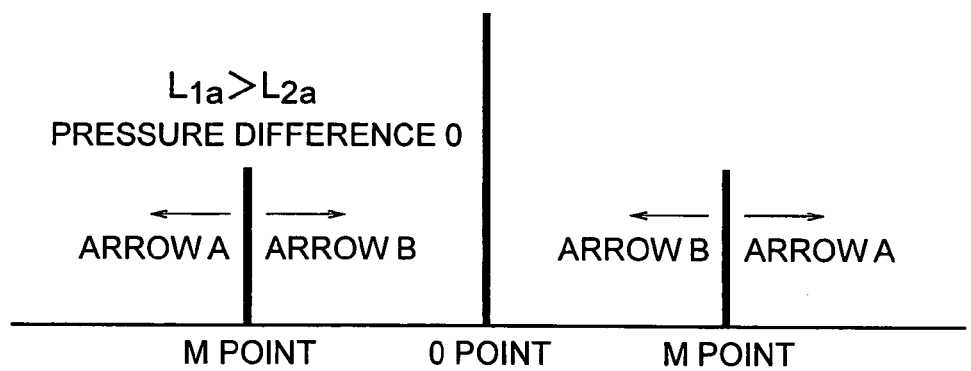
FIGS. 54A and 54B are explanatory drawings showing the movement of interference fringes.

For example, on the assumption that "$n_{1a}=n_{2a}$" and "$L_{1a}>L_{2a}$" are obtained, as shown in FIG. 54A where the position of the central interference fringe is indicated by point, a movement is made along the direction of arrow A when the value of "$L_{1a}-L_{2a}$" increases, and a movement is made along the direction of arrow B when the value of "$L_{1a}-L_{2a}$" decreases, starting from the position of an interference fringe on M point other than the central interference fringe. Thus, it is possible to measure a negative pressure reversing a pressure difference between a pressure generated on the first measurement point and a pressure generated on the second measurement point.

Figure 54B:
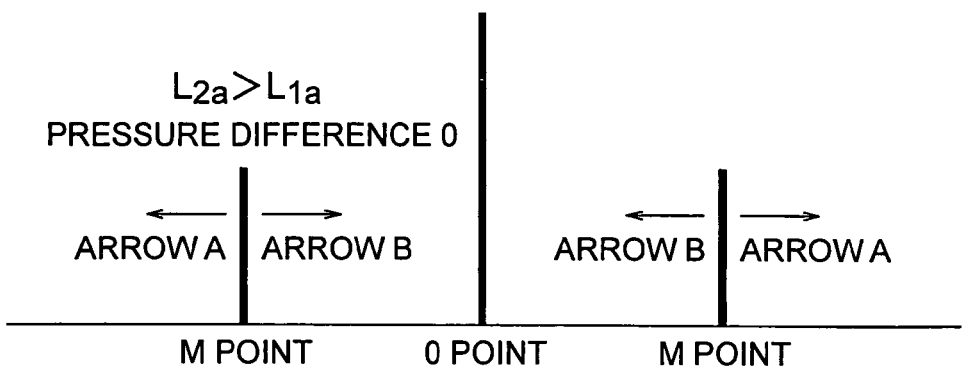

Further, on the assumption that "$n_{1a}=n_{2a}$" and "$L_{2a}>L_{1a}$" are obtained, as shown in FIG. 54B where the position of the central interference fringe is indicated by point, a movement is made along the direction of arrow A when the value of "$L_{2a}-L_{1a}$" increases, and a movement is made along the direction of arrow B when the value of "$L_{2a}-L_{1a}$" decreases, starting from the position of an interference fringe on M point other than the central interference fringe. Thus, it is possible to measure a negative pressure reversing a pressure difference between a pressure generated on the first measurement point and a pressure generated on the second measurement point.

However, the first pressure temperature sensor 100a fundamentally changes an optical path difference according to a pressure generated on the first measurement point and the second pressure temperature sensor 200a fundamentally changes an optical path difference according to a pressure generated on the second measurement point. Hence, regardless of a temperature difference, when a pressure difference is absent between the first measurement point and the second measurement point, it is possible to measure a negative pressure reversing a pressure difference between the first measurement point and the second measurement point also by using the first pressure temperature sensor 100a and the second pressure temperature sensor 200a with "$n_{1a}L_{1a}\neq n_{2a}L_{2a}$".

As described above, the arithmetic apparatus 10 employs the method of setting the reference pressure difference condition, detecting the initial value of an interference fringe under the reference pressure difference condition, and detecting a displacement from the initial value, so that a pressure difference value is measured in consideration of a temperature difference. Thus, regarding the movement of the interference fringes of FIG. 54, a pressure difference value can be measured by detecting the movement.

Similarly, in the above-described structural example, it was assumed that the first temperature sensor 100b and the second temperature sensor 200b are used with "$n_{1b}L_{1b}=n_{2b}L_{2b}$" when a temperature difference is absent between the first measurement point and the second measurement point. The present invention is not limited to the use of the first temperature sensor 100b and second temperature sensor 200b structured thus. It is also possible to use the first temperature sensor 100b and the second temperature sensor 200b with "$n_{1b}L_{1b}\neq n_{2b}L_{2b}$" when a temperature difference is absent between the first measurement point and the second measurement point.

Moreover, in the above-described structural example, although it was assumed that the optical fibers 3a and 3b are single mode optical fibers, multimode optical fibers are applicable.

Since a multimode optical fiber is larger in core diameter than a single mode optical fiber, when multimode optical fibers are used as the optical fibers 3a and 3b, the following advantage is obtained: light returning from the first sensor pair 100 having a Fabry-Perot structure is efficiently returned to the core of the optical fiber 3a (to be precise, the core of the optical fiber connected to the translucent mirrors 102a and 102b), and light returning from the second sensor pair 200 having a Fabry-Perot structure is efficiently returned to the core of the optical fiber 3b (to be precise, the core of the optical fiber connected to the translucent mirrors 202a and 202b).

Figure 55:
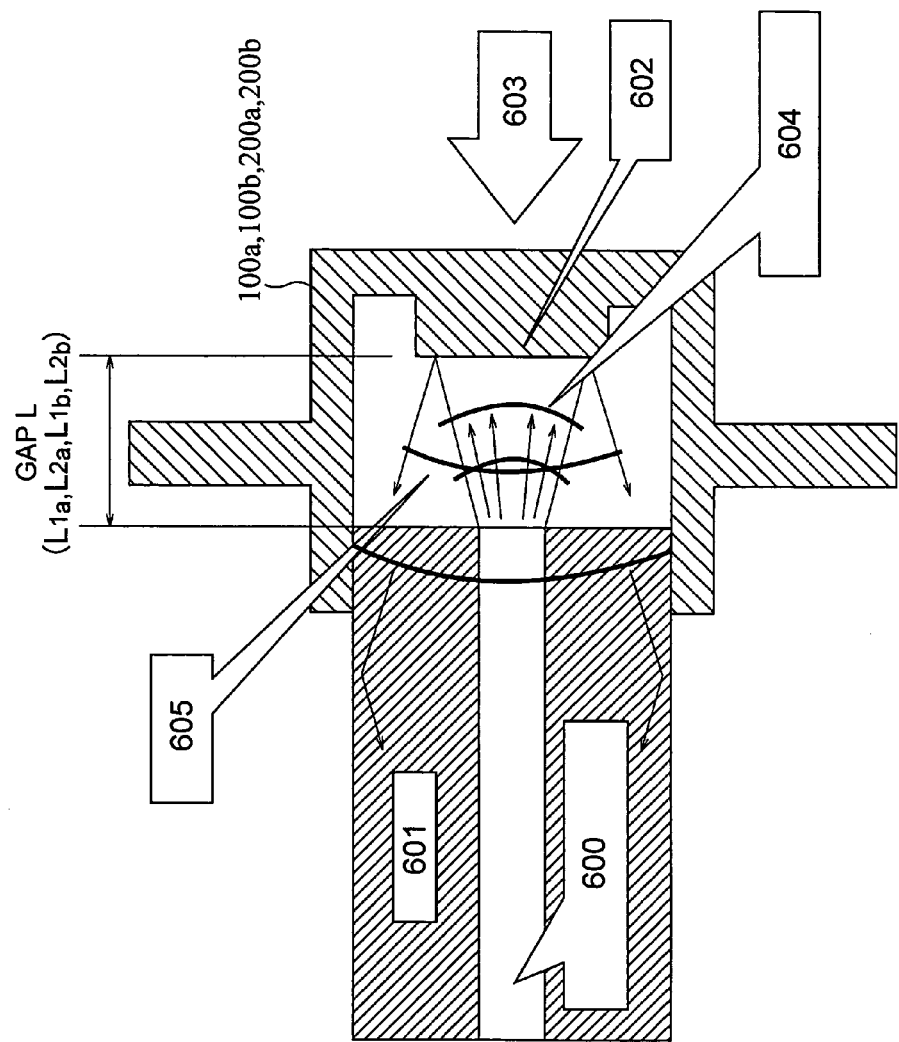
FIG. 55 is an explanatory drawing showing a sensor having the Fabry-Perot structure.

Namely, as shown in FIG. 55, light returning from the first sensor pair 100 and the second sensor pair 200 of Fabry-Perot structures is partly returned to the clad 601 of the optical fiber 3a and the optical fiber 3b. When the optical fiber 3a and the optical fiber 3b have large core diameters, since a ratio of light returned to the clad 601 is reduced, it is possible to obtain an advantage of efficient return of light from the first sensor pair 100 and the second sensor pair 200 to the cores 600 of the optical fiber 3a and the optical fiber 3b.

Meanwhile, as is understood from FIG. 51 showing the model equation of the intensity of interference fringes, an interference fringe generated on the line image sensor 9 has a width determined by a coherence length $l_c$ according to a damping term of $\gamma(A)$ which has a damping coefficient determined by the coherence length $l_c$.

Therefore, unless the interference fringe based on the optical path difference factor of $2(n_{1a}L_{1a}-n_{2a}L_{2a})$ goes out of the width of the central interference fringe generated based on the Young's interferometer, it is not possible to detect the movement of the interference fringe generated based on the optical path difference factor of $2(n_{1a}L_{1a}-n_{2a}L_{2a})$.

Further, unless the interference fringe generated based on the optical path difference factor of $2(n_{1b}L_{1b}-n_{2b}L_{2b})$ goes out of the width of the central interference fringe generated based on the Young's interferometer, it is not possible to detect the movement of the interference fringe generated based on the optical path difference factor of $2(n_{1b}L_{1b}-n_{2b}L_{2b})$.

Thus, it is necessary to increase the lengths of $L_{1a}$, $L_{2a}$, $L_{1b}$, and $L_{2b}$. Also in this case, the core diameters of the optical fiber 3a and the optical fiber 3b need to be increased to efficiently return light to the cores of the optical fiber 3a and the optical fiber 3b.

In this way, when multimode optical fibers are used as the optical fibers 3a and 3b, the following advantage is achieved: light returned from the first sensor pair 100 can be efficiently returned to the core of the optical fiber 3a and light returned from the second sensor pair 200 can be efficiently returned to the core of the optical fiber 3b. Hence, the lengths of the $L_{1a}$, $L_{2a}$, $L_{1b}$, and $L_{2b}$ can be increased and thus it is possible to achieve an advantage of correct measurement on the movement of the interference fringe generated based on the optical path difference factor of $2(n_{1a}L_{1a}-n_{2a}L_{2a})$ and correct measurement on the movement of the interference fringe generated based on the optical path difference factor of $2(n_{1b}L_{1b}-n_{2b}L_{2b})$.

The simulation results of FIGS. 14 to 16 described in Embodiment 1 also serve as the simulation results of a light parameter loss based on the gap lengths L of the first pressure temperature sensor 100a, the second pressure temperature sensor 200a, the first temperature sensor 100b, and the second temperature sensor 200b.

Namely, as is understood from the simulation results of FIG. 15, when a light parameter loss of 0.1% is used as an index, since the upper limit value of a ratio (L/φ) of the gap length L to the core diameter φ is about 0.5 for the core diameter φ of 10 μm, the upper limit value of the gap length L is about 5 μm.

Further, when the core diameter φ is 20 μm, since the upper limit value of a ratio (L/φ) of the gap length L to the core diameter φ is about 0.8, the upper limit value of the gap length L is about 16 μm.

Moreover, when the core diameter φ is 40 μm, since the upper limit value of a ratio (L/φ) of the gap length L to the core diameter φ is about 1.2, the upper limit value of the gap length L is about 48 μm.

Besides, when the core diameter φ is 60 μm, since the upper limit value of a ratio (L/φ) of the gap length L to the core diameter φ is about 1.5, the upper limit value of the gap length L is about 90 μm.

Additionally, as is understood from the simulation results of FIG. 16, when a light parameter loss of 0.01% is used as an index, since the upper limit value of a ratio (L/φ) of the gap length L to the core diameter φ is about 0.2 for the core diameter φ of 10 μm, the upper limit value of the gap length L is about 2 μm.

Further, when the core diameter φ is 20 μm, since the upper limit value of a ratio (L/φ) of the gap length L to the core diameter φ is about 0.2, the upper limit value of the gap length L is about 4 μm.

Moreover, when the core diameter φ is 40 μm, since the upper limit value of a ratio (L/φ) of the gap length L to the core diameter φ is about 0.4, the upper limit value of the gap length L is about 16 μm.

Besides, when the core diameter φ is 60 μm, since the upper limit value of a ratio (L/φ) of the gap length L to the core diameter φ is about 0.5, the upper limit value of the gap length L is about 30 μm.

As described above, when the core diameters of the optical fiber 3a and the optical fiber 3b are determined, the upper limit values are determined for the gap lengths L of the first pressure temperature sensor 100a, the second pressure temperature sensor 200a, the first temperature sensor 100b, and the second temperature sensor 200b in view of a light parameter loss.

For example, in the case of a commercial single mode optical fiber with the core diameter φ of 12.5 μm, when a light parameter loss is reduced to 0.1%, since the upper limit value of a ratio (L/φ) of the gap length L to the core diameter φ is about 0.6, the gap length L needs to be set at 7.5 μm or smaller. Further, in the case of a commercial multimode optical fiber with the core diameter φ of 50 μm, when a light parameter loss is reduced to 0.1%, since the upper limit value of a ratio (L/φ) of the gap length L to the core diameter φ is about 1.35, the gap length L needs to be set at 67 μm or smaller.

However, it is needless to say that when an increase in light parameter loss is tolerated, the upper limit value is set larger than the above values.

Besides, it is needless to say that this condition is strictly based on the first pressure temperature sensor 100a, the second pressure temperature sensor 200a, the first temperature sensor 100b, and the second temperature sensor 200b of Fabry-Perot structures. In the case of another structure having a pressure receiving part constituted of an optical waveguide, the upper limit value is not limited to the above values.

As described above, when the gap lengths L ($L_{1a}$, $L_{2a}$) of the first pressure temperature sensor 100a and the second pressure temperature sensor 200a are increased, since the interference fringe based on the optical path difference factor of $2(n_{1a}L_{1a}-n_{2a}L_{2a})$ goes far out of the width of the central interference fringe generated based on the Young's interferometer, it is possible to correctly detect the movement of the interference fringe with advantage.

Further, when the gap lengths L ($L_{1b}$, $L_{2b}$) of the first temperature sensor 100b and the second temperature sensor 200b are increased, since the interference fringe based on the optical path difference factor of $2(n_{1b}L_{1b}-n_{2b}L_{2b})$ goes far out of the width of the central interference fringe generated based on the Young's interferometer, it is possible to correctly detect the movement of the interference fringe with advantage.

It can be said that the simulation results described in FIGS. 17 and 18 according to Embodiment 1 show an example of the simulation of interference fringes generated by the first pressure temperature sensor 100a and the second pressure temperature sensor 200a.

However, in this case, $L_a$ is replaced with $L_{1a}$ and $L_b$ is replaced with $L_{2a}$ in FIGS. 17 and 18.

Moreover, the simulation results of FIG. 17A show simulation results obtained based on the model equation of FIG. 51, on the assumption that a single mode optical fiber with "$L_{1a}$=6 μm, $L_{1b}$=5 μm" is used. In this case, since $L_{1a}$ and $L_{2a}$ are small, the interference fringe based on the optical path difference factor of $2(n_{1a}L_{1a}-n_{2a}L_{2a})$ enters the width of the central interference fringe generated based on the Young's interferometer. Thus, it is substantially impossible to detect the movement of the interference fringe.

In contrast, the simulation results of FIG. 17B show simulation results obtained based on the model equation of FIG. 51, on the assumption that a multimode optical fiber with "$L_{1a}$=60 μm, $L_{1b}$=35 μm" is used. In this case, since $L_{1a}$ and $L_{2a}$ are large, the interference fringe based on the optical path difference factor of $2(n_{1a}L_{1a}-n_{2a}L_{2a})$ goes out of the width of the central interference fringe generated based on the Young's interferometer. Thus, it is possible to detect the movement of the interference fringe.

Although these simulation results seem to conclude that a single mode optical fiber is not applicable, this is not true.

For example, the simulation results of FIG. 18 show simulation results obtained based on the model equation of FIG. 51, on the assumption that a single mode optical fiber with "$L_{1a}$=20 μm, $L_{1b}$=7 μm" is used. In this case, the interference fringe based on the optical path difference factor of $2(n_{1a}L_{1a}-n_{2a}L_{2a})$ goes out of the width of the central interference fringe generated based on the Young's interferometer. Thus, it is possible to detect the movement of the interference fringe.

As is understood from the simulation results of FIG. 18, it is not always necessary to use multimode optical fibers and thus single mode optical fibers are also applicable.

The following will describe the detail of constituent elements constituting the present invention shown in FIG. 45.

(A) Structure of the Light Source 1

The light source 1 is a white light source for emitting low-coherent light. This is because high-coherent light less attenuates the central interference fringe and thus the interference fringe is increased in width, so that it becomes impossible to correctly detect the position of an interference fringe generated based on the optical path difference factor of $2(n_{1a}L_{1a}-n_{2a}L_{2a})$ and the position of an interference fringe generated based on the optical path difference factor of $2(n_{1b}L_{1b}-n_{2b}L_{2b})$.

The simulation results of FIGS. 19 to 22 described in Embodiment 1 are applied to Embodiment 2 as they are. However, $L_a$ is replaced with $L_{1a}$ and $L_b$ is replaced with $L_{2a}$ in FIGS. 19 to 22.

According to the simulation results, it was understood that the position of interference fringe based on the optical path difference factor of $2(n_{1a}L_{1a}-n_{2a}L_{2a})$ can be detected by providing the light source 1 emitting low-coherent light with a luminescence band half width of about 22 nm. Therefore, it was understood that the position of interference fringe generated based on the optical path difference factor of $2(n_{1b}L_{1b}-n_{2b}L_{2b})$ is detectable.

Namely, when the coherence length $l_c$ is increased, since the width of the central interference fringe is increased, the width being determined by the coherence length $l_c$, the interference fringe based on the optical path difference factor of $2(n_{1a}L_{1a}-n_{2a}L_{2a})$ is embedded in the central interference fringe and thus the position of the interference fringe cannot be detected. Thus, it is necessary to use the light source 1 emitting low-coherent light.

Figure 56:
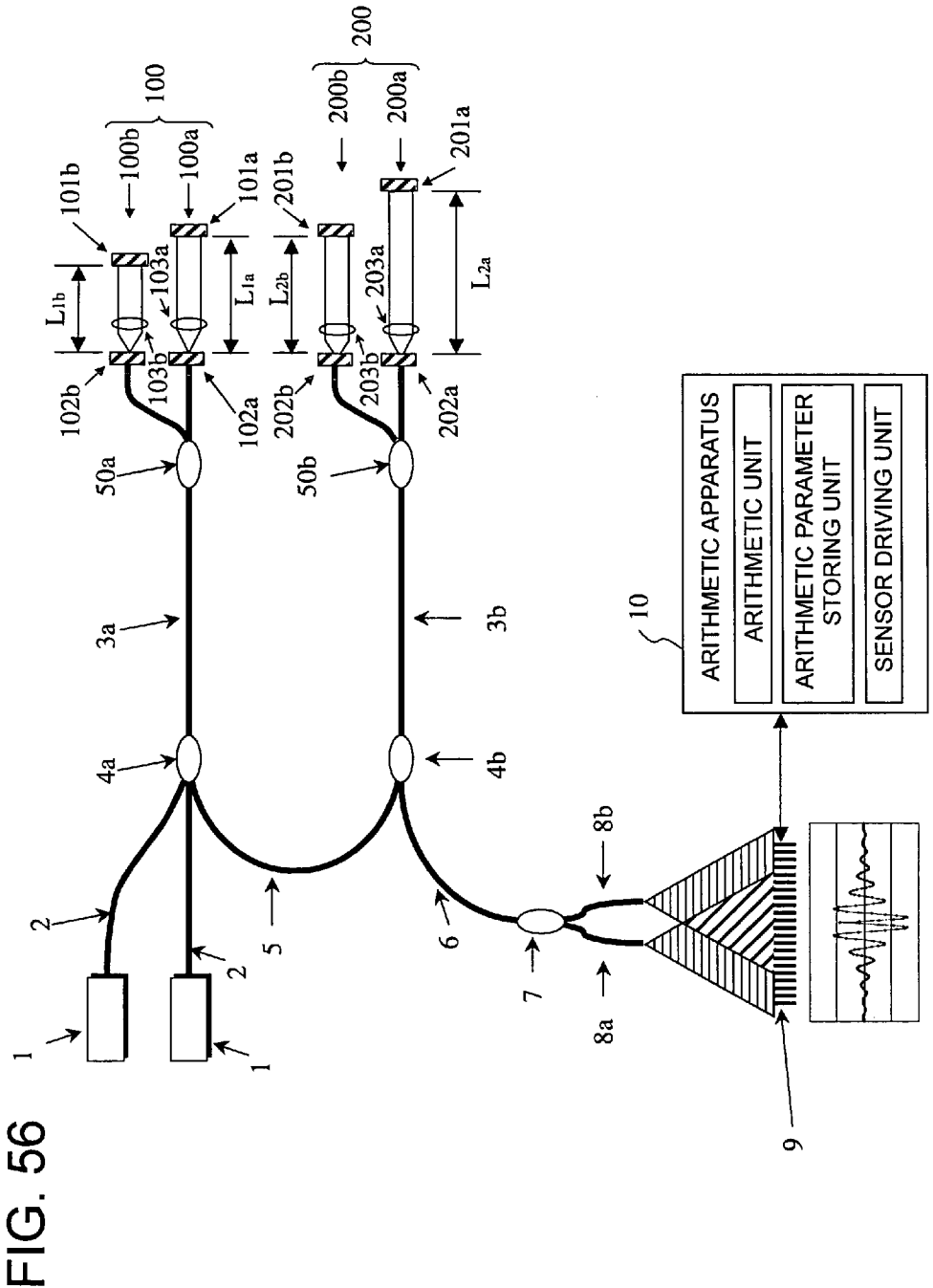
FIG. 56 shows a structural example on the structure of a light source.

In order to have such low-coherent light emission, the structure of FIG. 56 may be used, in which a plurality of light sources 1 with different luminous wavelengths are provided and light from the plurality of light sources 1 is transmitted to the optical branching coupler 4a.

(B) Structures of the First Sensor Pair 100/the Second Sensor Pair 200

In addition to a single structure, the first pressure temperature sensor 100a constituting the first sensor pair 100 may be a plurality of sensors with same structures which are connected in parallel via optical fibers.

When the plurality of sensors connected in parallel are used as the first pressure temperature sensor 100a, each of the sensors generates an equal optical path difference of $2n_{1a}L_{1a}$ on input light and thus an average value is optically calculated, achieving accurate detection of a pressure generated on the first measurement point.

In addition to a single structure, the first temperature sensor 100b constituting the first sensor pair 100 may be a plurality of sensors with same structures which are connected in parallel via optical fibers.

When the plurality of sensors connected in parallel are used as the first temperature sensor 100b, each of the sensors generates an equal optical path difference of $2n_{1b}L_{1b}$ on input light and thus an average value is optically calculated, achieving accurate detection of a temperature on the first measurement point.

On the other hand, in addition to a single structure, the second pressure temperature sensor 200a constituting the second sensor pair 200 may be a plurality of sensors with same structures which are connected in parallel via optical fibers.

When the plurality of sensors connected in parallel are used as the second pressure temperature sensor 200a, each of the sensors generates an equal optical path difference of $2n_{2a}L_{2a}$ on input light and thus an average value is optically calculated, achieving accurate detection of a pressure generated on the second measurement point.

In addition to a single structure, the second temperature sensor 200b constituting the second sensor pair 200 may be a plurality of sensors with same structures which are connected in parallel via optical fibers.

When the plurality of sensors connected in parallel are used as the second temperature sensor 200b, each of the sensors generates an equal optical path difference of $2n_{2b}L_{2b}$ on input light and thus an average value is optically calculated, achieving accurate detection of a temperature on the second measurement point.

(C) Structure of the Young's Interferometer

In the structural example of FIG. 45, the Young's interferometer is structured so that light reversely transmitted from the second sensor pair 200 is split into the optical fiber 8a and the optical fiber 8b by using the optical branching coupler 7.

The method of constituting the interferometer is not limited to the above constituting method. Various structures described in Embodiment 1 are also applicable.

(D) Structure of the Young's Interferometer for Expanding a Measuring Range

In the structural example of FIG. 45, the Young's interferometer is structured so that light reversely transmitted from the second sensor pair 200 is split into the optical fiber 8a and the optical fiber 8b by using the optical branching coupler 7.

In this case, the position of interference fringe is changed according to a distance between the ends of the optical fibers 8a and 8b (2a of FIG. 7).

The simulation results of FIG. 32 described in Embodiment 1 are applied to Embodiment 2 as they are. However, $L_a$ is replaced with $L_{1a}$ and $L_b$ is replaced with $L_{2a}$ in FIG. 32.

As is understood from the simulation results, when a distance is reduced between the ends of the optical fibers 8a and 8b, the expansion of an interference fringe position is increased.

As is evident from the above results, when a pressure difference to be measured is large, it is better to increase a distance between the ends of the optical fibers 8a and 8b. This is because when the distance is reduced, a large pressure difference to be measured goes out of the pixel range of the line image sensor 9. On the other hand, when a pressure difference to be measured is small, it is better to reduce a distance between the ends of the optical fibers 8a and 8b. This is because the smaller distance improves a resolving power.

Thus, as shown in FIG. 33, it is preferable to expand a measuring range by using a hierarchical structure which has one or more stages of optical fibers, starting from the optical fiber 8a, to split input light into two, and a hierarchical structure which has one or more stages of optical fibers, starting from the optical fiber 8b, to split input light into two, the optical fibers having different emitting intervals in the final stage where light is emitted to the line image sensor 9.

In this structure, the line image sensor 9 may be a single line image sensor or a plurality of line image sensors.

When this structure is used, for example, the arithmetic apparatus 10 first measures pressure differences with the largest pressure difference range and selects from the measured pressure differences a pressure difference measuring range having the highest resolving power in a pressure difference measuring range within the pixel range of the line image sensor 9, and the arithmetic apparatus 10 measures a pressure difference again by using the measuring range, so that a final pressure difference is measured.

(E) Structure for Miniaturizing the Apparatus

In order to miniaturize the apparatus implementing the structural example of FIG. 45, similar to the Embodiment 1, as shown in FIGS. 34 and 35, it is preferable to integrate the optical fiber 2, optical branching coupler 4a, optical fiber 5, optical branching coupler 4b, optical fiber 6, optical branching coupler 7, optical fiber 8a and optical fiber 8b into one platform.

Further, also in the case of the structure for expanding the measuring range as shown in FIG. 33, it is preferable to make integration into one platform as shown in FIG. 36.

In this case, it is preferable to integrate the optical fiber 3a connected to the first sensor pair 100a and the optical fiber 3b connected to the second sensor pair 200 into the platform within a permissible range.

Figure 57:
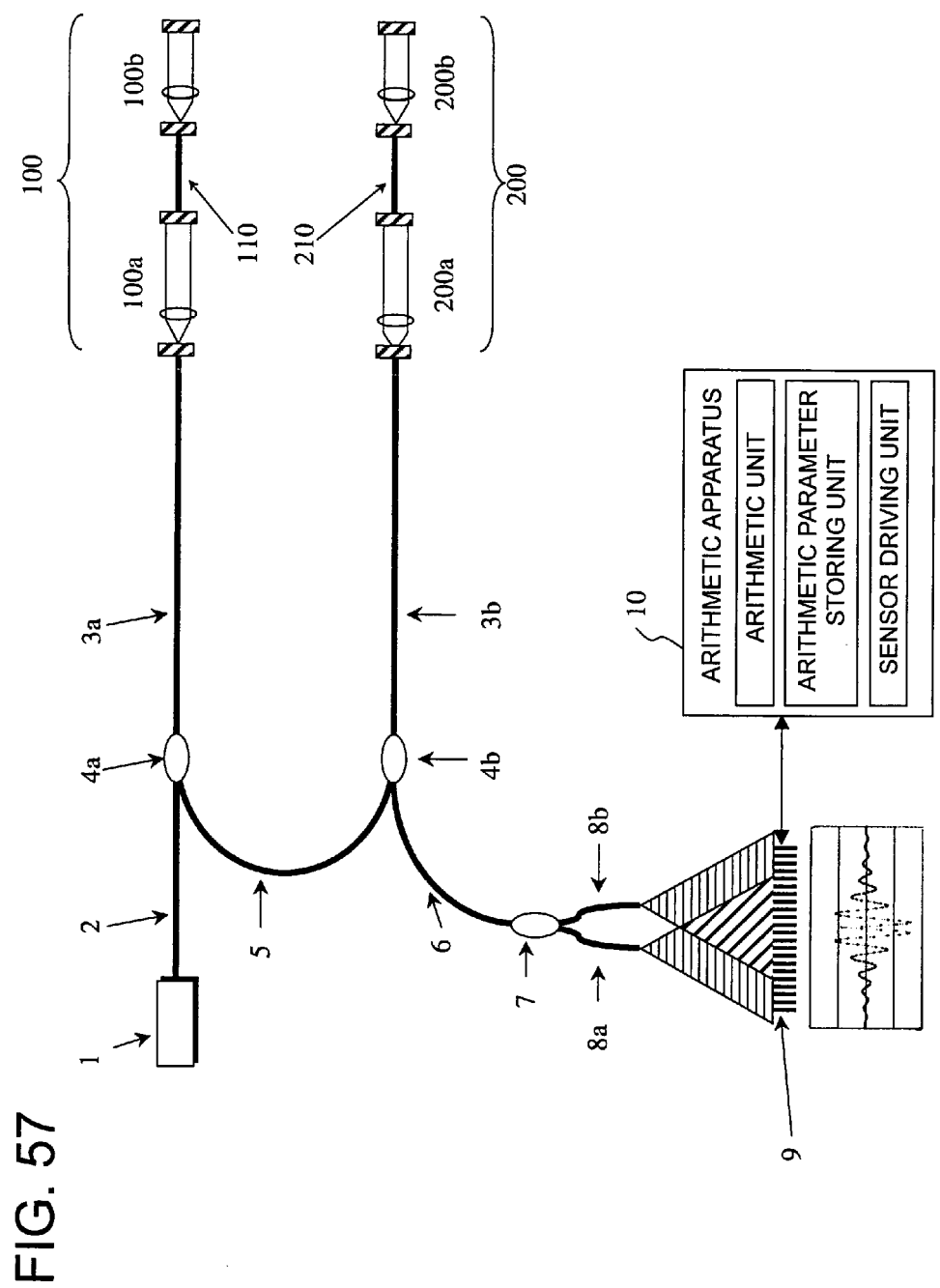
FIG. 57 shows another structural example of a sensor pair.

In the structural example of FIG. 45, the first pressure temperature sensor 100a and the first temperature sensor 100b are connected in parallel via the optical fibers as the first sensor pair 100, and the second pressure temperature sensor 200a and the second temperature sensor 200b are connected in parallel via the optical fibers as the second sensor pair 200. However, as shown in FIG. 57, the first pressure temperature sensor 100a and the first temperature sensor 100b may be connected in series via an optical fiber 110 as the first sensor pair 100, and the second pressure temperature sensor 200a and the second temperature sensor 200b may be connected in series via an optical fiber 210 as the second sensor pair 200.

When this structure is used, in order to have such a series connection, when the first pressure temperature sensor 100a is provided in the front stage, the total reflection mirror 101a of the first pressure temperature sensor 100a is replaced with a translucent mirror. When the second pressure temperature sensor 200a is provided in the front stage, the total reflection mirror 201a of the second pressure temperature sensor 200a is replaced with a translucent mirror.

Further, in order to have such a series connection, when the first temperature sensor 100b is provided in the front stage, the total reflection mirror 101b of the first temperature sensor 100b is replaced with a translucent mirror. When the second temperature sensor 200b is provided in the front stage, the total reflection mirror 201b of the second temperature sensor 200b is replaced with a translucent mirror.

Also in this structure, in order to improve measurement accuracy by optically calculating an average value, the first pressure temperature sensors 100a, the second pressure temperature sensor 200a, the first temperature sensor 100b, and the second temperature sensor 200b may be a plurality of sensors with same structures that are connected in parallel via optical fibers.

The following will describe another structural example of Embodiment 2.

Figure 58:
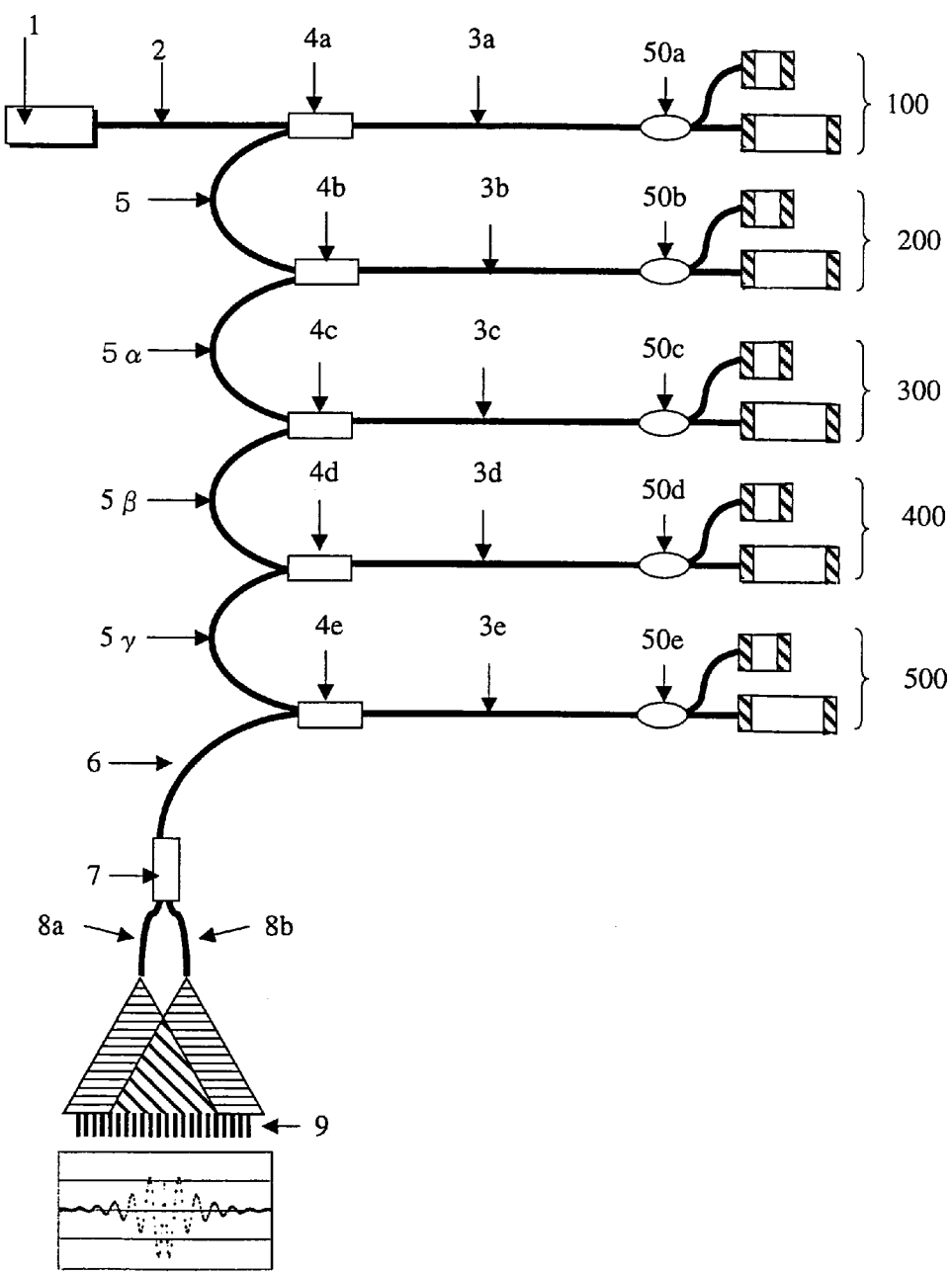
FIG. 58 shows a structural example of a structure for enabling measurement on a number of points.

FIG. 58 shows another structural example of Embodiment 2.

While the structural example of FIG. 45 has two measurement points, the present structural example has five measurement points.

Accordingly, in addition to a first sensor pair 100 and a second sensor pair 200, the structural example of FIG. 58 includes a third sensor pair 300 which is mounted on a third measurement point, a fourth sensor pair 400 which is mounted on a fourth measurement point, and a fifth sensor pair 500 which is mounted on a fifth measurement point.

The third sensor pair 300 has the same structure as the first sensor pair 100. The third pair 300 reacts to a pressure and a temperature to generate an optical path difference of $2n_{3a}L_{3a}$ on input light and reacts only to a temperature to generate an optical path difference of $2n_{3b}L_{3b}$ on input light, where $L_{3a}$ and $L_{3b}$ represent a distance between a translucent mirror and a total reflection mirror and $n_{3a}$ and $n_{3b}$ represent a refractive index of a material provided between the translucent mirror and the total reflection mirror.

Meanwhile, the fourth sensor pair 400 has the same structure as the first sensor pair 100. The fourth pair 400 reacts to a pressure and a temperature to generate an optical path difference of $2n_{4a}L_{4a}$ on input light and reacts only to a temperature to generate an optical path difference of $2n_{4b}L_{4b}$ on input light, where $L_{4a}$ and $L_{4b}$ represent a distance between a translucent mirror and a total reflection mirror and $n_{4a}$ and $n_{4b}$ represent a refractive index of a material provided between the translucent mirror and the total reflection mirror.

Meanwhile, the fifth sensor pair 500 has the same structure as the first sensor pair 100. The fifth pair 500 reacts to a pressure and a temperature to generate an optical path difference of $2n_{5a}L_{5a}$ on input light and reacts only to a temperature to generate an optical path difference of $2n_{5b}L_{5b}$ on input light, where $L_{5a}$ and $L_{5b}$ represent a distance between a translucent mirror and a total reflection mirror and $n_{5a}$ and $n_{5b}$ represent a refractive index of a material provided between the translucent mirror and the total reflection mirror.

According to the provision of the third sensor pair 300, the fourth sensor pair 400, and the fifth sensor pair 500, an optical fiber 5α, an optical fiber 3c, an optical branching coupler 50c, an optical branching coupler 4c, an optical fiber 5β, an optical fiber 3d, an optical branching coupler 50d, an optical branching coupler 4d, an optical fiber 5γ, an optical fiber 3e, an optical branching coupler 50e, and an optical branching coupler 4e are provided in addition to the structure of FIG. 45. The optical fiber 6 of FIG. 45 extracts light split by the optical branching coupler 4e and transmits the light to the optical branching coupler 7.

The optical fiber 5α is an optical fiber of a single mode that extracts light split by the optical branching coupler 4b. The optical fiber 3c is an optical fiber of a single mode that is provided so as to correspond to the third sensor pair 300 and transmits light extracted by the optical fiber 5α to the third sensor pair 300.

The optical branching coupler 50c splits light transmitted through the optical fiber 3c into two and inputs the light to the third sensor pair 300. The optical branching coupler 4c couples the optical fiber 5α and the optical fiber 3c and splits light reversely transmitted through the optical fiber 3c. The optical fiber 5β is an optical fiber of a single mode that extracts light split by the optical branching coupler 4c. The optical fiber 3d is an optical fiber of a single mode that is provided so as to correspond to the fourth sensor pair 400 and transmits light extracted by the optical fiber 5β to the fourth sensor pair 400.

The optical branching coupler 50d splits light transmitted through the optical fiber 3d into two and inputs the light to the fourth sensor pair 400. The optical branching coupler 4d couples the optical fiber 5β and the optical fiber 3d and splits light reversely transmitted through the optical fiber 3d. The optical fiber 5γ is an optical fiber of a single mode that extracts light split by the optical branching coupler 4d. The optical fiber 3e is an optical fiber of a single mode that is provided so as to correspond to the fifth sensor pair 500 and transmits light extracted by the optical fiber 5γ to the fifth sensor pair 500.

The optical branching coupler 50e splits light transmitted through the optical fiber 3e into two and inputs the light to the fifth sensor pair 500. The optical branching coupler 4e couples the optical fiber 5γ and the optical fiber 3e and splits light reversely transmitted through the optical fiber 3e.

According to this structure, an interference fringe is generated which has an interference fringe position corresponding to a pressure difference between given two measurement points on the line image sensor 9, such as an interference fringe generated based on an optical path difference factor of $2(n_{1a}L_{1a}-n_{2a}L_{2a})$, an interference fringe generated based on an optical path difference factor of $2(n_{1a}L_{1a}-n_{3a}L_{3a})$, etc.

Figure 59:
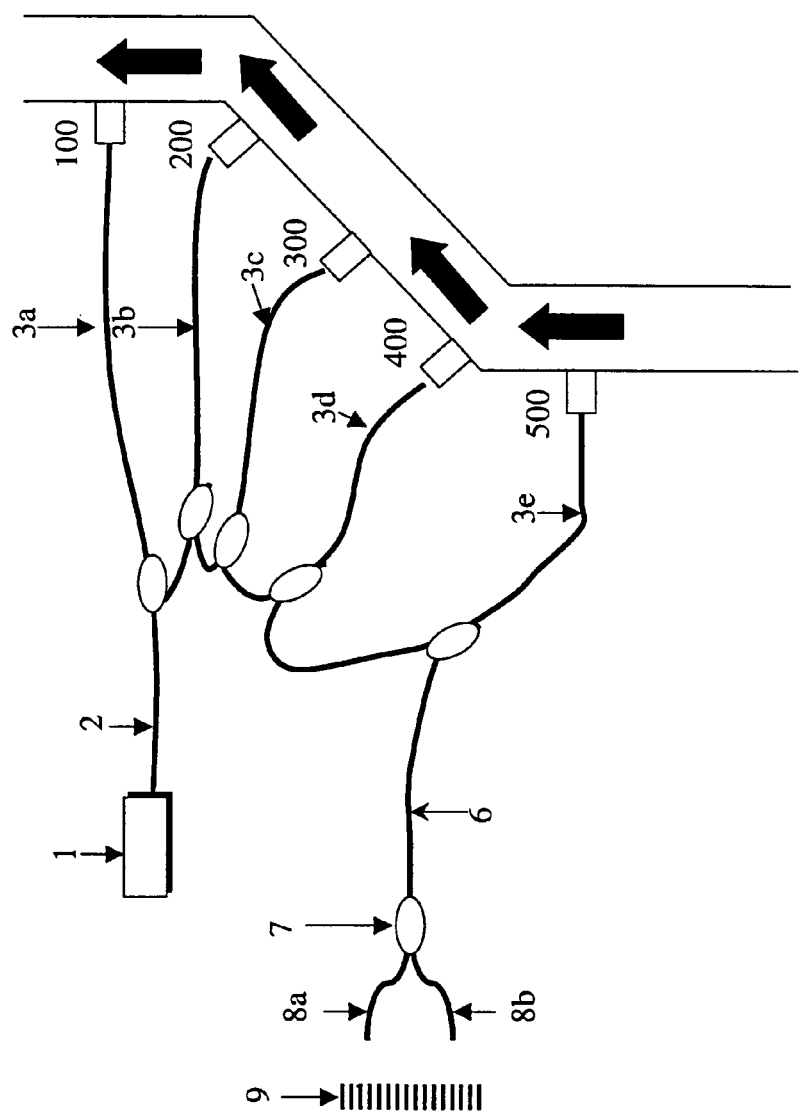
FIG. 59 is an explanatory drawing showing a method of performing measurements on a number of points.

Further, as shown in FIG. 59, with the present invention implementing the above structural example, pressure differences between two or more measurement points can be measured at once by using the sensors of single structures.

Additionally, since an interference fringe with a smaller pressure difference (optical path difference) is generated closer to the central interference fringe, the order of generating interference fringes may be changed. However, in the case of normal measurement targets, the order of pressure differences is not changed and thus the present invention makes it possible to measure pressure differences between the two or more measurement points.

Also when the structural example of FIG. 58 is used, the optical fibers are not limited to single mode optical fibers and thus multimode optical fibers are also applicable.

Further, also when the structural example of FIG. 58 is used, it is needless to say that sensors generating the interference fringes of FIG. 54 can be used. In a case of using such sensors, the interference fringes generated with no pressure difference between the two measurement points are not coincident with the central interference fringe.

In the above-described structural example, a pressure difference is measured by using the first pressure temperature sensor 100a or the like which has a function of changing an optical path difference on input light by moving the total reflection mirror 101a according to a pressure.

When the total reflection mirror 101a or the like is moved according to a magnetic field strength, a difference in magnetic field strength can be measured by the present invention. When the total reflection mirror 101a or the like is moved according to an electric field strength, a difference in electric field strength can be measured by the present invention. In this way, the application of the present invention is not limited to the measurement of a pressure difference.

On the other hand, even when the total reflection mirror 101a or the like is not moved, the present invention can also use a sensor having a function of changing an optical path difference on input light by changing a refractive index of a material provided between the total reflection mirror 101a or the like and the translucent mirror 102a or the like.

For example, as shown in FIG. 40, some high polymers change its refractive indexes according to a temperature. A temperature difference can be measured by providing a high polymer having such a characteristic between the total reflection mirror 101a or the like and the translucent mirror 102a or the like.

In general, materials are changed in refractive index and length when a temperature, a pressure, a concentration, a magnetic field, and an electric field are changed, so that the phase difference of transmitted light is changed.

Thus, a material which sensitively reacts to such an external factor and changes its refractive index and length is provided between the total reflection mirror 101a or the like and the translucent mirror 102a or the like, so that a pressure difference or the like can be measured by the present invention even when the total reflection mirror 101a or the like is not moved.

Moreover, when the material is used which sensitively reacts to such an external factor and changes its refractive index and length, instead of the reflection sensors such as the first pressure temperature sensor 100a shown in FIG. 45, the transmission sensor of FIG. 41 may be provided. In the transmission sensor, transparent glass plates are arranged in parallel and the material, which sensitively reacts to such an external factor and changes its refractive index and length, is provided between the two glass plates, so that the optical path length of input light is changed.

FIG. 60 shows a structural example of the present invention that is suitable for such a transmission sensor.

In this structural example, the first sensor pair 100 is constituted of a parallel connection of a first transmission-type pressure temperature sensor 100a which changes an optical path length according to a pressure generated on the first measurement point while being affected by a temperature on the first measurement point, a first temperature sensor 100b of a transmission type that changes an optical path length only according to a temperature on the first measurement point, and a single mode optical fiber 62a bypassing the sensors.

Moreover, the second sensor pair 200 is constituted of a parallel connection of a second pressure temperature sensor 200a of a transmission type that changes an optical path length according to a pressure generated on the second measurement point while being affected by a temperature on the second measurement point, a second temperature sensor 200b of a transmission type that changes an optical path length only according to a temperature on the second measurement point, and a single mode optical fiber 62b bypassing the sensors.

In this case, the first pressure temperature sensor 100a generates an optical path length of $n_{1a}L_{1a}$ on input light during passage where $L_{1a}$ represents a distance between two glass plates and $n_{1a}$ represents a refractive index of a material provided between the two glass plates. Further, the first temperature sensor 100b generates an optical path length of $n_{1b}L_{1b}$ on input light during passage where $L_{1b}$ represents a distance between the two glass plates and $n_{1b}$ represents a refractive index of a material provided between the two glass plates.

Meanwhile, the second pressure temperature sensor 200a generates an optical path length of $n_{2a}L_{2a}$ on input light during passage where $L_{2a}$ represents a distance between two glass plates and $n_{2a}$ represents a refractive index of a material provided between the two glass plates. Further, the second temperature sensor 200b generates an optical path length of $n_{2b}L_{2b}$ on input light during passage where $L_{2b}$ represents a distance between the two glass plates and $n_{2b}$ represents a refractive index of a material provided between the two glass plates.

For convenience of explanation, it is assumed in the following explanation that "$n_{1a}=n_{2a}$" is obtained and the first pressure temperature sensor 100a and the second pressure temperature sensor 200a are used with "$L_{1a}=L_{2a}$" when a pressure difference and a temperature difference are absent between the first measurement point and the second measurement point. Further, for convenience of explanation, it is assumed that "$n_{1b}=n_{2b}$" is obtained and the first temperature sensor 100b and the second temperature sensor 200b are used with "$L_{1b}=L_{2b}$" when a temperature difference is absent between the first measurement point and the second measurement point.

In such a structure, when a pressure difference and a temperature difference are absent between a pressure and a temperature generated on the first measurement point and a pressure and a temperature generated on the second measurement point, "$L_{1a}=L_{2a}$" is obtained. The material provided between the two glass plates of the first pressure temperature sensor 100a is the same as that between the two glass plates of the second pressure temperature sensor 200a, so that "$n_{1a}=n_{2a}$" is obtained. Thus, an optical path length of $n_{1a}L_{1a}$ generated by the first pressure temperature sensor 100a and an optical path length of $n_{2a}L_{2a}$ generated by the second pressure temperature sensor 200a are equal to each other.

In contrast, when a pressure difference is present between a pressure generated on the first measurement point and a pressure generated on the second measurement point, the two optical path lengths are varied from each other. Additionally, the optical path lengths are affected by temperatures.

When a temperature difference is absent between a temperature generated on the first measurement point and a temperature generated on the second measurement point, "$L_{1b}=L_{2b}$" is obtained. The material provided between the two glass plates of the first temperature sensor 100b is the same as that between the two glass plates of the second temperature sensor 200b, so that "$n_{1b}=n_{2b}$" is obtained. Thus, an optical path length of $n_{1b}L_{1b}$ generated by the first temperature sensor 100b and an optical path length of $n_{2b}L_{2b}$ generated by the second temperature sensor 200b are equal to each other.

In contrast, when a temperature difference is present between a temperature generated on the first measurement point and a temperature generated on the second measurement point, the two optical path lengths are varied from each other.

The structural example of FIG. 60 makes it possible to measure a difference value between a pressure generated on the first measurement point and a pressure on the second measurement point without being affected by temperatures in the first and second measurement points, by detecting a difference between the two optical path differences.

For such measurement, in addition to the first sensor pair 100 and second sensor pair 200 structured thus, the structural example of FIG. 60 includes a light source 1, an optical fiber 60a, an optical branching coupler 61a, an optical branching coupler 63a, an optical fiber 60b, an optical branching coupler 61b, an optical branching coupler 63b, an optical fiber 6, an optical branching coupler 7, an optical fiber 8a, an optical fiber 8b, a line image sensor 9, and an arithmetic apparatus 10.

The light source 1 is constituted of a so-called white light source such as an LED for emitting low-coherent light. The optical fiber 60a is an optical fiber of a single mode that extracts light emitted from the light source 1 and transmits the light to the first sensor pair 100. The optical branching coupler 61a splits light transmitted through the optical fiber 60a into three and inputs the light to the first sensor pair 100. The optical branching coupler 63a couples the three light beams outputted by the first sensor pair 100.

The optical fiber 60b is an optical fiber of a single mode that transmits light coupled by the optical branching coupler 63a to the second sensor pair 200. The optical branching coupler 61b splits light transmitted through the optical fiber 60b into three and inputs the light to the second sensor pair 200. The optical branching coupler 63b couples the three light beams outputted by the second sensor pair 200.

The optical fiber 6 is an optical fiber of a single mode that extracts light coupled by the optical branching coupler 63b. The optical branching coupler 7 splits light extracted by the optical fiber 6 into two. The optical fiber 8a is an optical fiber of a single mode that extracts a part of light beams split by the optical branching coupler 7. The optical fiber 8b is an optical fiber of a single mode that extracts the other part of light beam split by the optical branching coupler 7.

The line image sensor 9 detects interference fringes generated by light emitted from the optical fiber 8a and the optical fiber 8b. The arithmetic apparatus 10 calculates a pressure difference between a pressure generated on the first measurement point and a pressure on the second measurement point based on the positions of interference fringes detected by the line image sensor 9.

According to the structural example, regarding the relationship between the first pressure temperature sensor 100a and the second pressure temperature sensor 200a, four kinds of light transmission patterns are available: (I) a transmission pattern of light passing through the first pressure temperature sensor 100a and then passing through the second pressure temperature sensor 200a, (II) a transmission pattern of light passing through the optical fiber 62a, which bypasses the first pressure temperature sensor 100a, and then passing through the optical fiber 62b, which bypasses the second pressure temperature sensor 200a, (III) a transmission pattern of light passing through the optical fiber 62a, which bypasses the first pressure temperature sensor 100a, and then passing through the second pressure temperature sensor 200a, and (IV) a transmission pattern of light passing through the first pressure temperature sensor 100a and then passing through the optical fiber 62b, which bypasses the second pressure temperature sensor 200a.

In consideration that optical path lengths provided by the optical fibers 62a and 62b are fixed, transmission using the transmission pattern (III) provides input light with an optical path length of $n_{2a}L_{2a}$, and transmission using the transmission pattern (IV) provides input light with an optical path length of $n_{1a}L_{1a}$, so that the phase differences of light emitted to the line image sensor 9 include a phase difference=$k \times (n_{1a}L_{1a}-n_{2a}L_{2a})$.

The optical path difference factor of $(n_{1a}L_{1a}-n_{2a}L_{2a})$ indicates a pressure difference between a pressure generated on the first measurement point where the first pressure temperature sensor 100a is disposed and a pressure generated on the second measurement point where the second pressure temperature sensor 200a is disposed. Thus, the pressure difference can be measured by detecting a movement of an interference fringe generated based on the optical path difference factor of $(n_{1a}L_{1a}-n_{2a}L_{2a})$.

However, since the first pressure temperature sensor 100a and the second pressure temperature sensor 200a are affected by temperatures, when a movement of the interference fringe based on the optical path difference factor of $(n_{1a}L_{1a}-n_{2a}L_{2a})$ is detected and a pressure difference is calculated based on the movement, the measurement of the pressure difference is affected by temperatures.

Meanwhile, also in the relationship between the first temperature sensor 100b and the second temperature sensor 200b, the above-described four kinds of light transmission patterns are available, in which light passes through or bypasses the first temperature sensor 100b and then the light passes through or bypasses the second temperature sensor 200b. Thus, a phase difference=$k \times (n_{1b}L_{1b}-n_{2b}L_{2b})$ is obtained.

The optical path difference factor of $(n_{1b}L_{1b}-n_{2b}L_{2b})$ indicates a temperature difference between a temperature on the first measurement point where the first temperature sensor 100b is disposed and a temperature on the second measurement point where the second temperature sensor 200b is disposed. Thus, the temperature difference can be measured by detecting a movement of an interference fringe generated based on the optical path difference factor of $(n_{1b}L_{1b}-n_{2b}L_{2b})$.

Therefore, also in the structural example of FIG. 60, a movement of an interference fringe based on the optical path difference factor of $(n_{1a}L_{1a}-n_{2a}L_{2a})$ is detected, a movement of an interference fringe based on the optical path difference factor of $(n_{1b}L_{1b}-n_{2b}L_{2b})$ is detected, and a pressure difference between a pressure generated on the first measurement point and a pressure generated on the second measurement point can be measured based on the movements without being affected by temperatures.

When the structural example of FIG. 60 is used, the optical fibers are not limited to single mode optical fibers and thus multimode optical fibers are also applicable.

Further, also when the structural example of FIG. 60 is used, it is needless to say that sensors generating the interference fringes of FIG. 54 can be used. In a case of using the interference fringes generated with no pressure difference between two measurement points, these fringes are not coincident with the central interference fringe.

Moreover, also when the structural example of FIG. 60 is used, in order to improve measurement accuracy by optically calculating an average value, the first pressure temperature sensor 100a, the second pressure temperature sensor 200a, the first temperature sensor 100b, and the second temperature sensor 200b may be a plurality of sensors with same structures that are connected in parallel via optical fibers.

Moreover, although the structural example of FIG. 60 has two measurement points, in the case of three or more measurement points, the optical fibers and the optical branching couplers are provided so that the sensor pairs are connected in series.

Besides, also in the implementation of the structural example shown in FIG. 60, as shown in FIG. 33, it is preferable to expand a measuring range by using a hierarchical structure which has one or more stages of optical fibers, starting from the optical fiber 8a, to split input light into two, and a hierarchical structure which has one or more stages of optical fibers, starting from the optical fiber 8b, to split input light into two, the optical fibers having different emitting intervals in the final stage where light is emitted to the line image sensor 9. In this structure, the line image sensor 9 may be a single line image sensor or a plurality of line image sensors.

Further, also in the implementation of the structural example shown in FIG. 60, in order to achieve miniaturization, it is preferable to integrate the optical fibers and optical branching couplers as many as possible into one platform, as shown in FIGS. 34, 35, and 36.

INDUSTRIAL APPLICABILITY

As described above, according to the present invention, when a difference value between physical parameters measured on positions away from each other, an optical fiber is used instead of a pressure transmitting pipe and a remote seal and light interference is used to measure a difference value. Thus, it is possible to correctly measure a difference value between physical parameters on positions away from each other without being affected by the ambient environment.

Namely, light waves passing through an optical fiber are all subjected to the same phase swinging, so that interferences caused by disturbance cancel each other out. Thus, it is possible to correctly measure a difference value between physical parameters on positions away from each other without being affected by the ambient environment.

Moreover, according to the present invention, it is possible to correctly measure a difference value between physical parameters on three or more positions away from one another at the same time without being affected by the ambient environment.

Further, according to the present invention, in the measurement of a difference value between physical parameters measured on positions away from each other, an optical fiber is used instead of a pressure transmitting pipe and a remote seal, light interference is used to measure a difference value, and the difference value between the physical parameters is measured at this point by canceling the influence of a physical parameter not to be measured. Thus, it is possible to correctly measure a difference value between physical parameters on positions away from each other without being affected by the ambient environment and correctly measure a difference value without being affected by a physical parameter not to be measured.

Namely, light waves passing through an optical fiber are all subjected to same phase swinging, so that interferences caused by disturbance cancel each other out. Thus, it is possible to correctly measure a difference value between physical parameters on positions away from each other without being affected by the ambient environment. Since a difference value between physical parameters is measured by canceling the influence of a physical parameter not to be measured, it is possible to correctly measure a difference value without being affected by a physical parameter not to be measured.

Further, according to the present invention, it is also possible to correctly and simultaneously measure a difference value between physical parameters to be measured on three or more positions away from one another, without being affected by the ambient environment, and correctly measure a difference value without being affected by a physical parameter not to be measured.

What is claimed is:

1. A physical parameter measuring method, comprising:
inputting light emitted by a light source to a sensor generating an optical path difference on input light according to a physical parameter to be measured;
inputting light outputted from the sensor in response to the input and having an optical path difference generated by the sensor to another sensor having a same function of generating another optical path difference;
generating an interference fringe by splitting light having an optical path difference generated by the another sensor into two;
measuring a difference value by calculating the difference value between physical parameters to be measured based on a fringe position of the interference fringe; and
outputting the measured difference value.

2. A physical parameter measuring apparatus, comprising:
a plurality of sensor units to generate an optical path difference on input light according to a physical parameter to be measured;
optical fiber to transmit light emitted by a light source to the sensor unit of a front stage of said plurality of sensor units;
optical fiber to transmit light to an other sensor unit, the light having an optical path difference generated by the sensor unit of a previous stage of said plurality of sensor units;
an optical unit to split light into two, the light having an optical path difference generated by the sensor unit of a final stage of said plurality of sensor units;
a detecting unit to detect an interference fringe generated by the light split into two; and
a calculating unit to calculate a difference value between physical parameters to be measured, based on a fringe position of the interference fringe.

3. A physical parameter measuring apparatus, comprising:
a plurality of sensor units to generate, in compliance with a reflection structure, an optical path difference on input light according to a physical parameter to be measured;
optical fiber which is provided so as to correspond to a sensor unit of a front stage of said plurality of sensor units and transmits light emitted by a light source to said sensor unit of a front stage;
a plurality of optical fibers which are provided so as to correspond to a sensor unit other than the sensor unit of the front stage of said plurality of sensor units that receive, as input, light reversely transmitted with an optical path difference through the optical fiber provided so as to correspond to the sensor unit of the front stage of said plurality of sensor units, and transmit the light to the sensor unit other than the sensor unit of the front stage;
an optical unit which receives, as input, light reversely transmitted with an optical path difference through the optical fiber provided so as to correspond to a sensor unit of a final stage of said plurality of sensor units and splits the light into two;
a detecting unit to detect an interference fringe generated by the light split into two; and
a calculating unit to calculate a difference value between physical values to be measured, based on a fringe position of the interference fringe.

4. The physical parameter measuring apparatus according to claim 3, wherein each sensor unit is a parallel connection of two or more sensor units, each having a same structure and generating an optical path difference on input light according to a physical parameter to be measured.

5. The physical parameter measuring apparatus according to claim 3, wherein each sensor unit has a gap length to realize a reflection structure, the gap length being within a prescribed length from a core diameter of the paired optical fibers.

6. A physical parameter measuring apparatus, comprising:
a plurality of sensor units to generate, in compliance with a transmission structure, an optical path difference on input light according to a physical parameter to be measured;
optical fiber which is provided so as to correspond to the sensor unit of a front stage of said plurality of sensor units and transmits light emitted by a light source to the sensor unit;
a plurality of optical fibers, which are provided so as to correspond to a sensor unit other than the sensor unit of the front stage of said plurality of sensor units, are connected in series with the sensor unit of the previous stage of said plurality of sensor units to receive as input, light having an optical path difference generated by the sensor unit, and to transmit the light to an other sensor unit;
an optical unit which receives, as input, light having an optical path difference generated by the sensor unit of a final stage of said plurality of sensor units and splits the light into two;
a detecting unit to detect an interference fringe generated by the light split into two; and
a calculating unit to calculate a difference value between physical values to be measured, based on a fringe position of the interference fringe.

7. The physical parameter measuring apparatus according to claim 6, wherein each sensor unit is a parallel connection of single sensor units changing an optical path length of input light according to a physical parameter to be measured and optical fiber bypassing the sensor unit.

8. The physical parameter measuring apparatus according to claim 7, wherein a parallel connection of two or more sensor units with same structures is used instead of the single sensor unit.

9. The physical parameter measuring apparatus according to claim 6, wherein each sensor unit is a parallel connection of two or more sensor units, each changing an optical path length of input light according to a physical parameter to be measured and having a different optical path length.

10. The physical parameter measuring apparatus according to claim 9, wherein some or all of the sensor units connected in parallel constitute a parallel connection of two or more sensor units, each being connected in parallel with a same structure.

11. The physical parameter measuring apparatus according to claim 2, wherein the combination of the sensor units is a combination not generating an equal optical path difference when a difference value between physical parameters to be measured is 0.

12. The physical parameter measuring apparatus according to claim 2, further comprising:
an optical unit which receives, as input, light split into two by the optical unit and is constituted of a hierarchical structure having one or more stages of optical units to split input light into two, the optical unit having different emitting intervals in the final stage where light is emitted to the detecting unit.

13. The physical parameter measuring apparatus according to claim 2, wherein some or all of the optical fibers are formed on a single substrate.

14. The physical parameter measuring apparatus according to claim 2, wherein the calculating unit detects a movement of an interference fringe position indicated by a difference value between physical parameters to be measured, and the calculating unit calculates, according to the movement, a difference value between physical parameters to be measured.

15. A physical parameter measuring method, comprising:
inputting light, which is emitted by a light source, to a sensor pair constituted of a combination of a sensor to generate an optical path difference on input light according to a physical parameter to be measured and a physical parameter not to be measured and an other sensor to generate an optical path difference on input light according to a physical parameter not to be measured;
inputting light, which has been outputted in response to the input and has an optical path difference generated by the sensor pair, to an other sensor pair provided with a same function of generating an optical path difference;
generating an interference fringe by splitting light having an optical path difference generated by the other sensor pair into two;
measuring a difference value by calculating the difference value between physical parameters to be measured, based on a fringe position of the interference fringe, without being affected by a physical parameter not to be measured; and
outputting the measured difference value.

16. A physical parameter measuring apparatus, comprising:
a plurality of sensor pairs, each being constituted of a combination of a sensor unit to generate an optical path difference on input light according to a physical parameter to be measured and a physical parameter not to be measured and an other sensor unit to generate an optical path difference on input light according to a physical parameter not to be measured;
optical fiber to transmit light emitted by a light source to the sensor pair of a front stage of said plurality of sensor pairs;
optical fiber to transmit light to an other sensor pair, the light having an optical path difference generated by the sensor pair of a previous stage of said plurality of sensor pairs;
an optical unit to split light into two, the light having an optical path difference generated by the sensor pair of a final stage of said plurality of sensor pairs;
a detecting unit to detect an interference fringe generated by the light split into two; and
a calculating unit to calculate a difference value between the physical parameters to be measured, based on a fringe position of the interference fringe, without being affected by a physical parameter not to be measured.

17. A physical parameter measuring apparatus, comprising:
a plurality of sensor pairs, each being constituted of a combination of a sensor unit to generate, in compliance with a reflection structure, an optical path difference on input light according to a physical parameter to be measured and a physical parameter not to be measured and an other sensor unit to generate, in compliance with the reflection structure, an optical path difference on input light according to a physical parameter not to be measured;
optical fiber which is provided so as to correspond to the sensor pair of a front stage of said plurality of sensor pairs and transmits light emitted by a light source to the sensor pair;
a plurality of optical fibers which are provided so as to correspond to sensor pairs other than the sensor pair of the front stage of said plurality of sensor pairs that receive, as input, light reversely transmitted with an optical path difference through the optical fiber provided so as to correspond to the sensor pair of the previous stage of said plurality of sensor pairs, and transmit the light to an other sensor pair;
an optical unit which receives, as input, light reversely transmitted with an optical path difference through the optical fiber provided so as to correspond to the sensor pair of a final stage of said plurality of sensor pairs and splits the light into two;
a detecting unit to detect an interference fringe generated by the light split into two; and
a calculating unit to calculate a difference value between physical values to be measured, based on a fringe position of the interference fringe, without being affected by a physical parameter not to be measured.

18. The physical parameter measuring apparatus according to claim 17, wherein the sensor pair is a parallel connection of a sensor unit to generate an optical path difference on input light according to a physical parameter to be measured and a physical parameter not to be measured and an other sensor unit to generate an optical path difference on input light according to a physical parameter not to be measured.

19. The physical parameter measuring apparatus according to claim 17, wherein each sensor pair is a series connection of a sensor unit to generate an optical path difference on input light according to a physical parameter to be measured and a physical parameter not to be measured and an other sensor unit to generate an optical path difference on input light according to a physical parameter not to be measured.

20. The physical parameter measuring apparatus according to claim 18, wherein a plurality of sensor units with same structures are connected in parallel as the sensor unit to generate an optical path difference on input light according to a physical parameter to be measured and a physical parameter not to be measured.

21. The physical parameter measuring apparatus according to claim 18, wherein a plurality of sensor units with same structures are connected in parallel as the sensor unit to generate an optical path difference on input light according to a physical parameter not to be measured.

22. The physical parameter measuring apparatus according to claim 17, wherein the sensor unit is used with a gap length to realize a reflection structure, the gap length being within a prescribed length from a core diameter of the paired optical fibers.

23. A physical parameter measuring apparatus, comprising:
a plurality of sensor pairs, each being constituted of a combination of a sensor unit to generate, in compliance with a transmission structure, an optical path difference on input light according to a physical parameter to be measured and a physical parameter not to be measured and an other sensor unit to generate, in compliance with the transmission structure, an optical path difference on input light according to a physical parameter not to be measured;

optical fiber which is provided so as to correspond to the sensor pair of a front stage of said plurality of sensor pairs and transmits light emitted by a light source to the sensor pair;

a plurality of optical fibers, which are provided so as to correspond to sensor pairs other than the sensor pair of the front stage of said plurality of sensor pairs, are connected in series with the sensor pair of the previous stage of said plurality of sensor pairs that receive, as input, light having an optical path difference generated by the sensor pair, and transmit the light to an other sensor pair;

an optical unit which receives, as input, light having an optical path difference generated by the sensor pair of the final stage of said plurality of sensor pairs and splits the light into two;

a detecting unit to detect an interference fringe generated by the light split into two; and a calculating unit to calculate a difference value between physical values to be measured, based on a fringe position of the interference fringe, without being affected by a physical parameter not to be measured.

24. The physical parameter measuring apparatus according to claim 23, wherein the sensor pair is a parallel connection of a sensor unit changing an optical path length of input light according to a physical parameter to be measured and a physical parameter not to be measured and an other sensor unit changing an optical path length of input light according to a physical parameter not to be measured, and optical fiber bypassing the sensor unit.

25. The physical parameter measuring apparatus according to claim 24, wherein a plurality of sensor units with same structures are connected in parallel as the sensor unit changing an optical path length of input light according to a physical parameter to be measured and a physical parameter not to be measured.

26. The physical parameter measuring apparatus according to claim 24, wherein a plurality of sensor units with same structures are connected in parallel as the other sensor unit generating an optical path difference on input light according to a physical parameter not to be measured.

27. The physical parameter measuring apparatus according to claim 23, wherein the combination of the sensor unit to generate an optical path difference on input light according to a physical parameter to be measured and a physical parameter not to be measured is a combination not generating an equal optical path difference when a difference value between physical parameters to be measured is 0.

28. The physical parameter measuring apparatus according to claim 23, wherein the combination of the other sensor unit to generate an optical path difference on input light according to a physical parameter not to be measured is a combination not generating an equal optical path difference when a difference value between physical parameters not to be measured is 0.

29. The physical parameter measuring apparatus according to claim 23, further comprising:

an optical unit which receives, as input, light split into two by the optical unit and is constituted of a hierarchical structure having one or more stages of optical units to split input light into two, the optical unit having different emitting intervals in the final stage where light is emitted to the detecting unit.

30. The physical parameter measuring apparatus according to claim 23, wherein some or all of the optical fibers are formed on a single substrate.

31. The physical parameter measuring apparatus according to claim 23, wherein the calculating unit detects a movement of an interference fringe indicated by a difference value between physical parameters to be measured, the movement being merged with a movement of an interference fringe indicated by a difference value between physical parameters not to be measured, detects a movement of an interference fringe indicated only by a difference value between physical parameters not to be measured, and calculates a difference value between physical parameters to be measured, according to the detected movements, without being affected by a physical parameter not to be measured.

32. The physical parameter measuring apparatus according to claim 16, wherein the combination of the sensor units to generate an optical path difference on input light according to a physical parameter to be measured and a physical parameter not to be measured is a combination not generating an equal optical path difference when a difference value between physical parameters to be measured is 0.

33. The physical parameter measuring apparatus according to claim 16, wherein the combination of the sensor units to generate an optical path difference on input light according to a physical parameter not to be measured is a combination not generating an equal optical path difference when a difference value between physical parameters not to be measured is 0.

34. The physical parameter measuring apparatus according to claim 16, further comprising:

an optical unit which receives, as input, light split into two by the optical unit and is constituted of a hierarchical structure having one or more stages of optical units to split input light into two, the optical unit having different emitting intervals in the final stage where light is emitted to the detecting unit.

35. The physical parameter measuring apparatus according to claim 16, wherein some or all of the optical fibers are formed on a single substrate.

36. The physical parameter measuring apparatus according to claim 16, wherein the calculating unit detects a movement of an interference fringe indicated by a difference value between physical parameters to be measured, the movement being merged with a movement of an interference fringe indicated by a difference value between physical parameters not to be measured, detects a movement of an interference fringe indicated only by a difference value between physical parameters not to be measured, and calculates a difference value between physical parameters to be measured, according to the detected movements, without being affected by a physical parameter not to be measured.

37. The physical parameter measuring apparatus according to claim 17, wherein the combination of the sensor unit to generate an optical path difference on input light according to a physical parameter to be measured and a physical parameter not to be measured is a combination not generating an equal optical path difference when a difference value between physical parameters to be measured is 0.

38. The physical parameter measuring apparatus according to claim 17, wherein the combination of the other sensor unit to generate an optical path difference on input light according to a physical parameter not to be measured is a combination not generating an equal optical path difference when a difference value between physical parameters not to be measured is 0.

39. The physical parameter measuring apparatus according to claim 17, further comprising:
an optical unit which receives, as input, light split into two by the optical unit and is constituted of a hierarchical structure having one or more stages of optical units to split input light into two, the optical unit having different emitting intervals in the final stage where light is emitted to the detecting unit.

40. The physical parameter measuring apparatus according to claim 17, wherein some or all of the optical fibers are formed on a single substrate.

41. The physical parameter measuring apparatus according to claim 17, wherein the calculating unit detects a movement of an interference fringe indicated by a difference value between physical parameters to be measured, the movement being merged with a movement of an interference fringe indicated by a difference value between physical parameters not to be measured, detects a movement of an interference fringe indicated only by a difference value between physical parameters not to be measured, and calculates a difference value between physical parameters to be measured, according to the detected movements, without being affected by a physical parameter not to be measured.

42. The physical parameter measuring apparatus according to claim 19, wherein a plurality of sensor units with same structures are connected in parallel as the sensor unit to generate an optical path difference on input light according to a physical parameter to be measured and a physical parameter not to be measured.

43. The physical parameter measuring apparatus according to claim 19, wherein a plurality of sensor units with same structures are connected in parallel as the other sensor unit to generate an optical path difference on input light according to a physical parameter not to be measured.

44. The physical parameter measuring apparatus according to claim 3, wherein the combination of the sensor units is a combination not generating an equal optical path difference when a difference value between physical parameters to be measured is 0.

45. The physical parameter measuring apparatus according to claim 3, further comprising:
an optical unit which receives, as input, light split into two by the optical unit and is constituted of a hierarchical structure having one or more stages of optical units to split input light into two, the optical unit having different emitting intervals in the final stage where light is emitted to the detecting unit.

46. The physical parameter measuring apparatus according to claim 3, wherein some or all of the optical fibers are formed on a single substrate.

47. The physical parameter measuring apparatus according to claim 3, wherein the calculating unit detects a movement of an interference fringe position indicated by a difference value between physical parameters to be measured, and the calculating unit calculates, according to the movement, a difference value between physical parameters to be measured.

48. The physical parameter measuring apparatus according to claim 6, wherein the combination of the sensor units is a combination not generating an equal optical path difference when a difference value between physical parameters to be measured is 0.

49. The physical parameter measuring apparatus according to claim 6, further comprising:
an optical unit which receives, as input, light split into two by the optical unit and is constituted of a hierarchical structure having one or more stages of optical units to split input light into two, the optical unit having different emitting intervals in the final stage where light is emitted to the detecting unit.

50. The physical parameter measuring apparatus according to claim 6, wherein some or all of the optical fibers are formed on a single substrate.

51. The physical parameter measuring apparatus according to claim 6, wherein the calculating unit detects a movement of an interference fringe position indicated by a difference value between physical parameters to be measured, and the calculating unit calculates, according to the movement, a difference value between physical parameters to be measured.

* * * * *

UNITED STATES PATENT AND TRADEMARK OFFICE
CERTIFICATE OF CORRECTION

PATENT NO.        : 7,280,220 B2
APPLICATION NO.  : 10/489782
DATED              : October 9, 2007
INVENTOR(S)       : Seiichiro Kinugasa et al.

It is certified that error appears in the above-identified patent and that said Letters Patent is hereby corrected as shown below:

Title Page item (57), Column 2 (Abstract), Line 16, before "fringe" change "an" to --a--.

Signed and Sealed this

Fifteenth Day of April, 2008

JON W. DUDAS
*Director of the United States Patent and Trademark Office*